(12) United States Patent
Saeki et al.

(10) Patent No.: US 8,197,347 B2
(45) Date of Patent: Jun. 12, 2012

(54) DAMPER DEVICE

(75) Inventors: Tomohiro Saeki, Anjo (JP); Satoshi Nakagaito, Kariya (JP); Yoshitaka Inoshita, Kariya (JP); Masanori Suzuki, Kariya (JP); Hiroaki Suezaki, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 364 days.

(21) Appl. No.: 12/535,276

(22) Filed: Aug. 4, 2009

(65) Prior Publication Data
US 2010/0051411 A1    Mar. 4, 2010

(30) Foreign Application Priority Data

Aug. 27, 2008 (JP) ................................. 2008-218065

(51) Int. Cl.
*F16F 15/129* (2006.01)
(52) U.S. Cl. ...................................... 464/68.4
(58) Field of Classification Search .................. 464/68.4, 464/68.41; 192/210, 213.11, 213.21, 213.3, 192/214
See application file for complete search history.

(56) References Cited

U.S. PATENT DOCUMENTS

| | | | | |
|---|---|---|---|---|
| 4,638,684 A | * | 1/1987 | Maucher | |
| 5,569,086 A | | 10/1996 | Fukamachi | |
| 7,244,184 B2 | * | 7/2007 | Fukushima | 192/214 X |
| 2008/0210049 A1 | | 9/2008 | Rohs | |

FOREIGN PATENT DOCUMENTS

| | | |
|---|---|---|
| JP | 7-27172 A | 1/1995 |
| WO | WO 2006-079306 A1 | 8/2006 |

OTHER PUBLICATIONS

U.S. Appl. No. 12/476,774, filed Jun. 2, 2009, entitled "Torue Fluctuation Absorbing Apparatus" naming Satoshi Nakagaito, Tomohiro Saeki, Tsutomu Sekine and Yoshitaka Inoshita as inventors.
U.S. Appl. No. 12/535,321 (U.S. Application Publication No. 2010/0034342) filed Aug. 4, 2009 entitled "Damper Device" naming Tomohiro Saeki, Makoto Takeuchi, Hiroaki Suezaki, Yoshitaka Inoshita and Atsushi Yamazumi as inventors.
U.S. Appl. No. 12/535,403 (U.S. Application Publication No. 2010/0032259) filed Aug. 4, 2009 entitled "Damper Device" naming Tomohiro Saeki, Satoshi Nakagaito and Yoshitaka Inoshita as inventors.

* cited by examiner

*Primary Examiner* — Gregory Binda
(74) *Attorney, Agent, or Firm* — Buchanan Ingersoll & Rooney PC

(57) ABSTRACT

A damper device includes a first plate member rotated when the rotational force is inputted from an input side, a second plate member rotatable relative to the first plate member and outputting the rotational force to an output side when rotated in response to rotation of the first plate member, a damper portion for absorbing relative rotation between the first plate member and the second plate member, and a hysteresis portion for absorbing the relative rotation by a friction force. The hysteresis portion includes an intermediate member between the first plate member and the second plate member, and the intermediate member is pressed against one of the first plate member and the second plate member by the other one of the first plate member and the second plate member when the first plate member and the second plate member rotate relative to each other.

15 Claims, 19 Drawing Sheets

F I G. 13
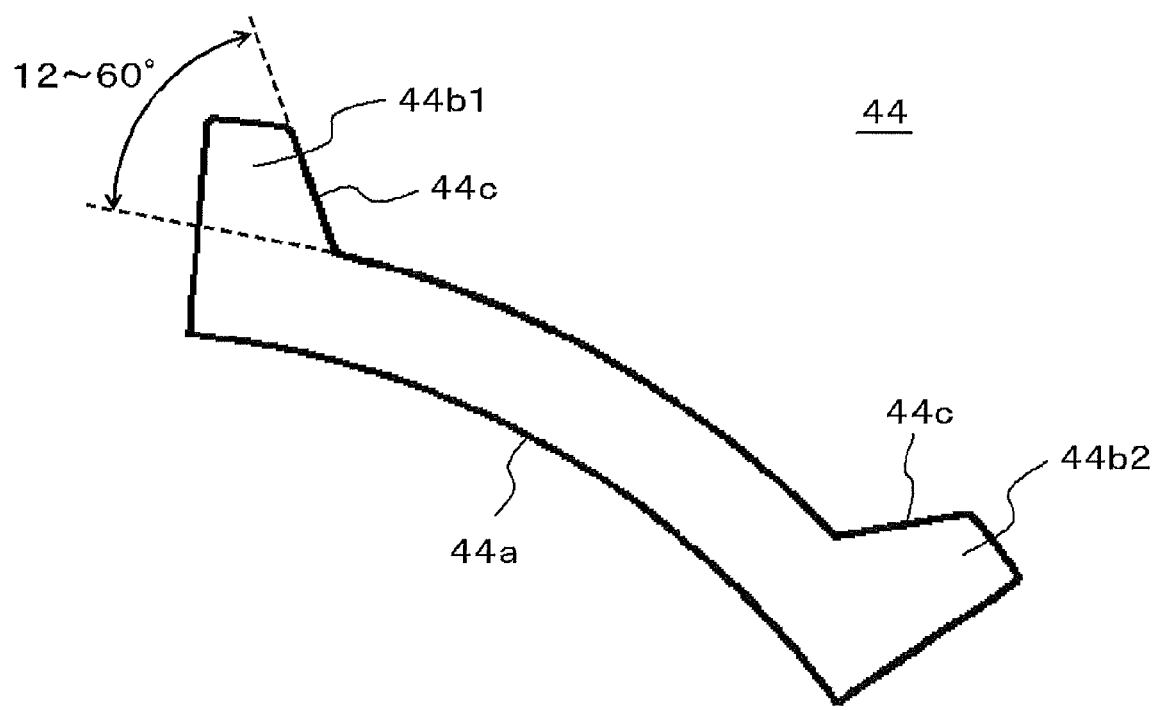

F I G. 19 A
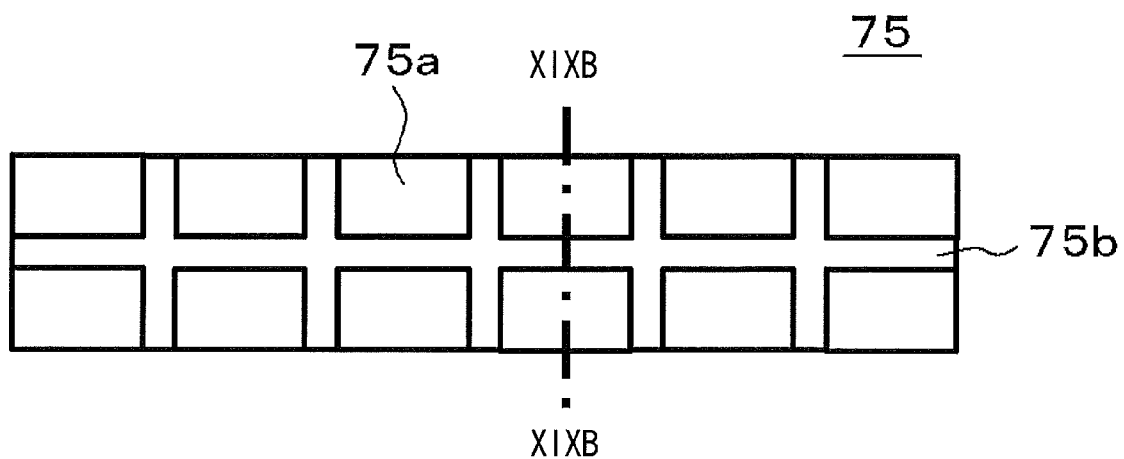
F I G. 19 B
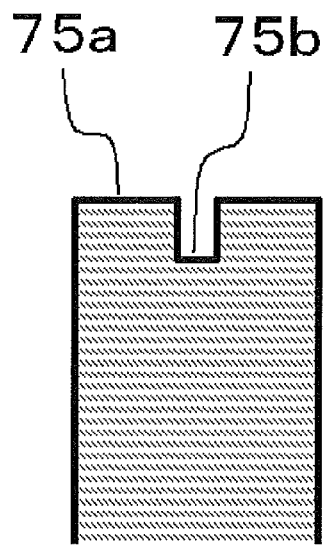

DAMPER DEVICE

CROSS REFERENCE TO RELATED APPLICATIONS

This application is based on and claims priority under 35 U.S.C. §119 to Japanese Patent Application 2008-218065, filed on Aug. 27, 2008 the entire content of which is incorporated herein by reference.

TECHNICAL FIELD

This disclosure relates to a damper device.

BACKGROUND

Generally, a damper device is provided, for example, on a power transmission path between an engine and a clutch, so that the damper device absorbs (reduces) torque fluctuation generated by the engine and a transmission apparatus. More specifically, the damper device generates torsion when the torque fluctuation occurs in order to absorb (reduce) the torque fluctuation by a spring force generated by a coil spring, a hysteresis torque generated by a friction material, and the like. A shock is likely to generate when the engine starts in a case where the damper device is configured so as to generate a small hysteresis torque. Therefore, the damper device is preferably configured so as to generate a relatively great hysteresis torque. On the other hand, in a case where the damper device is configured so as to generate a great hysteresis torque, the damper device is less likely to generate the torsion, thereby generating noise such as booming noise, gear grinding noise and the like. In order to reduce the noise, for example, a viscous fluid torsional vibration damping device, which is disclosed in JP H7-27172A and which includes a damper device configured so that a hysteresis torque is generated variably in response to a torsional vibration, is proposed.

In the viscous fluid torsional vibration damping device disclosed in JP H7-27172A, a hysteresis torque is generated by a hydraulic choke of a viscous damper mechanism. Furthermore, the viscous fluid torsional vibration damping device disclosed in JP H7-27172A includes a slide stopper having a projection, which inwardly protrudes in a radial direction of the viscous fluid torsional vibration damping device, and a driven member having a recessed portion at a radially outer end portion thereof. When the torsional angle between the slide stopper and the driven member becomes great, an end portion of the projection of the slide stopper in the radial direction contacts a circumferential end portion of the recessed portion of the driven member, thereby pushing the slide stopper in a radially outer side thereof. Accordingly, an outer circumferential surface of the slide stopper is pressed against an inner circumferential surface of a rim portion. As a result, a resistance force is generated between the slide stopper and the rim portion by friction generated therebetween.

In the viscous fluid torsional vibration damping device disclosed in JP H7-27172A, the projection of the slide stopper separates a space formed by the recessed portion of the driven member into a first sub-chamber and a second sub-chamber in a rotational direction, thereby forming a choke between the end portion of the projection of the slide stopper and a bottom surface of the recessed portion of the driven member so as to allow a viscous fluid to flow between the first and second sub-chambers. Accordingly, the projection of the slide stopper serves as a piston, according to JP H7-27172A. In order to use the projection of the slide stopper as the piston, surfaces of the slide stopper in an axial direction thereof need to closely contact a first flywheel and a drive plate, respectively. Further, an inner circumferential end surface of the projection of the slide stopper in the radial direction thereof needs to closely contact the first flywheel. The slide stopper is formed so that contact surfaces thereof in the axial direction and the radial direction are set to be relatively large. Therefore, relatively great friction resistance is likely to be generated between the slide stopper on the one hand and the first flywheel and the drive plate on the other hand, which may result in generating a friction resistance between the slide stopper and the rim portion. However, generating relatively great friction resistance between the first flywheel and the drive plate, and between the slide stopper and the rim portion may deteriorate damping function of the viscous fluid torsional vibration damping device. Furthermore, for example, in a case where thermal expansion occurs at the slide stopper, the slide stopper on the one hand and the first flywheel and the drive plate on the other hand may not closely contact, thereby deteriorating viscous damping function of the viscous fluid torsional vibration damping device. Moreover, occurrence of the friction resistance between the slide stopper and the rim portion may also deteriorate the viscous damping function. In order to maintain the viscous damping function of the viscous fluid torsional vibration damping device, clearances need to be carefully controlled, which may result in increasing manufacturing costs.

According to the viscous fluid torsional vibration damping device disclosed in JP H7-27172A, the projection of the slide stopper inwardly protrudes in the radial direction thereof, so that the slide stopper contacts the rim portion at radially outer surfaces of the slide stopper. However, because of the configuration of the slide stopper, the viscous fluid torsional vibration damping device may easily be influenced by centrifugal force, thereby deteriorating the damping function in view of the occurrence of the friction force.

Further, according to the viscous fluid torsional vibration damping device disclosed in JP H7-27172A, because plural slide stoppers are separately provided in a circumferential direction of the viscous fluid torsional vibration damping device, misalignment may occur at each slide stopper, thereby deteriorating the damping function of the viscous fluid torsional vibration damping device in view of the occurrence of the friction force.

In a case where the slide stoppers, which are separately provided at the viscous fluid torsional vibration damping device in the circumferential direction thereof, are set so that angles of inclined contact surfaces of the slide stoppers to be the same, a shock generated when the inclined contact surfaces contact each other is not likely to be dispersed, which may result in increasing noise generated by the device when the inclined surfaces contact each other.

According to the viscous fluid torsional vibration damping device disclosed in JP H7-27172A, the slide stopper is configured so as to contact the rim portion at the radially outer surface. However, in a case where the radially outer surface of the slide stopper is formed to have a flat surface, friction dust may be generated because of the friction generated between the slide stopper and the rim portion, which may deteriorate the occurrence of the friction force because of the friction dust.

According to the viscous fluid torsional vibration damping device disclosed in JP F7-27172A, the projection of the slide stopper inwardly protrude in the radial direction thereof, so that the slide stopper contacts the rim portion at the radially outer surface of the slide stopper. However, the above-described configuration of the slide stopper may deteriorate a load balance, which may result in insufficiency of the friction force.

A need thus exists to provide a damper device which is not susceptible to the drawback mentioned above.

SUMMARY

According to an aspect of this disclosure, a damper device inputting a rotational torque of a power source from an input side and outputting the rotational torque to an output side, the damper device includes a first plate member rotated when the rotational force is inputted thereto from the input side, a second plate member provided so as to be rotatable relative to the first plate member and outputting the rotational force to the output side by the second plate member being rotated in response to a rotation of the first plate member, a damper portion for absorbing a relative rotation between the first plate member and the second plate member, and a hysteresis portion for absorbing the relative rotation between the first plate member and the second plate member by using a friction force, wherein the hysteresis portion includes an intermediate member between the first plate member and the second plate member in a radial direction of the damper device, and the intermediate member is pressed against one of the first plate member and the second plate member by means of the other one of the first plate member and the second plate member when the first plate member and the second plate member rotate relative to each other.

According to another aspect of this disclosure, a damper device inputting a rotational torque of a power source from an input side and outputting the rotational torque to an output side, the damper device includes a first plate member to which the rotational force is inputted from the input side, a second plate member outputting the rotational force to the output side, a damper portion for absorbing a relative rotation between the first plate member and the second plate member by using a spring force, and a hysteresis portion for absorbing the relative rotation between the first plate member and the second plate member by using a friction force, wherein the hysteresis portion includes an intermediate member between the first plate member and the second plate member in a radial direction of the damper device, the intermediate member includes a protrusion, which includes a first tapered surface in an circumferential direction thereof, at an outer circumferential surface of the intermediate member in the radial direction and a first friction surface at an inner circumferential surface of the intermediate member, one of the first plate member and the second plate member, which is provided so as to face the protrusion, includes a second tapered surface, which corresponds to the first tapered surface, the other one of the first plate member and the second plate member, which is provided so as to face the first friction surface of the intermediate member, includes a second friction surface, which extends along the first friction surface, and the intermediate member is pressed against the second friction surface when the first plate member and the second plate member rotate relative to each other.

According to a further aspect of this disclosure, a damper device inputting a rotational torque of a power source from an input side and outputting the rotational torque to an output side, the damper device includes a first plate member to which the rotational force is inputted from the input side, a second plate member outputting the rotational force to the output side, a damper portion for absorbing a relative rotation between the first plate member and the second plate member by using a spring force, and a hysteresis portion for absorbing the relative rotation between the first plate member and the second plate member by using a friction force, wherein the hysteresis portion includes an intermediate member between the first plate member and the second plate member in a radial direction of the damper device, the intermediate member includes a protrusion, which includes a first tapered surface in an circumferential direction thereof, at one of an outer circumferential surface and an inner circumferential surface of the intermediate member in the radial direction, a first friction surface at the other one of the outer circumferential surface and the inner circumferential surface of the intermediate member, which is opposite from the one of the outer circumferential surface and the inner circumferential surface having the protrusion, and a groove on the first friction surface, one of the first plate member and the second plate member, which is provided so as to face the protrusion, includes a second tapered surface, which corresponds to the first tapered surface, the other one of the first plate member and the second plate member, which is provided so as to face the first friction surface of the intermediate member, includes a second friction surface, which extends along the first friction surface, and the intermediate member is pressed against the second friction surface when the first plate member and the second plate member rotate relative to each other.

BRIEF DESCRIPTION OF THE DRAWINGS

The foregoing and additional features and characteristics of this disclosure will become more apparent from the following detailed description considered with the reference to the accompanying drawings, wherein.

Figure 4A:
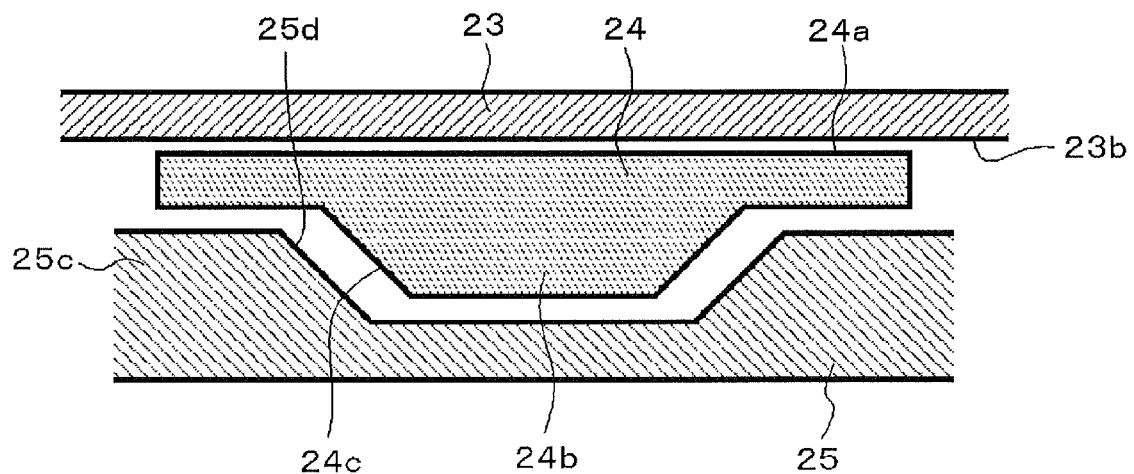
FIG. 4A is a diagram schematically illustrating an operation of the hysteresis portion of the damper device according to the first embodiment in a case where a torsion is not generated between a side plate and a hub member.
Figure 4B:
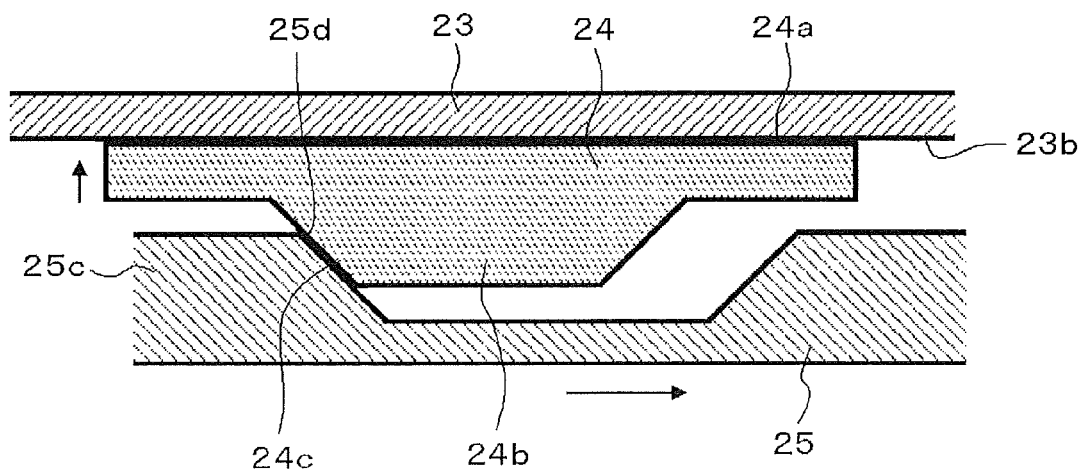
Figure 5:
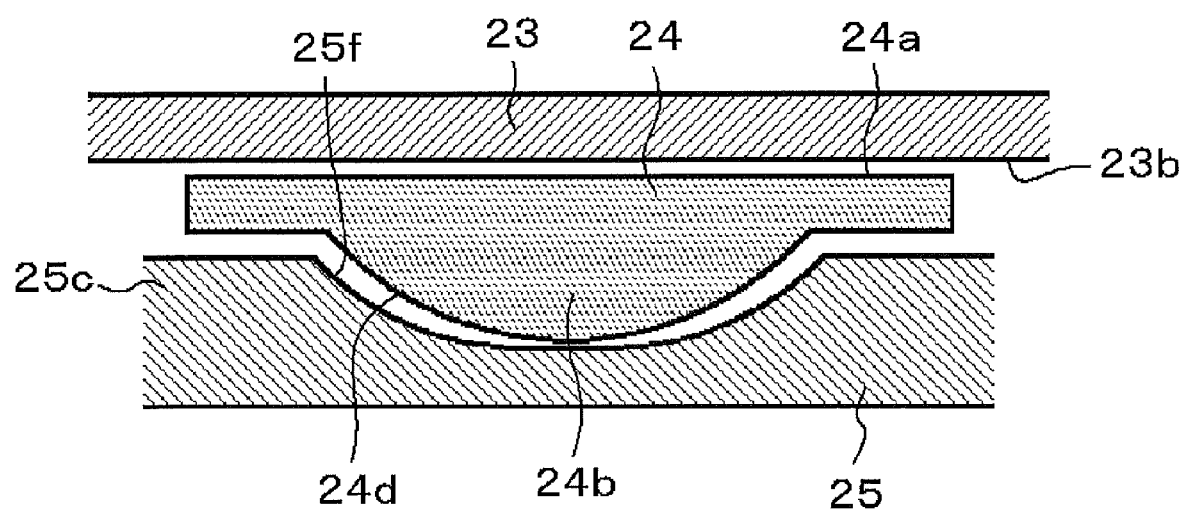
Figure 6:
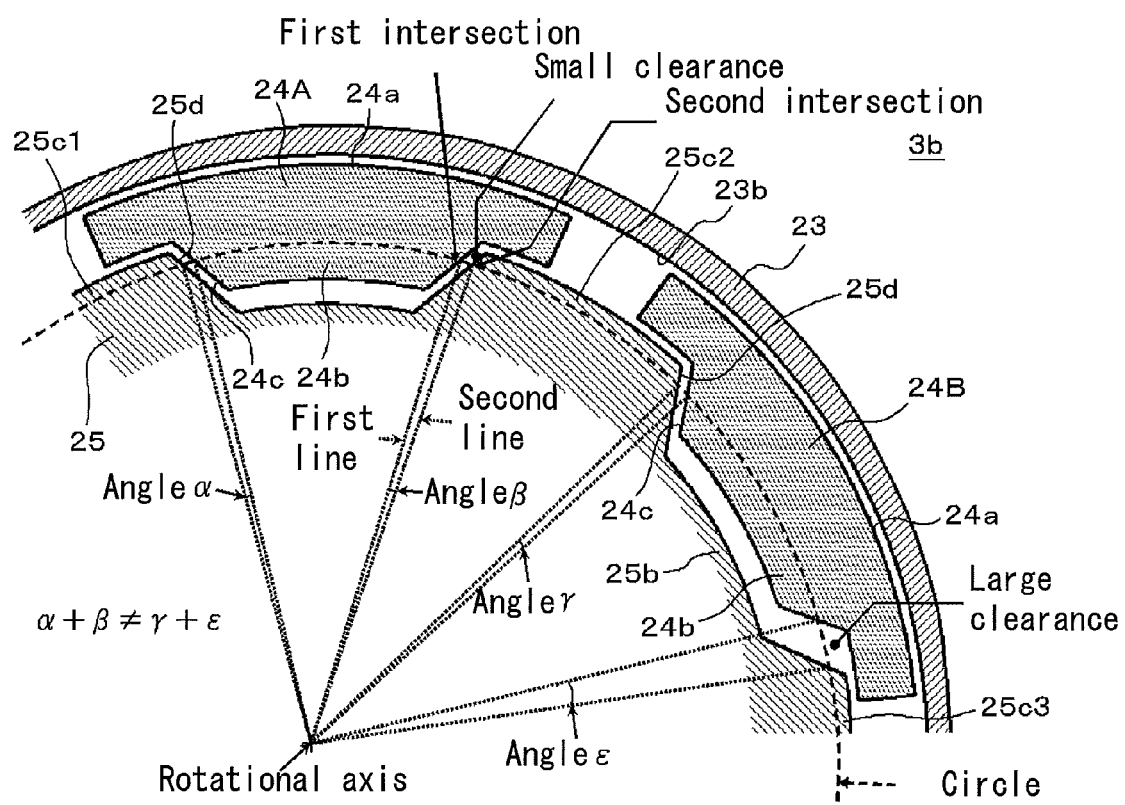
Figure 7:
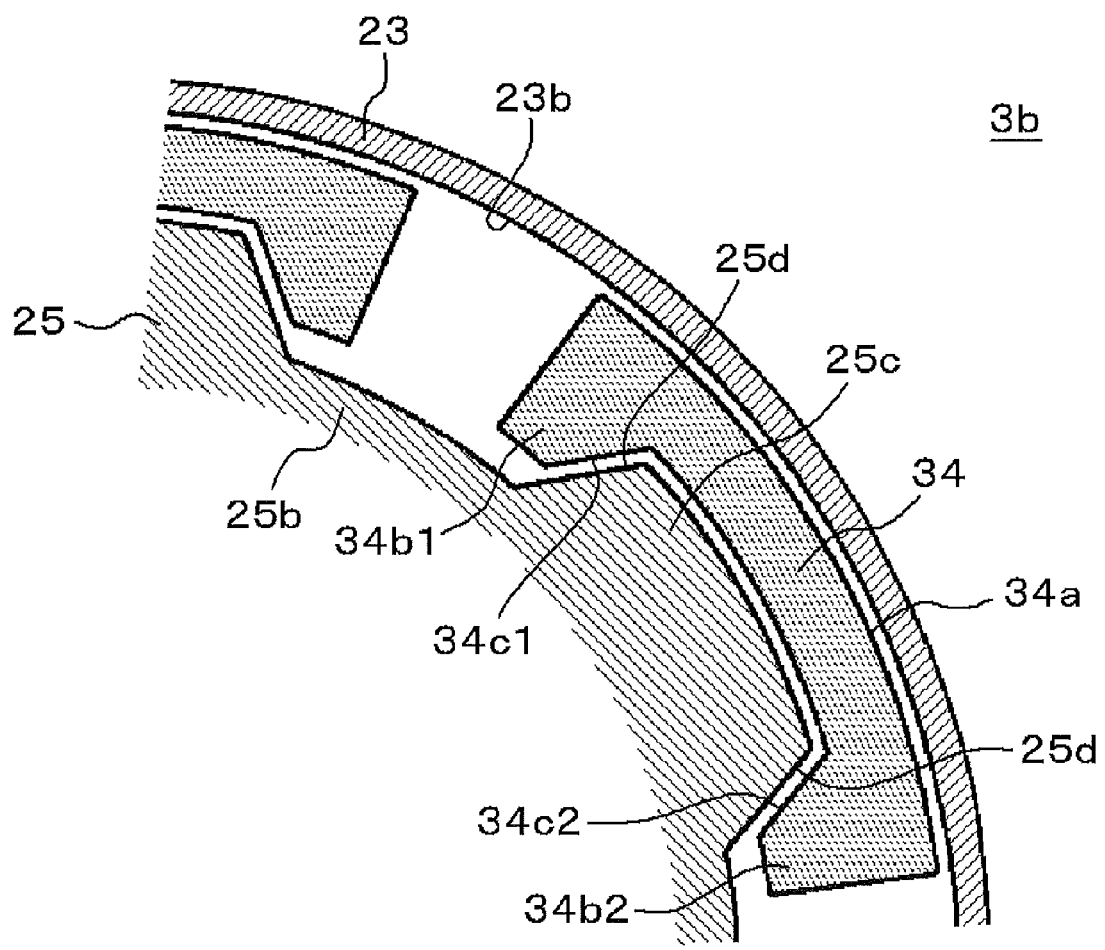
Figure 8:
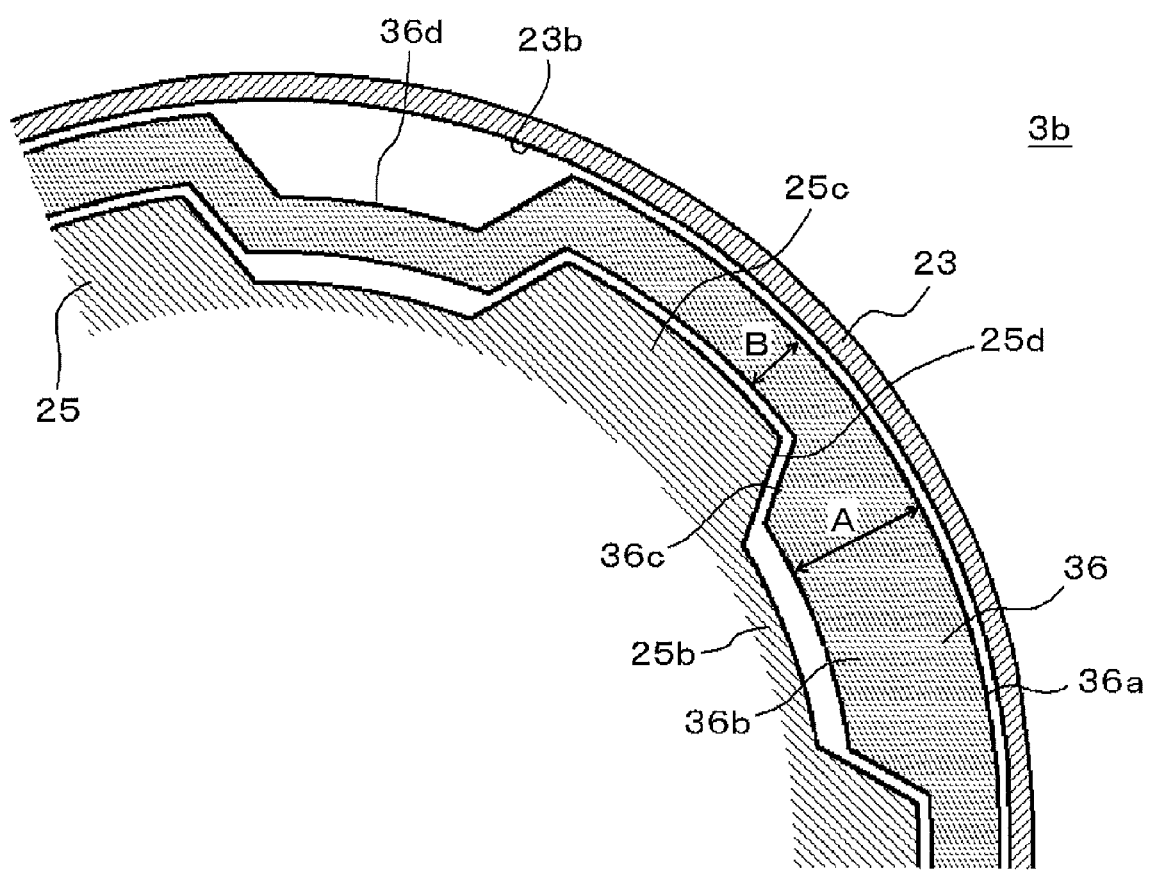
Figure 9A:
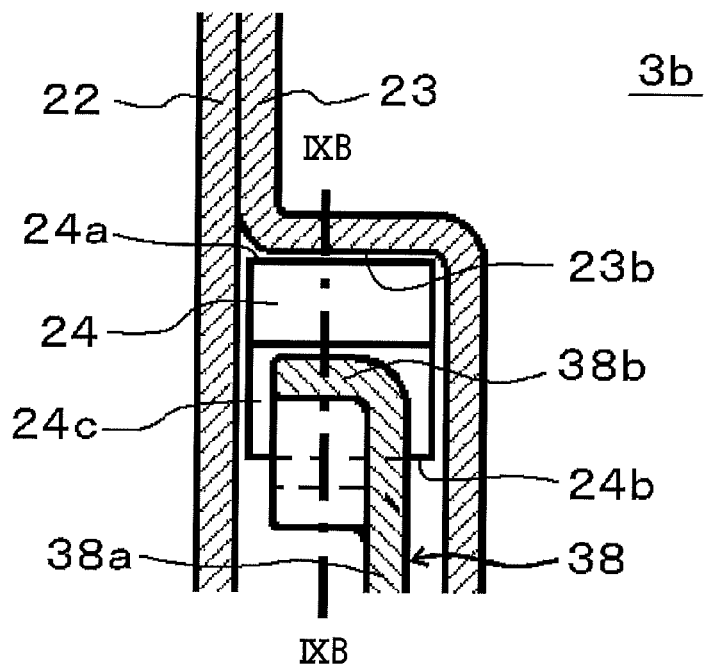
Figure 9B:
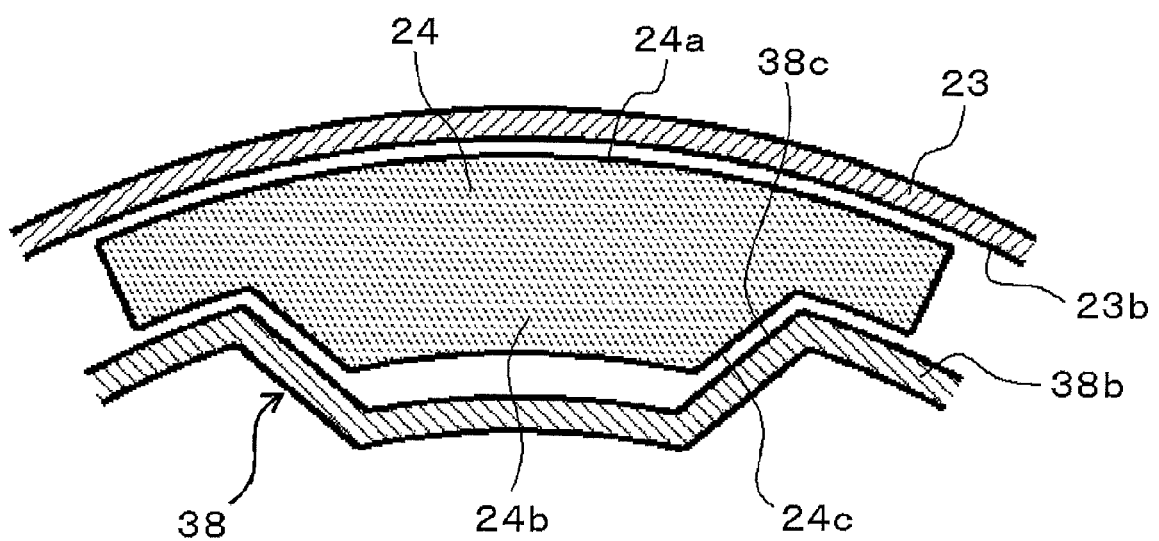
Figure 10A:
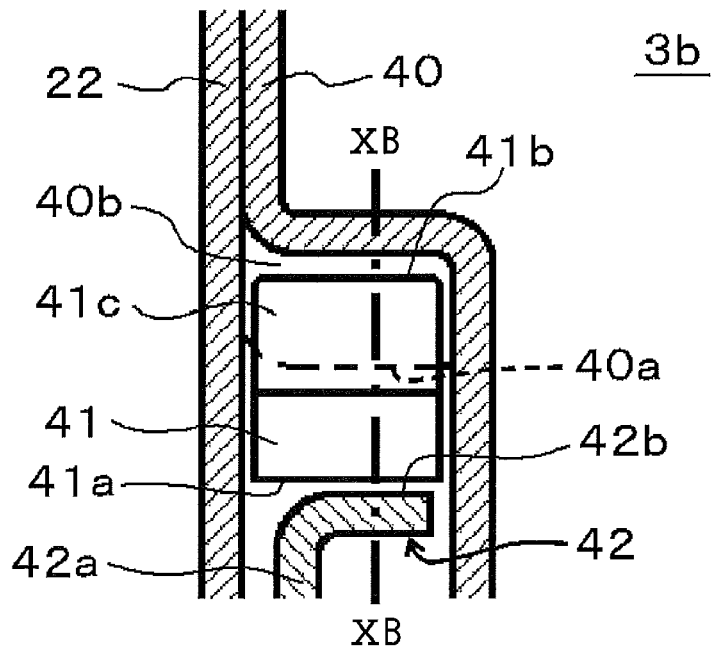
Figure 10B:
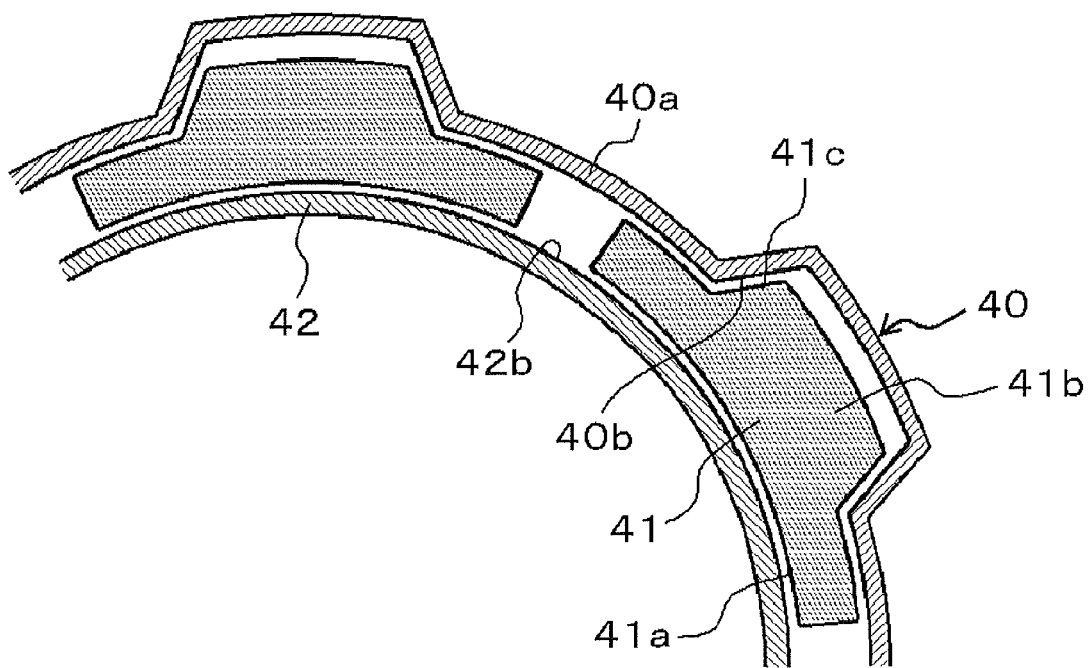
Figure 11:
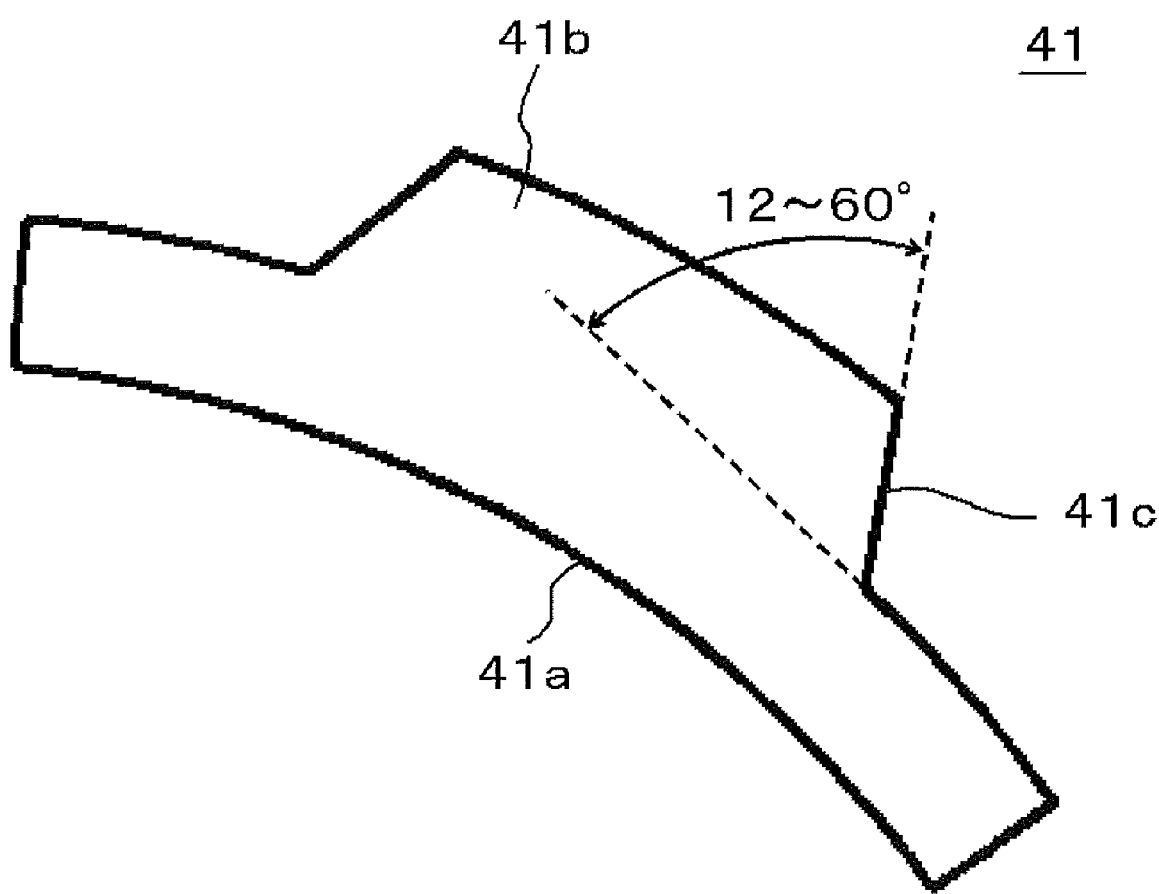
Figure 12:
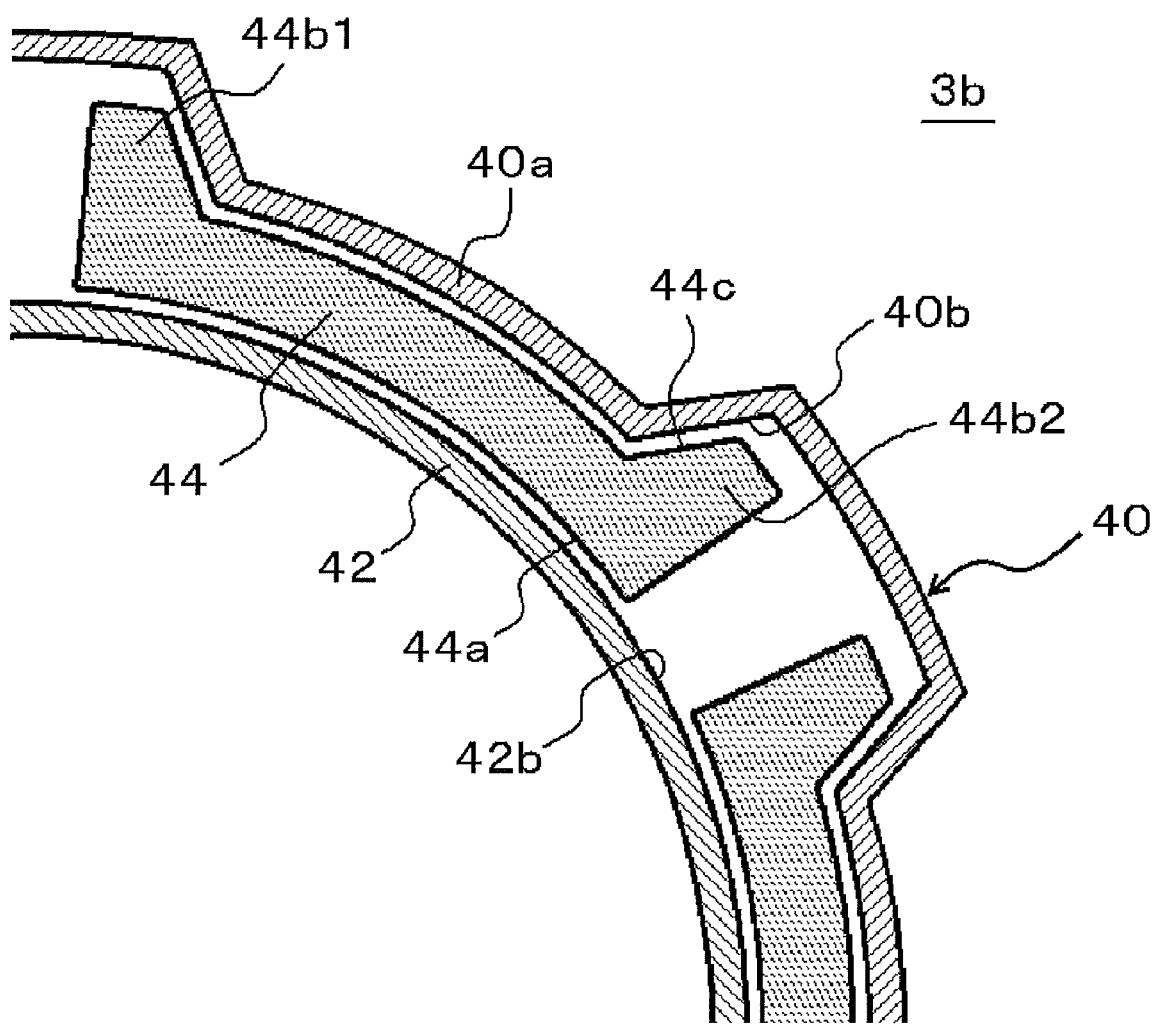
Figure 14:
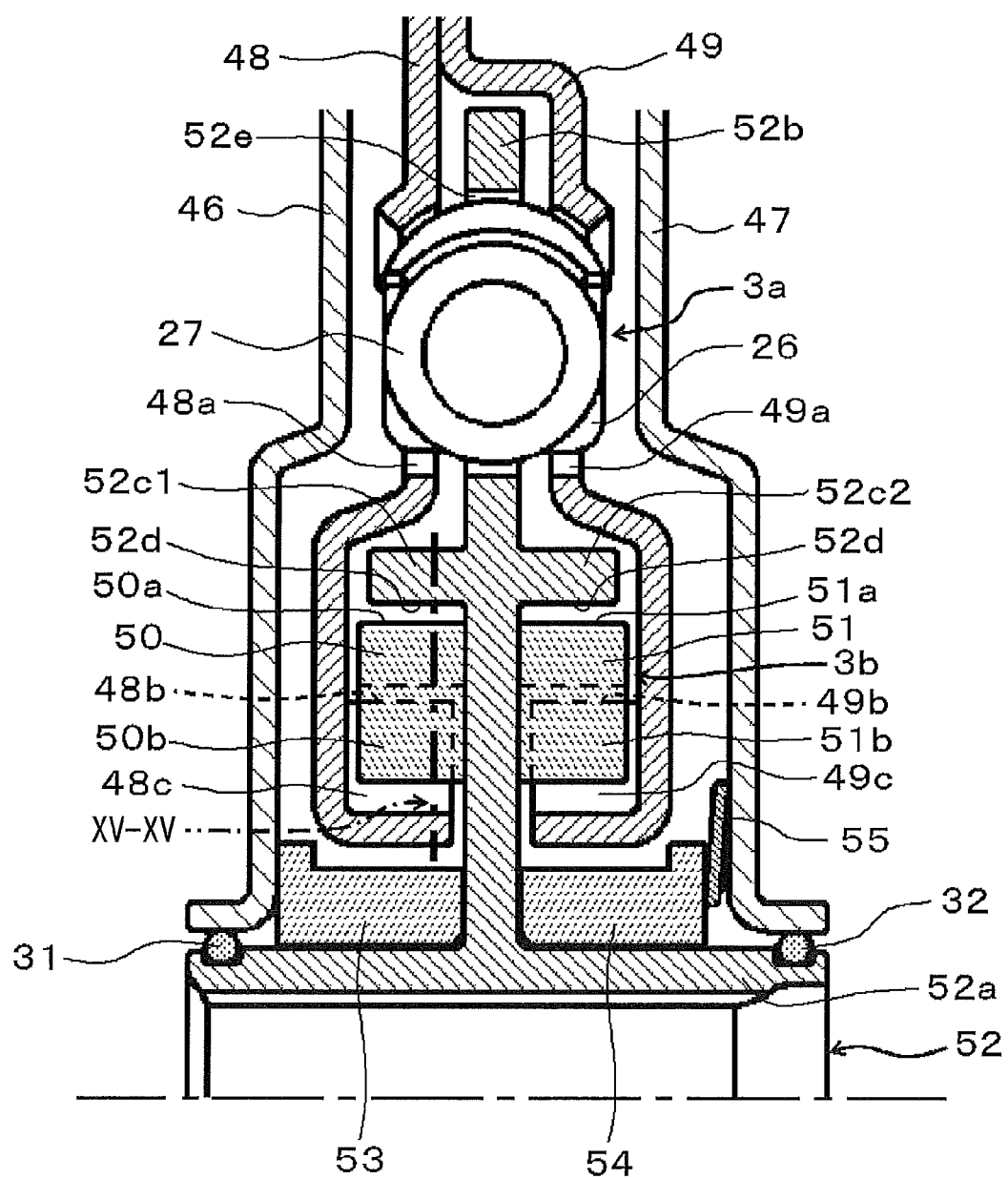
Figure 15:
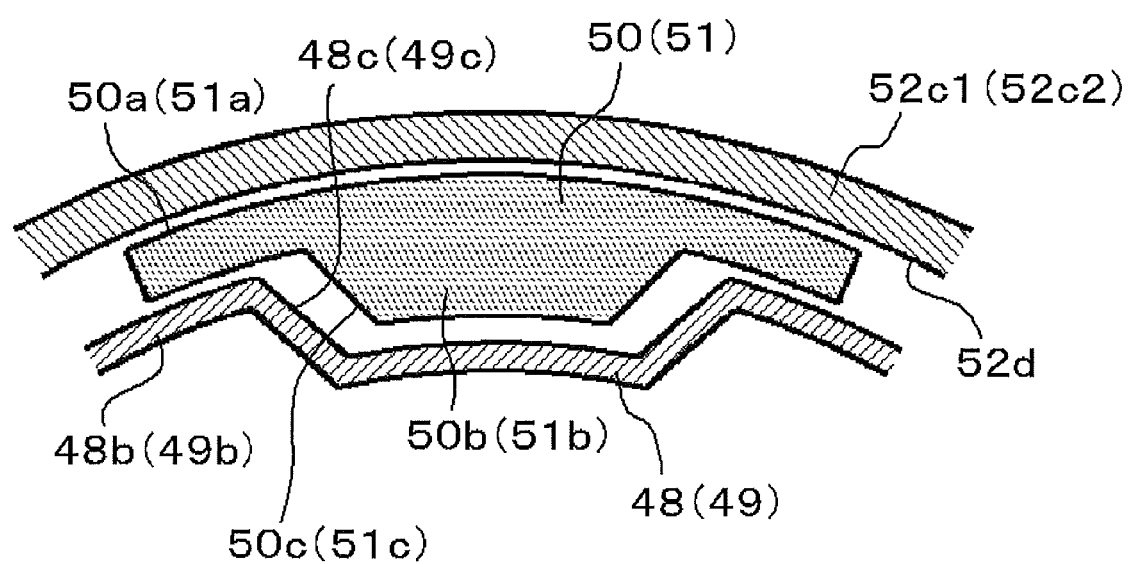
Figure 16:
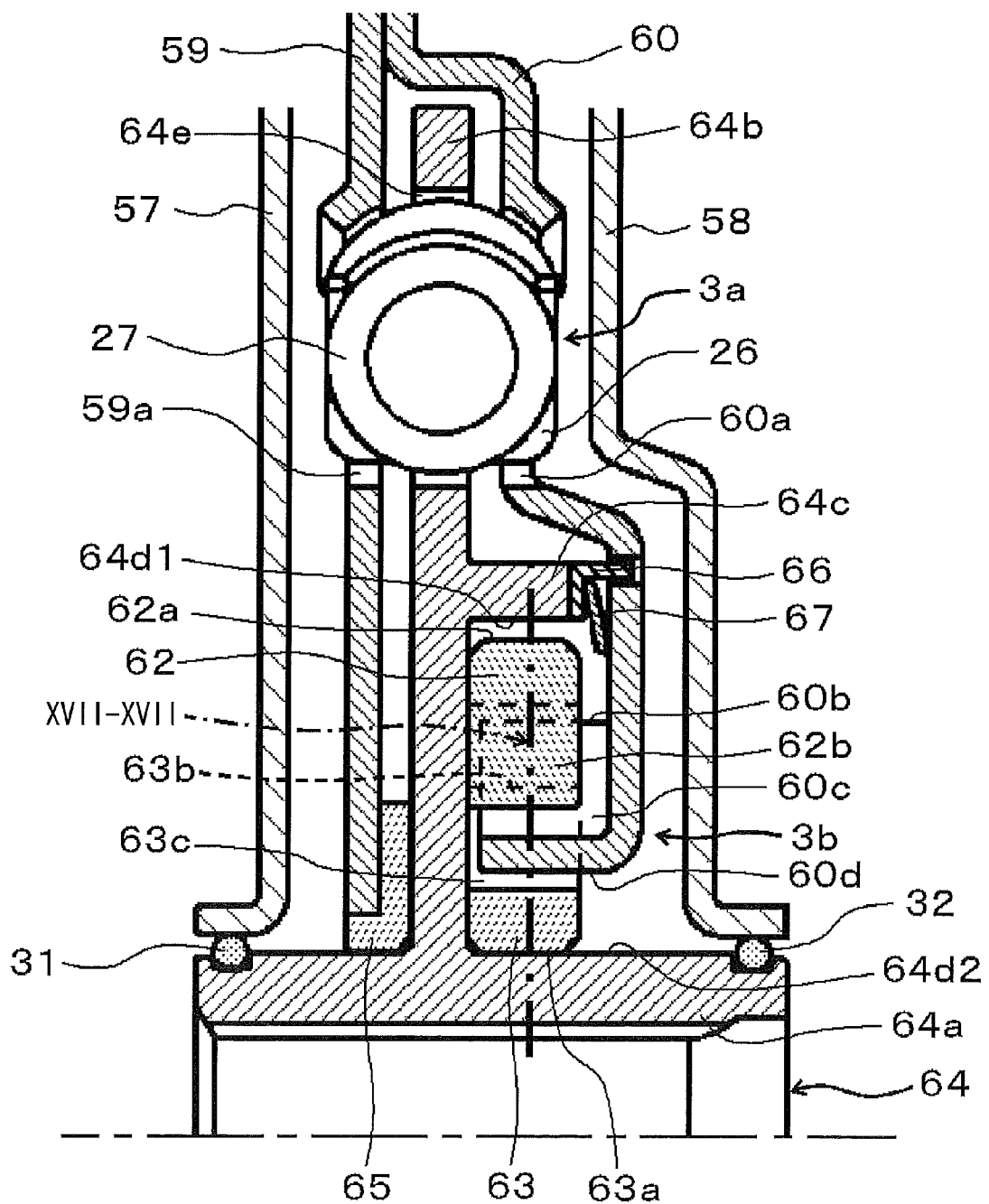
Figure 17:
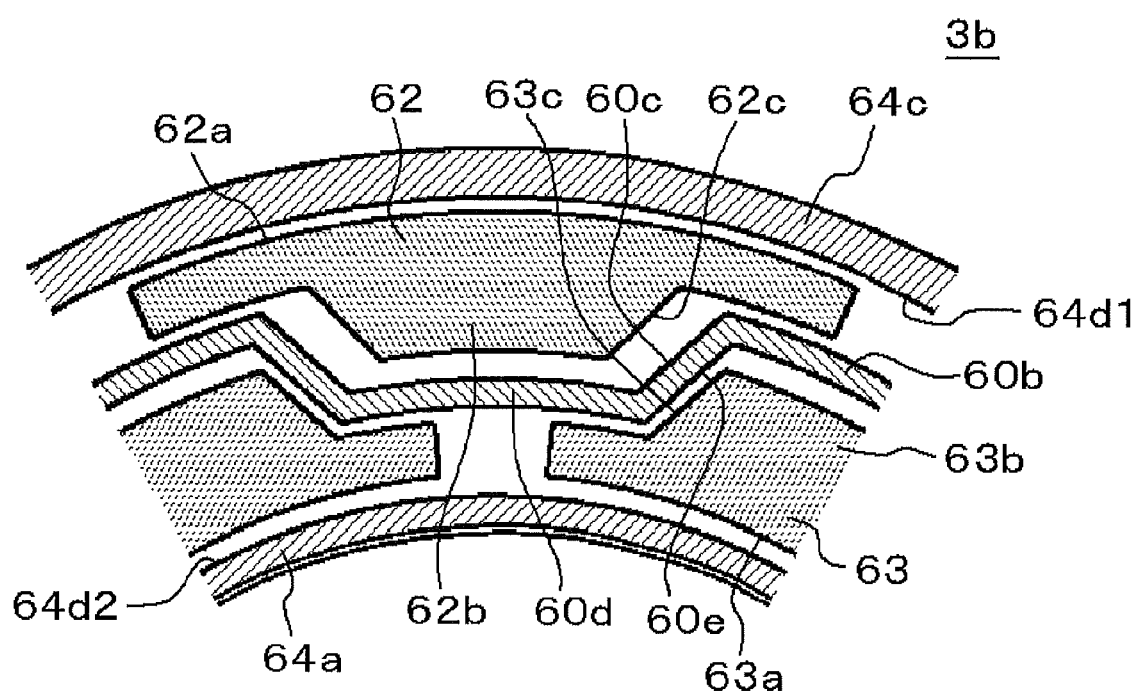
Figure 18A:
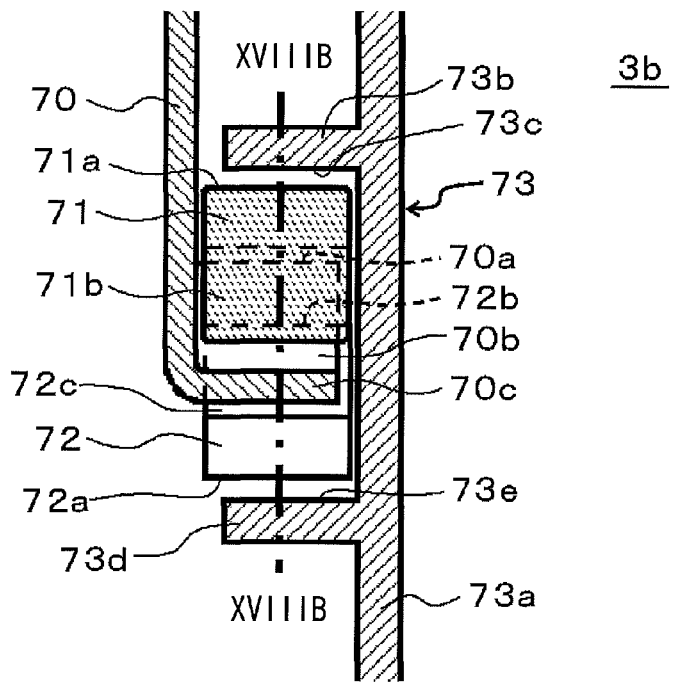
Figure 18B:
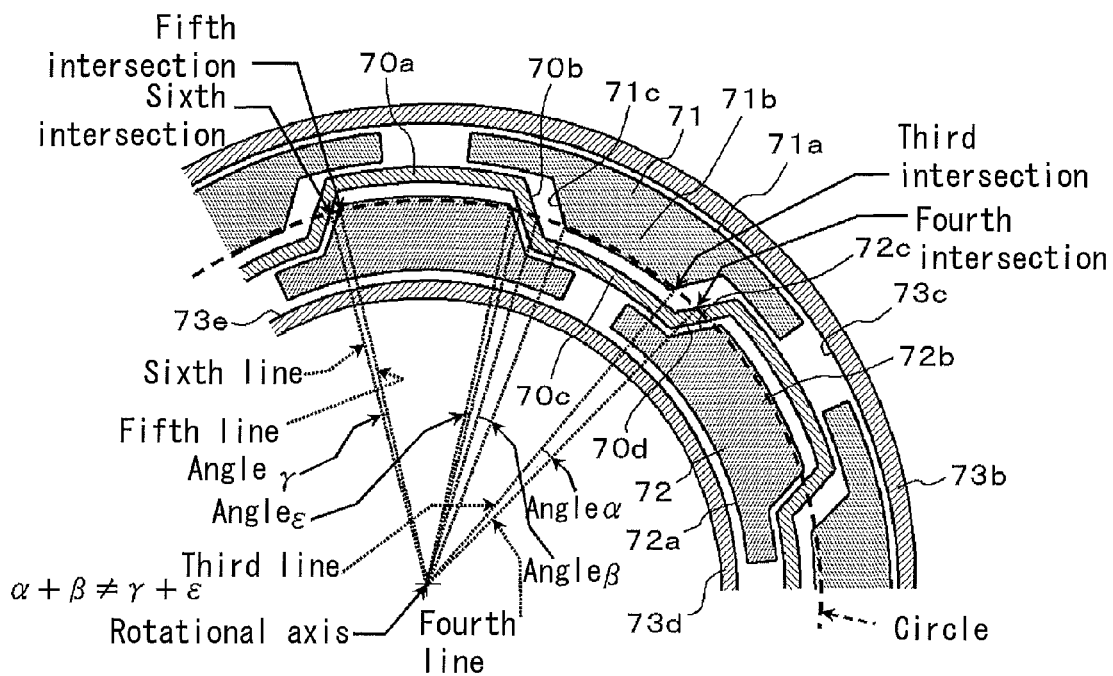

Illustrated in FIG. 4B is a diagram schematically illustrating the operation of the hysteresis portion of the damper device according to the first embodiment in a case where the torsion is generated between the side plate and the hub member;

FIG. 5 is a partial cross-sectional diagram schematically illustrating a modified example of the hysteresis portion of the damper device according to the first embodiment;

FIG. 6 is a partial cross-sectional diagram schematically illustrating a configuration example of a hysteresis portion of a damper device according to a second embodiment;

FIG. 7 is a partial cross-sectional diagram schematically illustrating a configuration example of a hysteresis portion of a damper device according to a third embodiment;

FIG. 8 is a partial cross-sectional diagram schematically illustrating a configuration example of a hysteresis portion of a damper device according to a fourth embodiment;

FIG. 9A is a partial cross-sectional diagram schematically illustrating a configuration example of a hysteresis portion of a damper device according to a fifth embodiment;

FIG. 9B is a partial cross-sectional diagram schematically illustrating the configuration example of the hysteresis portion of the damper device according to the fifth embodiment taken along line IVB-IVB in FIG. 9A;

FIG. 10A is a partial cross-sectional diagram schematically illustrating a configuration example of a hysteresis portion of a damper device according to a sixth embodiment;

FIG. 10B is a partial cross-sectional diagram schematically illustrating the configuration example of the hysteresis portion of the damper device according to the sixth embodiment taken along line XB-XB in FIG. 10A;

FIG. 11 is a side view of an intermediate member for explaining a configuration example of the intermediate member of the damper device according to the sixth embodiment;

FIG. 12 is a partial cross-sectional diagram schematically illustrating a configuration example of a hysteresis portion of a damper device according to a seventh embodiment;

FIG. 13 is a side view of an intermediate member for explaining a configuration example of the intermediate member of the damper device according to the seventh embodiment;

FIG. 14 is a partial cross-sectional diagram schematically illustrating a damper device according to an eighth embodiment;

FIG. 15 is a partial cross-sectional diagram schematically illustrating a configuration example of a hysteresis portion of the damper device according to the eighth embodiment taken along line XVB-XVB in FIG. 14;

FIG. 16 is a partial cross-sectional diagram schematically illustrating a damper device according to a ninth embodiment taken;

FIG. 17 is a partial cross-sectional diagram schematically illustrating a configuration example of a hysteresis portion of the damper device according to the ninth embodiment taken along line XVII-XVII in FIG. 16;

FIG. 18A is a partial cross-sectional diagram schematically illustrating a configuration example of a hysteresis portion of a damper device according to a tenth embodiment;

FIG. 18B is a partial cross-sectional diagram schematically illustrating the configuration example of the hysteresis portion of the damper device according to the tenth embodiment taken along line XVIIIB-XVIIIB in FIG. 18A;

FIG. 19A is a plan view schematically illustrating a configuration example of an intermediate member of a damper device according to an eleventh embodiment when being viewed from a friction surface of the intermediate member; and FIG. 19B is a cross-sectional diagram schematically illustrating the configuration example of the intermediate member of the damper device according to the eleventh embodiment taken along line XIXB-XIXB in FIG. 19A.

DETAILED DESCRIPTION

First Embodiment

Figure 1:
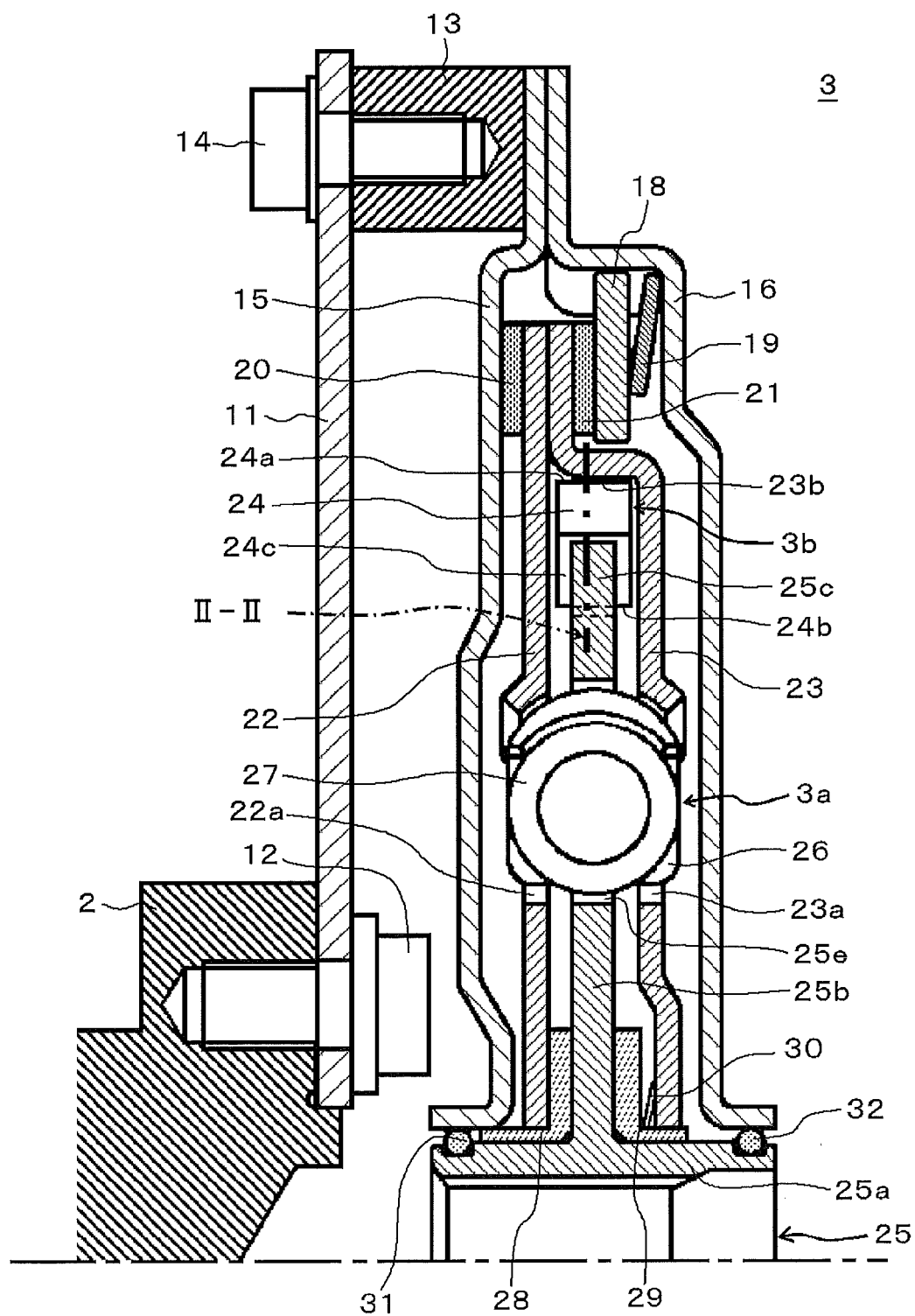
FIG. 1 is a partial cross-sectional diagram schematically illustrating a configuration example of a damper device according to a first embodiment.
Figure 2:
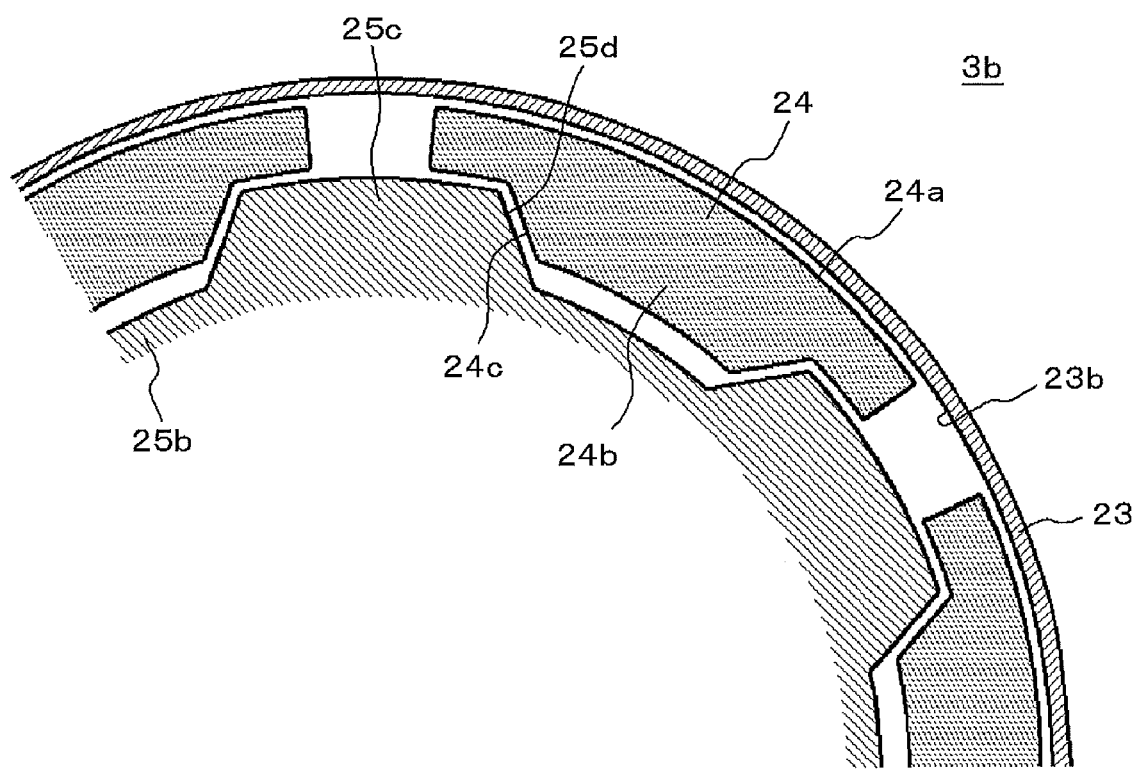
FIG. 2 is a partial cross-sectional diagram schematically illustrating a configuration example of a hysteresis portion of the damper device according to the first embodiment taken along line II-II in FIG. 1.

A first embodiment of a damper device will be described below in accordance with the attached drawings. Illustrated in FIG. 1 is a partial cross-sectional diagram schematically illustrating a configuration example of the damper device according to the first embodiment taken along an axial line thereof. Illustrated in FIG. 2 is a partial cross-sectional diagram schematically illustrating a configuration example of a hysteresis portion of the damper device according to the first embodiment taken along line II-II of FIG. 1 when being viewed in an axial direction of the damper device. Illustrated in FIG. 3 is a diagram schematically illustrating a configuration example in a case where the damper device according to the first embodiment is provided between a power source and a clutch device.

Figure 3:
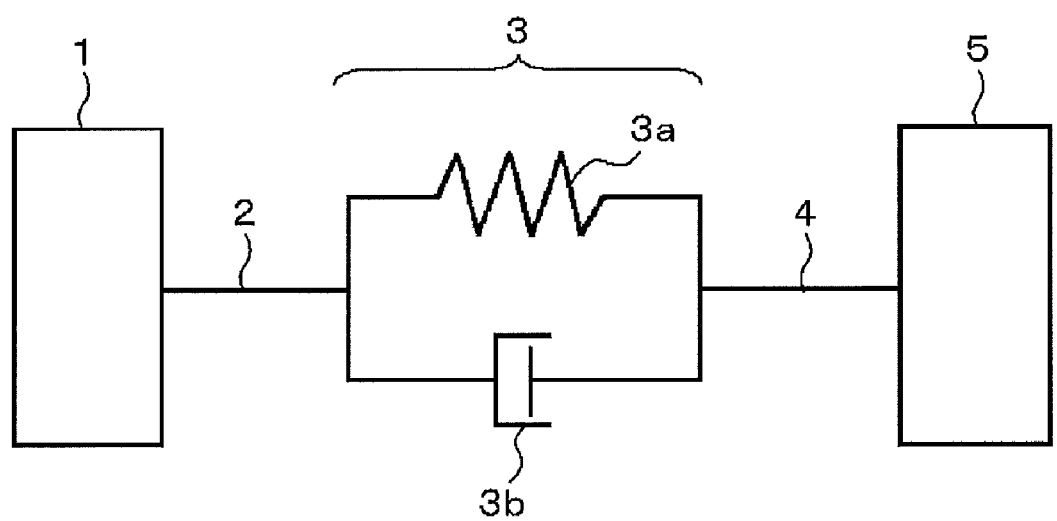
FIG. 3 is a diagram schematically illustrating a configuration example in which the damper device according to the first embodiment is provided between an engine and a clutch device.

A damper device 3 according to the first embodiment is provided between, for example, a rotational shaft 2 of a power source such as an engine 1 (or a motor) and a rotational shaft 4 of a clutch device 5 (or a component having a large inertia such as a flywheel, a clutch drum, a pulley of a continuously variable transmission (CVT) and the like), so that the damper device 3 absorbs (reduces) a torque fluctuation generated due to torsion generated between the rotational shaft 2 and the rotational shaft 4 (see FIG. 3). The damper device 3 has a torsion damping function. More specifically, the damper device 3 includes a damper portion 3a (a torsion spring portion) for absorbing the torque fluctuation by using a spring force, and a hysteresis portion 3b for absorbing (reducing) the torque fluctuation by using hysteresis torque generated due to a generation of a friction and the like. The hysteresis portion 3b is configured so as to generate a greater hysteresis torque in response to a torsional angle and a torsional speed generated between the rotational shaft 2 of the engine 1 and the rotational shaft 4 of the clutch device 5. Further, the hysteresis portion 3b is provided at an outer circumferential side relative to the damper portion 3a in a radial direction thereof (i.e. so as to surround the damper portion 3a).

The damper device 3 further includes a first plate 11, a first bolt 12, a cylindrical member 13, a second bolt 14, a second plate 15, a third plate 16, a pressure plate 18, a first coned disc spring 19, a first friction material 20, a second friction material 21, a first side plate 22, a second side plate 23, intermediate members 24, a hub member 25, seat members 26, a coil spring 27, a first thrust member 28, a second thrust member 29, a second coned disc spring 30, a first seal 31 and a second seal 32.

The first plate 11 is a member, which is formed in a circular shape and which is fixed at, for example, the rotational shaft 2 of the engine 1 (see FIG. 3) by means of the first bolt 12. The cylindrical member 13 is fixed at an outer end portion of the first plate 11 in a radial direction thereof (which will be hereinafter referred to as a radially outer end portion of the first plate 11). The first plate 11 includes a first surface facing the rotational shaft 2 of the engine 1 and a second surface facing opposite to the rotational shaft 2 of the engine 1.

The cylindrical member 13 is a member, which is formed in a cylindrical shape and which is fixed to the radially outer end portion of the first plate 11. More specifically, the cylindrical member 13 is fixed at the second surface of the first plate 11 at the radially outer end portion thereof by means of the second bolt 14. Hereinafter, a surface of the cylindrical member 13 contacting the first plate 11 is referred to as a first surface of the cylindrical member 13. Further, a surface of the cylindrical member 13 facing opposite to the first plate 11 is referred to as a second surface of the cylindrical member 13. The second and third plates 15 and 16, which are put together, are fixed at the second surface of the cylindrical member 13 by means of a bolt and the like.

The second plate 15 is a member, which is formed in a circular shape and which is provided between the cylindrical member 13 and the third plate 16. The second plate 15 is fixed at the cylindrical member 13 at a radially outer circumferential end portion of the second plate 15 by means of the bolt and the like in the state where the second plate 15 is put together with the third plate 16. Furthermore, the second plate 15 is a component of a limiter portion, which generates slip (slide) in a case where the torsion generated between the rotational shafts 2 and 4 (see FIG. 3) is not fully absorbed by the damper portion 3a and/or the hysteresis portion 3b. The second plate 15 fittedly contacts the first friction material 20 while allowing the second plate 15 to be slidable against the first friction material 20. Furthermore, the second plate 15 is formed so as to extend up to an outer circumferential surface of a cylindrical portion 25a of the hub member 25 while ensuring a clearance therebetween in the radial direction, and fittedly contacts the first seal 31 at a radially inner circumferential end portion of the second plate 15, thereby sealing the clearance formed between the second plate 15 and the cylindrical portion 25a of the hub member 25 in order to seal oil (including grease) accommodated within a space, which is formed by the second and third plates 15 and 16, so as not to leak outside the space. Additionally, the second plate 15 is supported at the hub member 25 via the first thrust member 28 at the radially inner circumferential end portion of the second plate 15 so as to be rotatable relative to the hub member 25. Hereinafter, a surface of the second plate 15 facing the first plate 11 (the cylindrical member 13) is referred to as a first surface of the second plate 15, and a surface of the second plate 15 facing opposite to the first plate 11 (the surface facing the third plate 16) is referred to as a second surface of the second plate 15.

The third plate 16 is a member, which is formed in a circular shape and which is provided at a second surface side of the second plate 15. Further, the third plate 16 is fixed relative to the cylindrical member 13 by means of the bolt and the like in the state where the third plate 16 is put together with the second plate 15 at a radially outer circumferential portion of the third plate 16. The third plate 16 is also a component of the limiter portion. More specifically, the third plate 16 supports the pressure plate 18 and the first coned disc spring 19 so as not to rotate relative to each other and so as to move in an axial direction of the rotational shaft 2 of the engine 1. The axial direction of the rotational shaft 2 corresponds to an axial direction of the damper device 3. Further, the third plate 16 fittedly contacts the first coned disc sprint 19. The third plate 16 is formed so as to extend up to the outer circumferential surface of the cylindrical portion 25a of the hub member 25 while ensuring a clearance therebetween in the radial direction, and fittedly contacts the second seal 32 at a radially inner circumferential end portion of the third plate 16, thereby sealing the clearance formed between the third plate 16 and the cylindrical portion 25a of the hub member 25 in order to seal the oil (including the grease) accommodated within the space, which is formed by the second and third plates 15 and 16, so as not to leak outside the space, together with the first seal 31. Hereinafter, a surface of the third plate 15 facing the second plate 15 is referred to as a first surface of the third plate 16, and a surface of the third plate 16 facing opposite to the second plate 15 is referred to as a second surface of the third plate 16.

The pressure plate 18 is a component of the limiter portion. Further, the pressure plate 18 is positioned between the first coned disc spring 19 and the second friction material 21. The pressure plate 18 is supported by the third plate 16 so as not to be rotatable relative to the third plate 16 and so as to be movable in the axial direction of the rotational shaft 2 of the engine 1, which corresponds to the axial direction of the damper device 3. Furthermore, the pressure plate 18 is biased towards the second friction material 21 by means of the first coned disc spring 19 so that the pressure plate 18 fittedly contacts the second friction material 21 while allowing the pressure plate 18 to be slidable relative to the second friction material 21.

The first coned disc spring 19 is a component of the limiter portion. Further, the first coned disc spring 19 is provided between the third plate 16 and the pressure plate 18, so that the first coned disc spring 19 biases the pressure plate 18 towards the second friction material 21. The first coned disc spring 19 is supported by the third plate 16 so as not to be rotatable relative to the third plate 16 and so as to be movable in the axial direction of the damper device 3.

The first friction material 20 is a component of the limiter portion. Further, the first friction material 20 is provided between the second plate 15 and the first side plate 22, so that the first friction material 20 is fixed to the first and second side plates 22 and 23 by means of a rivet and the like together with the second friction material 21. The first friction material 20 fittedly contacts the second plate 15 so as to be slidable relative to the second plate 15.

The second friction material 21 is a component of the limiter portion. Further, the second friction material 21 is provided between the pressure plate 18 and the second side plate 23, so that the second friction material 21 is fixed to the first and second side plates 22 and 23 by means of the rivet and the like together with the first friction material 20. The second friction material 21 fittedly contacts the pressure plate 18 so as to be slidable relative to the pressure plate 18.

The first side plate 22 is a component of the limiter portion and the damper portion 3a. Further, the first side plate 22 is formed in a circular shape and is supported by the hub member 25 via the first thrust member 28 at a radially inner circumferential end portion of the first side plate 22 so as to be rotatable relative to the hub member 25. The first side plate 22 includes a first opening 22a, within which the coil spring 27 and the seat members 26 are accommodated, at a substantially intermediate portion of the first side plate 22 in the radial direction. Further, the first opening 22a is provided at the first side plate 22 so as to contact/detach with/from the seat members 26 at respective circumferential end portions of the first opening 22a in the radial direction thereof. The first side plate 22 is provided between the first friction material 20 and the second side plate 23 at a radially outer circumferential portion of the first side plate 22 relative to the coil spring 27 in the radial direction. The first side plate 22 is fixed to the second side plate 23 by means of the rivet and the like together with the first and second friction materials 20 and 21. Additionally, the first friction material 20 and the first side plate 22 may be fixed with each other by means of alternative means, such as adhesion and the like. Similarly, the second friction material 21 and the second side plate 23 may be fixed with each other by means of alternative means, such as the adhesion and the like. Hereinafter, a surface of the first side plate 22 facing the second plate 15 is referred to as a first surface of the first side plate 22, and a surface of the first side plate 22 facing opposite to the second plate 15 (i.e. the surface facing the second side plate 23) is referred to as a second surface of the first side plate 22.

The second side plate 23 is a component of the limiter portion, the hysteresis portion 3b and the damper portion 3a. Further, the second side plate 23 is formed in a circular shape. The second side plate 23 is provided to the damper device 3 so as to rotate integrally with the rotational shaft 2 of the engine 1 via the first plate 11, the cylindrical member 13, the second plate 15, the third plate 16, the pressure plate 18, the first coned disc spring 19 and the second friction material 21. The second side plate 23 serves as an input member (a first plate member) of the hysteresis portion 3b. The second side plate 23 is supported by the hub member 25 at a radially inner circumferential end portion of the second side plate 23 via the second thrust member 29 so as to be rotatable relative to the hub member 25. The second side plate 23 supports an end portion of the second coned disc spring 30 at a surface of the second side plate 23 facing a flange portion 25b. Hereinafter, the surface of the second side plate 23 facing the flange portion 25b is referred to as a first surface of the second side plate 23, and a surface of the second side plate 23 facing opposite to the flange portion 25b (i.e. the surface facing the third plate 16) is referred to as a second surface of the second side plate 23. The second side plate 23 includes a second opening portion 23a, within which the coil spring 27 and the seat members 26 are accommodated, at a substantially intermediate portion of the second side plate 23 in the radial direction. Further, the second opening 23a is provided at the second side plate 23 so as to contact/detach with/from the seat members 26 at respective circumferential end portions of the second opening 23a in the radial direction thereof. Furthermore, the second side plate 23 is formed to have a stepped shape when being viewed from the side of the damper device 3 at a portion between the pressure plate 18 and the intermediate members 24. An inner circumferential surface of the second side plate 23 at the stepped shape (i.e. the inner circumferential surface of the stepped portion of the second side plate 23 extending in the axial direction towards the first side plate 22 and facing the intermediate member 24 in the radial direction) serves as a second friction surface 23b. The stepped shape of the second side plate 23 may be formed by being pressed, thereby forming the second friction surface 23b. The second friction surface 23b is formed at the second side plate 23 so as to form a cylindrical portion. Further, the second friction surface 23b is formed at the second side plate 23 in order to generate the hysteresis torque by the intermediate members 24 being pressed against the second friction surface 23b and generating friction between the second friction surface 23b of the second side plate 23 and first friction surfaces 24a of the respective intermediate members 24 when the second side plate 23 and the hub member 25 rotate relative to each other. In order to obtain a predetermined friction coefficient, a surface treatment, a heat treatment or the like is applied to the second friction surface 23b of the second side plate 23 if necessary. The second side plate 23 is provided between the second friction material 21 and the first side plate 22 at an outer circumferential portion of the second side plate 23 relative to the second friction surface 23b thereof in the radial direction. Further, the second side plate 23 is fixed to the first side plate 22 by means of the rivet and the like together with the first and second friction materials 20 and 21.

The intermediate members 24 are components of the hysteresis portion 3b. Further, each of the intermediate members 24 is formed in an arc shape. The intermediate members 24 are provided to the damper device 3 in the circumferential direction so that each of the intermediate members 24 is spaced away from each of the neighboring intermediate members 24 in a space formed between a protrusion 25c of the hub member 25 (i.e. the protrusion outwardly protruding from the hub member 25 in the radial direction, which will be hereinafter referred to as outer protrusion 25c) and the second friction surface 23b of the second side plate 23 in the radial direction. Hereinafter, because the intermediate members 24 have the same configuration and operation, the detailed description of the intermediate members 24 will be given with one of the intermediate members 24 as an example. The intermediate member 24 is provided between an end portion of the flange portion 25b of the hub member 25 and the second friction surface 23b of the second side plate 23 so as to ensure a clearance (e.g. play (backlash width) which is equal to or greater than 0.3 mm (the clearance may be preferably ensured equal to or greater than 0.3 mm in view of thermal expansion, component accuracy and the like)) between the intermediate member 24 on the one hand and the end portion of the flange portion 25b of the hub member 25 and the second friction surface 23b of the second side plate 23 on the other hand in the radial direction. Further, the intermediate member 24 is provided between the first and second side plates 22 and 23 so as to ensure a clearance (e.g. play (backlash width) which is equal to or greater than 0.3 mm) between the intermediate member 24 on the one hand and the first side plate 22 and the second side plate 23 on the other hand in the axial direction. An outer circumferential surface of the intermediate member 24 serves as the first friction surface 24a, which faces the second friction surface 23b of the second side plate 23 and which extends along the second friction surface 23b. The first friction surface 24a of the intermediate member 24 generates the friction with the second friction surface 23b of the second side plate 23 by the intermediate member 24 being pressed against the second friction surface 23b of the second side plate 23 when the second side plate 23 and the hub member 25 rotate relative to each other, thereby generating the hysteresis torque. Furthermore, the intermediate member 24 includes a base portion and a protrusion 24b, which inwardly protrudes from an inner circumferential surface of the base portion of the intermediate member 24 in the radial direction and which will be hereinafter referred to as an inner protrusion 24b, at a substantially intermediate portion of the inner circumferential surface of the intermediate member 24 facing the hub member 25. The inner protrusion 24b is provided at the intermediate member 24 so as to form a clearance (e.g. play (backlash width) which is equal to or greater than 0.3 mm) between the inner protrusion 24b and the neighboring outer protrusions 25c of the hub member 25 in the circumferential direction at a recessed portion formed by the neighboring outer protrusions 25c of the hub member 25. Side surfaces of the inner protrusion 24b in a circumferential direction thereof serve as first tapered surfaces 24c (a first tapered portion), which corresponds to second tapered surfaces 25d (a second tapered portion) of the outer protrusion 25c. The first tapered surfaces 24c are formed at the inner protrusion 24b in order to outwardly displace (press) the entire intermediate member 24 in the radial direction of the damper device 3 by an interaction with the second tapered surfaces 25d of the hub member 25 when the second side plate 23 and the hub member 25 rotate relative to each other. An angle of each of the first tapered surfaces 24c (i.e. an angle formed between the first tapered surface 24c and a tangent line at a point where the first tapered surface 24c intersects with the inner circumferential surface of the base portion of the intermediate member 24) is set in a range between 12 degrees to 60 degrees (i.e. so as to be equal to or greater than 12 degrees and so as not to be greater than 60 degrees). If the angle of each of the first tapered surfaces 24c is set to a degree less than 12 degrees, the intermediate member 24 may be caught between the end portion of the flange portion 25b of the hub member 25 and the second friction surface 23b of the second side plate 23, thereby generating an excessive hysteresis torque. If the excessive hysteresis torque is generated, it may be difficult to resolve (absorb) the hysteresis torque. On the other hand, if the angle of each of the first tapered surfaces 24c is set to a degree greater than 60 degrees, a force necessary for pressing the intermediate member 24 towards the second friction surface 23b of the second side plate 23 may become insufficient, which may result in generating insufficient hysteresis torque. The oil (including grease) is provided so as to lubricate the components of the hysteresis portion 3b including the intermediate members 24 in order to reduce a possibility of an occurrence of the excessive friction. In this embodiment, a light resin is used for the intermediate members 24. More specifically, the light resin having a specific gravity equal to or less than twice as much as a specific gravity of the oil around the intermediate members 24 may be used. Accordingly, the damper device 3 may stabilize a hysteresis characteristic while being less influenced by a centrifugal force.

The hub member 25 is a component of the hysteresis portion 3b and the damper portion 3a. Further, the hub member 25, which is connected to the rotational shaft 4 of the clutch device 5 (see FIG. 3), serves as an output member (a second plate member) of the hysteresis portion 3b. The hub member 25 includes the cylindrical portion 25a and the flange portion 25b, which extends outwardly in the radial direction from a predetermined portion of the outer circumferential surface of the cylindrical portion 25a. A spline is provided at an inner circumferential surface of the cylindrical portion 25a in order to connect the hub member 25 with the rotational shaft 4 of the clutch device 5 (see FIG. 3). Furthermore, recessed portions are provided at end portions of the outer circumferential surface of the cylindrical portions 25a in the axial direction thereof, so that the first and second seals 31 and 32 are attached at the recessed portions, respectively. Accordingly, the cylindrical portion 25a of the hub member 25 supports the second and third plates 15 and 16 via the first and second seals 31 and 32, respectively, so that the second and third plates 15 and 16 rotate relative to the hub member 25. Further, the cylindrical portion 25a of the hub member 25 supports the first and second side plates 22 and 23 at the outer circumferential surface in the vicinity of the flange portion 25b via the first and second thrust members 28 and 29, respectively, so that the first and second side plates 22 and 23 rotate relative to the hub member 25. The flange portion 25b of the hub member 25 includes a first surface facing the first side plate 22 and a second surface facing the second side plate 23. The first and second thrust members 28 and 29 are provided so as to fittedly contact the flange portion 25b at the first and second surfaces thereof in the vicinity of the cylindrical portion 25a, respectively, while allowing the flange portion 25b to slide relative to the first and second thrust members 28 and 29. Furthermore, the flange portion 25b includes a third opening 25e, within which the coil spring 27 and the seat members 26 are accommodated, at a substantially intermediate portion of the flange portion 25b in the radial direction. Further, the third opening 25e is provided at the flange portion 25b so as to contact/detach with/from the seat members 26 at respective circumferential end portions of the third opening 25e in the radial direction thereof. The flange portion 25b includes plural outer protrusions 25c, which outwardly protrude from the outer circumferential end surface of the flange portion 25b in the radial direction thereof, at an outer circumferential end portion of the flange portion 25b in the radial direction. Each of the plural outer protrusions 25c is provided at the flange portion 25b so as to be positioned between the inner protrusions 24b of the neighboring intermediate members 24 and so as to form the clearance (the play, a backlash angle) therebetween in the circumferential direction. Side surfaces of each of plural outer protrusions 25c in the circumferential direction of the hub member 25 serves as second tapered surfaces 25d (the second tapered portion), which corresponds to the first tapered surfaces 24c of the inner protrusions 24b of the neighboring intermediate members 24, respectively. Each of plural outer protrusions 25c and the second tapered surfaces 25d are formed by cutting. The second tapered surfaces 25d are formed at each of the outer protrusions 25c so as to outwardly press the entire intermediate member 24 in the radial direction of the damper device 3 by the interaction with the first tapered surfaces 24c of the corresponding intermediate members 24 when the second side plate 23 and the hub member 25 rotate relative to each other. An angle of each of the second tapered surfaces 25d (i.e. an angle formed between the second tapered surface 25d and a tangent line at a point at which the second tapered surface 25d intersects with the outer circumferential end surface of the flange portion 25b) is set in the range between 12 degrees to 60 degrees.

The seat members 26 are accommodated within the first, second and third openings 22a, 23a and 25e, which are formed at the first and second side plates 22 and 23 and the flange portion 25b of the hub member 25, respectively. Further, the seat members 26 are provided between the end portions of the first, second and third openings 22a, 23a and 25e on the one hand and end portions of the coil spring 27 on the other hand.

The coil spring 27 is accommodated within the first, second and third openings 22a, 23a and 25e, which are formed at the first and second side plates 22 and 23 and the flange portion 25b of the hub member 25, respectively. Further, the coil spring 27 contacts the seat members 26, which are provided at both end portions of the coil spring 27, respectively. The coil spring 27 is compressed when the first and second side plates 22 and 23 rotate relative to the hub member 25 in order to absorb the shock generated due to rotational differences (i.e. a relative rotation) between the first and second side plates 22 and 23 on the one hand and the hub member 24 on the other hand.

The first thrust member 28 supports the first side plate 22 at the radially inner circumferential end portion thereof so that the first side plate 22 is rotatable relative to the hub member 25. Further, the first thrust member 28 is formed so as to be portioned between the first side plate 22 and the flange portion 25b in the axial direction, so that the first thrust member 28 slidably contacts the first side plate 22 and the flange portion 25b. The first thrust member 28 is formed so as to be positioned also between a portion of the second plate 15 and a portion of the cylindrical portion 25a of the hub member 25 in the radial direction, so that the first thrust member 28 slidably contacts the second plate 15 and the cylindrical portion 25a.

The second thrust member 29 supports the second side plate 23 at the radially inner circumferential end portion thereof so that the second side plate 23 is rotatable relative to the hub member 25. The second thrust member 29 is formed so as to be provided between the flange portion 25b and the second coned disc spring 30 in the axial direction, so that a portion of the thrust member 29 is biased towards the flange portion 25b and so that the second thrust member 29 slidably contacts the flange portion 25b.

The second coned disc spring 30 is a spring formed in a coned disc shape and is provided between the second thrust member 29 and the second side plate 23, so that the second coned disc spring 30 biases the second thrust member 29 towards the flange portion 25b of the hub member 25.

The first seal 31 is a member formed in a ring shape and seals the clearance formed between the cylindrical portion 25a of the hub member 25 and the second plate 15. More specifically, the seal 31 seals the clearance formed between the cylindrical portion 25a of the hub member 25 and the second plate 15 in order to prevent the oil (including the grease), which is accommodated within the space formed between the second and third plates 15 and 16, from leaking therefrom.

The second seal 32 is a member formed in a ring shape and seals the clearance formed between the cylindrical portion 25a of the hub member 25 and the third plate 16. More specifically, the seal 32 seals the clearance formed between the cylindrical portion 25a of the hub member 25 and the third plate 16 in order to prevent the oil (including the grease), which is accommodated within the space formed between the second and third plates 15 and 16, from leaking therefrom, together with the first seal 31.

An operation of the hysteresis portion 3b of the damper device 3 according to the first embodiment will be described below in accordance with the attached drawings. Illustrated in FIG. 4 is a schematic diagram for explaining the operation of the hysteresis portion 3b of the damper device 3 according to the first embodiment. More specifically, a case where a torsion is not generated between the side plate and the hub member is illustrated in FIG. 4A. On the other hand, a case where the torsion is generated between the side plate and the hub member is illustrated in FIG. 4B.

In the case where the torsion is not generated between the second side plate 23 and the hub member 25 as illustrated in FIG. 4A, the intermediate members 24 contact the second friction surface 23b of the second side plate 23 when the damper device 3 (see FIG. 1) rotates and the centrifugal force is generated.

Referring to FIG. 4B, in the case where the torsion is generated between the second side plate 23 and the hub member 25, the first tapered surfaces 24c of the intermediate members 24 contact the corresponding second tapered surfaces 25d of the hub member 25 while the intermediate members 24 remain being in contact with the second friction surface 23b of the second side plate 23 by the centrifugal force. Accordingly, the torsional angle and the torsional speed increase, thereby increasing the force for the second tapered surfaces 25d of the hub member 25 outwardly pressing the intermediate members 24 in the radial direction. As a result, a friction resistance generated between the second friction surface 23b of the second side plate 23 and the first friction surface 24a of the intermediate members 24 increases, thereby increasing the hysteresis torque. When the torsion is resolved (absorbed), the hysteresis portion 3b returns to the state as illustrated in FIG. 4A.

The first tapered surfaces 24c and the second tapered surfaces 25d have a function of changing a direction of the force (i.e. a direction of an action of the force). Therefore, as long as the first tapered surfaces 24c and the second tapered surfaces 25d have such function, the tapered surfaces does not limited to have a flat surface, but the tapered surfaces may be formed in a substantially tapered shape so as to have a curved shaped surface (see FIG. 5).

According to the first embodiment, only in a case where the torsional speed between the rotational shafts 2 and 4 (see FIG. 1) is great and the torsional angle between the rotational shafts 2 and 4 is great when the engine 1 is started or when the vibration is generated, the hysteresis torque generated at the hysteresis portion 3b becomes great. On the other hand, in a case where the torsional speed between the rotational shafts 2 and 4 is low and the torsional angle between the rotational shafts 2 and 4 is small when the vehicle is normally driven, the damper device 3 according to the first embodiment does not generate the hysteresis torque. Therefore, noise is effectively reduced. More specifically, the noise is effectively reduced especially in a case where the damper device 3 is adapted to a large-sized vehicle. Furthermore, because the clearance is ensured between each of the intermediate members 24 and the second side plate 23 in the radial direction and in the axial direction of the damper device 3, and between each of the intermediate members 24 and the hub member 25 in the radial direction, in the circumferential direction and in the axial direction of the damper device 3, the damper device 3 enhances stability in slide resistance. The intermediate members 24 contact the second friction surface 23b of the second side plate 23, which is provided at an outer side relative to the intermediate members 24 in the radial direction, when the centrifugal force is generated. Therefore, the hysteresis torque is generated when the torsion is generated between the rotational shaft 2 of the engine 1 and the rotational shaft 4 of the clutch device 5 and when necessary in order to absorb the torsion (i.e. the relative rotation) generated when the rotational shaft 2 of the engine 1 and the rotational shaft 4 of the clutch device 5 rotate relative to each other. Furthermore, because the second friction surface 23b of the second side plate 23 is formed by pressing, the manufacturing costs are reduced, and the damper device 3 is reduced in size in the radial direction thereof. Moreover, because the hysteresis portion 3b is provided at the outer side relative to the torsion coil portion 3a in the radial direction, the oil is supplied to any necessary portions in the case where the damper device 3 of the first embodiment is adapted to a wet-type damper device 3, thereby enhancing abrasion resistance and stability in operation.

Second Embodiment

A second embodiment of a damper device will be described below in accordance with the attached drawings. Illustrated in FIG. 6 is a partial cross-sectional diagram schematically illustrating a configuration example of a hysteresis portion of the damper device according to the second embodiment.

The damper device 3 according to the second embodiment is configured so that the hysteresis torque is gradually increased in response to the torsional angle generated between the second side plate 23 and the hub member 25. For example, as illustrated in FIG. 6, the hysteresis portion 3b is configured so that a clearance, which is formed between the inner protrusion 24b of an intermediate member 24A (i.e. the intermediate member 24) on the one hand, which is provided within a recessed portion formed between first and second outer protrusions 25c1 and 25c2 (i.e. the outer protrusions 25c, a second protrusion), and the neighboring first and second outer protrusions 25c1 and 25c2 on the other hand in the circumferential direction, is formed to be relatively small and so that a clearance between the inner protrusion 24b of an intermediate member 24B (i.e. the intermediate member 24) on the one hand, which is provided within a recessed portion formed between the second outer protrusion 25c2 and a third outer protrusion 25c3 (i.e. the outer protrusion 25c), and the neighboring second and third outer protrusions 25c2 and 25c3 on the other hand in the circumferential direction is formed to be relatively large when comparing to the clearance formed between the intermediate member 24A and the neighboring first and second outer protrusions 25c1 and 25c2. Other configurations of the damper device 3 according to the second embodiment are substantially same as the damper device 3 of the first embodiment.

The clearance formed between the inner protrusion 24b of the intermediate members 24A and the neighboring outer protrusions 25c1 and 25c2 of the hub member 25 in the circumferential direction is set so that an angle (a backlash angle) becomes equivalent to a sum of a first angle α and a second angle β (α+β), each of which is formed between a first line, which connects a first intersection, at which a predetermined circle having a rotational axis of the second side plate 23 and the hub member 25 as a center point intersects with the first tapered surface 24c of the intermediate member 24A, and the rotational axis, and a second line, which connects a second intersection, at which the predetermined circle intersects with the second tapered surface 25d of the hub member 25, and the rotational axis. Similarly, the clearance formed between the inner protrusion 24b of the intermediate member 24B and the neighboring outer protrusions 25c2 and 25c3 of the hub member 25 in the circumferential direction is set so that an angle (a backlash angle) becomes equivalent to a sum of a third angle γ and a fourth angle ε (γ+ε), each of which is formed between the first line, which connects the first intersection, at which the predetermined circle having the rotational axis of the second side plate 23 and the hub member 25 as the center point intersects with the first tapered surface 24c of the intermediate member 24B, and the rotational axis, and the second line, which connects the second intersection, at which the predetermined circle intersects with the second tapered surface 25d of the hub member 25, and the rotational axis. The backlash angle of the intermediate member 24A (i.e. α+β) is set to be different from the backlash angle of the intermediate members 24B (i.e. γ+ε).

In the second embodiment, two different clearance widths are ensured. However, the present invention is not limited to the configuration described in the second embodiment. For example, three or more different clearance widths may be ensured. Furthermore, in order to ensure different clearance widths, a distance between the first outer protrusion 25c1 and the second outer protrusion 25c2 of the hub member 25 may be set to be different from a distance between the second outer protrusion 25c2 and the third outer protrusion 25c3 while the inner protrusion 24b of the intermediate member 24A and the inner protrusion 24b of the intermediate member 24B are formed to have the same configuration and size. Alternatively, a width of the inner protrusion 24b of the intermediate member 24A in the circumferential direction thereof is set to be different from the inner protrusion 24b of the intermediate member 25B in the circumferential direction thereof while the distance between the first outer protrusion 25c1 and the second outer protrusion 25c2 of the hub member 25 is set to be the same as the distance between the second outer protrusion 25c2 and the third outer protrusion 25c3 of the hub member 25. Additionally, the neighboring intermediate members, for example, the neighboring intermediate members 24A and 24B, are provided to the hysteresis portion 3b in the circumferential direction while the neighboring intermediate members 24A and 25B are spaced away from each other.

In a case where a slight torsion is generated between the second side plate 23 and the hub member 25, the first friction surface 24a of the intermediate member 24A frictionally engages with the second friction surface 23b of the second side plate 23. However, in this case, the first friction surface 24a of the intermediate member 24B does not frictionally engage with the second friction surface 23b of the second side plate 23. As a result, relatively low hysteresis torque is generated.

On the other hand, in a case where a great torsion is generated between the second side plate 23 and the hub member 25, the first friction surface 24a of the intermediate member 24A frictionally engages with the second friction surface 23b of the second side plate 23, and the first friction surface 24a of the intermediate member 24B frictionally engages with the second friction surface 23b of the second side plate 23. Accordingly, relatively great hysteresis torque is generated.

According to the second embodiment, in addition to advantages and effects similar to the first embodiment, because the clearance ensured between the intermediate member 24A and the neighboring outer protrusions 25c1 and 25c2 of hub member 25 is set to be different from the clearance ensured between the intermediate member 24B and the neighboring outer protrusions 25c2 and 25c3 of the hub member 25, the damper device 3 of the second embodiment further disperses the shock, which is generated when the first tapered surfaces 24c of the intermediate member 24 and the second tapered surfaces 25d of the hub member 25 contact each other. Accordingly, the damper device 3 of the second embodiment generates less noise.

Third Embodiment

A third embodiment of a damper device will be described below in accordance with the attached drawings. Illustrated in FIG. 7 is a partial cross-sectional diagram schematically illustrating a configuration example of a hysteresis portion of the damper device according to the third embodiment.

According to the third embodiment, the hysteresis portion 3b includes intermediate members 34, each of which is formed in a shape so as to straddle the corresponding outer protrusion 25c of the hub member 25. Other configurations of the damper device 3 according to the third embodiment are similar to the damper device 3 of the first and second embodiments.

The intermediate members 34 are provided to the hysteresis portion 3b in the circumferential direction in a manner where the neighboring intermediate members 34 are spaced away from each other in corresponding recessed portions formed by the neighboring outer protrusions 25c of the hub member 25. Hereinafter, because the intermediate members 34 have the same configuration and operation, the configuration and the operation of the intermediate members 34 will be explained below with one of the intermediate members 34 as an example. The intermediate member 34 is provided to the hysteresis portion 3b so that a clearance (e.g. play (backlash width) which is equal to or greater than 0.3 mm) is formed between the intermediate member 34 on the one hand and the end portion of the flange portion 25b of the hub member 25 and the second friction surface 23b of the second side plate 23 on the other hand in the radial direction. An outer circumferential surface of the intermediate member 34, which faces the second side plate 23 and which extends along the second friction surface 23b of the second side plate 23, serves as a first friction surface 34a. The first friction surface 34a of the intermediate member 34 generates the friction with the second friction surface 23b of the second side plate 23 by the intermediate member 34 being pressed against the second friction surface 23b when the second side plate 23 and the hub member 25 rotate relative to each other, thereby generating the hysteresis torque. The intermediate member 34 includes a base portion and first and second protrusions 34b1 and 34b2 (the first protrusions). The first and second protrusions 34b1 and 34b2 are provided at end portions of the intermediate member 34, respectively, in the circumferential direction thereof so as to inwardly protrude from an inner circumferential surface of the base portion of the intermediate member 34 in the radial direction. Hereinafter, the first and second protrusions are referred to as a first inner protrusion 34b1 and a second inner protrusion 34b2, respectively. Additionally, the inner circumferential surface of the base portion of the intermediate member 34 is a surface that faces the flange portion 25b of the hub member 25. The first and second inner protrusions 34b1 and 34b2 are provided at the intermediate member 34 so as to form a clearance (e.g. play (backlash width) which is equal to or greater than 0.3 mm) between surfaces of the first and second inner protrusions 34b1 and 34b2 facing each other on the one hand and the surfaces of the neighboring outer protrusions 25c of the hub member 25 on the other hand in the circumferential direction thereof on the one hand. The surfaces of the first and second inner protrusions 34b1 and 34b2 facing each other serves as first tapered surfaces 34c1 and 34c2 (the first tapered portions), which correspond to the second tapered surfaces 25c of the neighboring outer protrusions 25c, respectively. One of the first tapered surfaces 34c1 and 34c2 interacts with the corresponding second tapered surface 25d of the hub member 25 when the second side plate 23 and the hub member 25 rotate relative to each other, thereby outwardly displacing (pressing) the entire intermediate member 34 in the radial direction. Other configurations of the intermediate member 34 are similar to the intermediate member 24 of the first and second embodiment.

According to the third embodiment, advantages and effects similar to the first embodiment are achieved.

Fourth Embodiment

A fourth embodiment of a damper device will be described below in accordance with the attached drawings. Illustrated in FIG. 8 is a partial cross-sectional diagram schematically illustrating a configuration example of a hysteresis portion of the damper device according to the fourth embodiment.

According to the fourth embodiment, the hysteresis portion 3b includes an intermediate member 36, which is configured so that the entire intermediate member 36 moves and so that all of tapered surfaces of the intermediate member 36 move in conjunction when the second side plate 23 and the hub member 25 rotate relative to each other. Other configurations of the damper device 3 according to the fourth embodiment are similar to the damper device 3 of the first embodiment.

The intermediate member 36 is formed in a circular shape. The intermediate member 36 is provided at the hysteresis portion 3b so that a clearance (e.g. play (backlash width) which is equal to or greater than 0.3 mm) is formed between the intermediate member 36 on the one hand and the end portion of the flange portion 25b of the hub member 25 and the second friction surface 23b of the second side plate 23 on the other hand in the radial direction. Furthermore, the intermediate member 36 is provided between the first and second side plates 22 and 23 (see FIG. 1) so as to ensure a clearance (e.g. play (backlash width) which is equal to or greater than 0.3 mm) between the intermediate member 36 on the one hand and the first and second side plates 22 and 23 on the other hand in the axial direction. An outer circumferential surface of the intermediate member 36, which faces the second side plate 23 and which extends along the second friction surface 23b of the second side plate 23, serves as a first friction surface 36a, so that the first friction surface 36a is formed in a cylindrical shape. The first friction surface 36a of the intermediate member 36 generates the friction with the second friction surface 23b of the second side plate 23 by the intermediate member 36 being pressed against the second friction surface 23b when the second side plate 23 and the hub member 25 rotate relative to each other, thereby generating the hysteresis torque. The intermediate member 36 includes a base portion and plural protrusions 36b, which inwardly protrude from an inner circumferential surface of the base portion of the intermediate member 36 in the radial direction, at predetermined positions. The protrusions 36b of the intermediate member 36 will be hereinafter referred to as inner protrusions 36b. Additionally, the inner circumferential surface of the base portion of the intermediate member 36 refers to a surface that faces the hub member 25. The inner protrusions 36b are provided at the intermediate member 36 so that each of the inner protrusions 36b is accommodated within a space formed by the neighboring outer protrusions 25c of the hub member 25 while ensuring a clearance (e.g. play (backlash width) which is equal to or greater than 0.3 mm) between each of the inner protrusions 36b and the neighboring outer protrusions 25c in the circumferential direction. Side surfaces of the inner protrusions 36b in the circumferential direction serve as first tapered surfaces 36c (the first tapered portion), which correspond to the second tapered surfaces 25d of the neighboring outer protrusions 25c, respectively. The first tapered surfaces 36c of the intermediate member 36 interact with the second tapered surfaces 25d of the hub member 25 when the second side plate 23 and the hub member 25 rotate relative to each other, thereby outwardly displacing (pressing) the entire intermediate member 36 in the radial direction. As is the case with the first embodiment, an angle of each of the first tapered surfaces 36c of the intermediate member 36 (i.e. an angle formed between each of the first tapered surfaces 36c and a tangent line at a point where the tapered surface 36c intersects with the inner circumferential surface of the base portion of the intermediate member 36) is set in the range between 12 degrees to 60 degrees. The oil (including the grease) is provided so as to lubricate the components of the hysteresis portion 3b including the intermediate members 36 in order to reduce the possibility of the occurrence of the excessive friction. In this embodiment, the light resin is used for the intermediate members 36. More specifically, the light resin having the specific gravity equal to or less than twice as much as the specific gravity of the oil around the intermediate members 36 may be used. Furthermore, the intermediate member 36 may be formed so that a thickness B thereof in the radial direction between the inner protrusions 26b (i.e. the thickness B of portions of the intermediate member 36 corresponding to the outer protrusions 25c of the hub member 25) is set to be half of a thickness A of the intermediate member 36, at which the inner protrusions 36b are provided, in the radial direction. In this embodiment, a recessed portion 36d is formed at the outer surface of the intermediate member 36 facing the second side plate 23 at a portion corresponding to the inner protrusion 36b in order to reduce rigidity of the intermediate member 36. In this embodiment, the recessed portion 36d is provided at a portion of the outer circumferential direction corresponding to one of the plural inner protrusions 36b. However, the present invention is not limited to this configuration, but any desired number of the recessed portions 36d may be provided at portions corresponding to the inner protrusions 36d of the intermediate member 36.

Additionally, the intermediate member 36 is formed so that the inner protrusions 36b are integrally formed. However, the present invention is not limited to this configuration example. For example, the intermediate member 36 may be configured so that plural pieces contact one another at surfaces thereof in the circumferential direction. Even in this case, the first tapered surfaces 36c of the intermediate member 36 are integrally moved in conjunction with the intermediate member 36 (in response to the movement of the intermediate member 36) when the second side plate 23 and the hub member 25 rotate relative to each other.

According to the fourth embodiment, in addition to advantages and effects similar to the first embodiment, because each of the first tapered surfaces 36c moves in conjunction with each other in response to the movement of the intermediate member 36, chances of an occurrence of misalignment between each component may be reduced. Furthermore, chances of the intermediate member 36 being dragged due to the centrifugal force may be reduced. Additionally, because the intermediate member 36 is integrally formed, a number of components used for the damper device 3 is reduced, thereby facilitating assembling of the damper device 3.

Fifth Embodiment

A fifth embodiment of a damper device will be described below in accordance with the attached drawings. Illustrated in FIG. 9A is a partial cross-sectional diagram schematically illustrating a configuration example of a hysteresis portion of the damper device according to the fifth embodiment. Illustrated in FIG. 9B is a partial cross-sectional diagram schematically illustrating the configuration example of the hysteresis portion of the damper device taken along line IXB-IXB in FIG. 9A.

According to the damper device 3 of the fifth embodiment, the hysteresis portion 3b includes a hub member 38 (the second plate member). The hub member 38 includes a flange portion 38a. Plural outer protrusions 38b and second tapered surfaces 38c (the second tapered portion) are formed by pressing at an end portion of the flange portion 38a. Other configurations of the hysteresis portion 3b are similar to the hysteresis portion 3b of the first embodiment.

According to the fifth embodiment, in addition to advantages and effects similar to the first embodiment, costs for manufacturing the hub member 38 are further reduced when comparing to the damper device 3 of the first embodiment. Further, the damper device 3 of the fifth embodiment may be further downsized in the radial direction thereof.

Sixth Embodiment

A sixth embodiment of a damper device will be described below in accordance with the attached drawings. Illustrated in FIG. 10A is a partial cross-sectional diagram schematically illustrating a configuration example of a hysteresis portion of the damper device according to the sixth embodiment. Illustrated in FIG. 10B is a partial cross-sectional diagram schematically illustrating the configuration example of the hysteresis portion of the damper device taken along line XB-XB in FIG. 10A. Further, illustrated in FIG. 11 is a side view of an intermediate member for explaining a configuration example of the intermediate member of the damper device according to the sixth embodiment.

In the first, second, third, fourth and fifth embodiments, the intermediate member(s) (24, 24A, 24B, 34, 36) include(s) the first tapered surfaces (24c, 34c1, 34c2, 36c) at the inner circumferential surface(s) of the base portion(s) of the intermediate member(s). Further, the outer circumferential surface(s) of the intermediate member(s) (24, 24A, 24B, 36) serve(s) as the first friction surface(s) (24a, 34a, 36a). However, in the sixth embodiment, a first tapered surface 41c (the first tapered portion) is formed at an outer circumferential surface of each intermediate member 41. Further, in the sixth embodiment, an inner circumferential surface of each intermediate member 41 serves as a first friction surface 41a. Shapes and sizes of a second side plate 40 (i.e. the first plate member) and a hub member 42 (i.e. the second plate member) are determined so as to correspond to the shape and size of the intermediate members 41. Other configurations of the hysteresis portion 3b are similar to the hysteresis portion 3b of the first embodiment.

The second side plate 40 has a stepped shape so as to form a recessed portion at an outer circumferential portion of the second side plate 40 when being viewed from a side thereof (a direction orthogonal to the axial direction of the damper device 3). Accordingly, the second side plate 40 includes a cylindrical portion at the stepped portion so as to extend in the axial direction. Further, the second side plate 40 includes plural protrusions 40a, which inwardly protrude in the radial direction at the stepped portion of the second side plate 40 (i.e. the plural portions 40a inwardly protrude in the radial direction from an inner surface of the cylindrical portion (the stepped portion) extending in the axial direction). Hereinafter, the protrusions 40a of the second side plate 40 are referred to as inner protrusions 40a. The inner protrusions 40a are provided at the second side plate 40 so as to correspond to respective recessed portions formed between outer protrusions 41b of the neighboring intermediate member 41 and so as to form a clearance (e.g. play (backlash width) which is equal to or greater than 0.3 mm) between each of the inner protrusions 40a and the outer protrusions 41b of the neighboring intermediate members 41 in the circumferential direction. Each of the outer protrusions 41b is provided at each of the intermediate members 41 so as to outwardly protrude therefrom in the radial direction. Side surfaces of each of the inner protrusions 40a in the circumferential direction serve as second tapered surfaces 40b (the second tapered portion) corresponding to the first tapered surfaces 41c of the neighboring outer protrusion 41b, respectively. The inner protrusions 40a and the second tapered surfaces 40b are formed by pressing. The second tapered surfaces 40b of the second side plate 40 interact with the first tapered surfaces 41c of the intermediate members 41 when the second side plate 40 and the hub member 42 rotate relative to each other, thereby inwardly pressing the entire intermediate members 41 in the radial direction. An angle of each of the second tapered surfaces 40b (i.e. an angle formed between the second tapered surface 40b and a tangent line at a point where the second tapered surface 40b intersects with the inner circumferential surface of the cylindrical portion of the second side plate 40) is set in the range between 12 degrees to 60 degrees. Similarly, an angle of each of the first tapered surfaces 41c is set in the range between 12 degrees to 60 degrees. Other configurations of the second side plate 40 are similar to the second side plate 23 of the first embodiment.

The intermediate members 41 are components of the hysteresis portion 3b. Further, each of the intermediate members 41 is formed in an arc shape. The intermediate members 41 are provided at the hysteresis portion 3b in a circumferential direction thereof so that each of the intermediate member 41 is spaced away from the respective neighboring intermediate members at a space formed between the corresponding inner protrusion 40a of the second side plate 40 and a second friction surface 42b of the hub member 42. Hereinafter, a detailed description of the intermediate members 42 will be given with one of the intermediate members 42 as an example. The intermediate member 42 is provided between the inner circumferential surface of the cylindrical portion of the second side plate 40 at the stepped portion and the second friction surface 42b of the hub member 42 so as to ensure a clearance (e.g. play (backlash) which is equal to or greater than 0.3 mm) between the intermediate member 42 on the one hand and the inner circumferential surface of the cylindrical portion of the second side plate 40 and the second friction surface 42b of the hub member 42 on the other hand in the radial direction. Furthermore, the intermediate member 42 is provided between the first side plate 22 and the second side plate 40 so as to ensure a clearance (e.g. play (backlash) which is equal to or greater than 0.3 mm) between the intermediate member 42 on the one hand and the first and second side plate 22 and 40 on the other hand in the axial direction. An inner circumferential surface of the intermediate member 41, which faces the hub member 42 and which extends along the second friction surface 42b of the hub member 42, serves as the first friction surface 41a. The first friction surface 41a of the intermediate member 41 generates the friction with the second friction surface 42b of the hub member 42 by the intermediate member 41 being pressed against the second friction surface 42b of the hub member 42 when the second side plate 40 and the hub member 42 rotate relative to each other, thereby generating the hysteresis torque. The intermediate member 41 includes a base portion and the outer protrusion 41b, which outwardly protrudes from a substantially intermediate portion of the outer circumferential surface of the base portion of the intermediate member 41 in the radial direction. The outer protrusion 41b is provided at the intermediate member 41 so as to correspond to a space formed between the neighboring inner protrusions 40a of the second side plate 40 and so as to ensure a clearance (e.g. play (backlash) which is equal to or greater than 0.3 mm) between the outer protrusion 41b of the intermediate member 41 and the neighboring inner protrusions 40a of the second side plate 40 in the circumferential direction. Side surfaces of each of the outer protrusions 41b in the circumferential direction serve as the first tapered surfaces 41c, which corresponds to the second tapered surfaces 40b of the neighboring inner protrusions 40a in the circumferential direction. The first tapered surfaces 41c interact with the second tapered surfaces 40b of the second side plate 40 when the hub member 42 and the second side plate 40 rotate relative to each other, thereby inwardly displacing (pressing) the entire intermediate member 41 in the radial direction. As is mentioned above, the angle of each of the first tapered surfaces 41c (the angle formed between the first tapered surface 41c and a tangent line a the point where the first tapered surface 41c intersects with the outer circumferential surface of the base portion of the intermediate member 41) is set in the range between 12 degrees to 60 degrees (see FIG. 11). In a case where the angle of each of the first tapered surfaces 41c is set so as to be smaller than 12 degrees, the intermediate member 41 may be caught between the stepped portion of the second side plate 40 and the second friction surface 42b of the hub member 42, thereby generating an excessive hysteresis torque. If the excessive hysteresis torque is generated, it may become difficult to resolve (absorb) the hysteresis torque. On the other hand, in a case where the angle of each of the first tapered surfaces 41c is set so as to be greater than 60 degrees, a force necessary for pressing the intermediate member 41 towards the second friction surface 42b of the hub member 42 may become insufficient, which may result in generating insufficient hysteresis torque. The oil (including the grease) is provided so as to lubricate the components of the hysteresis portion 3b including the intermediate members 41 in order to reduce the possibility of the occurrence of the excessive friction. In this embodiment, the light resin is used for the intermediate members 41. More specifically, the light resin having the specific gravity less than twice as much as the specific gravity of the oil around the intermediate members 41 is used. Accordingly, the damper device 3 may stabilize the hysteresis characteristic with less influence of the centrifugal force.

The second friction surfaces 42b is formed at the outer circumferential end portion of the flange portion 42a of the hub member 42 by pressing. The second friction surface 42b is formed in a cylindrical shape. The second friction surface 42b generates the friction with the first friction surfaces 41a of the intermediate members 41 by the intermediate members 41 being pressed against the hub member 42 when the hub member 42 and the second side plate 40 rotate relative to each other, thereby generating the hysteresis torque. Other configurations of the hub member 42 are similar to the hub member 25 of the first embodiment.

The intermediate members 41 are provided to the hysteresis portion 3b in the circumferential direction so that pieces (i.e. the intermediate members 41) are spaced away from each other (see FIG. 10). However, the present invention is not limited to this configuration. For example, the intermediate members 41 may be modified so as to be integrally combed (i.e. plural intermediate members 41) as in the case of the fourth embodiment so as to integrally form the intermediate member 41 (see FIG. 8).

According to the sixth embodiment, the damper device 3 is less likely to be influenced by the centrifugal force. Therefore, the generation of the hysteresis torque is stabilized as targeted. Furthermore, the damper device 3 generates relatively great hysteresis torque in the case where the torsional speed between the rotational axis 2 of the engine 1 and the rotational axis 4 of the clutch device 5 is low (i.e. in a case where the hysteresis torque is necessary). On the other hand, in the case where the torsional speed between the rotational axis 2 of the engine 1 and the rotational axis 4 of the clutch device 5 is great (i.e. in a case where the hysteresis torque is not always necessary), the damper device 3 generates relatively low hysteresis torque.

Seventh Embodiment

A seventh embodiment of a damper device will be described below in accordance with the attached drawings. Illustrated in FIG. 12 is a partial cross-sectional diagram schematically illustrating a configuration example of a hysteresis portion of the damper device according to the seventh embodiment. Illustrated in FIG. 13 is a side view of an intermediate member for explaining a configuration example of the intermediate member of the damper device according to the seventh embodiment.

According to the damper device 3 of the seventh embodiment, the hysteresis portion 3b includes intermediate members 44, each of which is formed so as to straddle the corresponding inner protrusion 40a of the second side plate 40. Other configurations of the hysteresis portion 3b are similar to the hysteresis portion 3b of the sixth embodiment.

The intermediate members 44 are provided to the hysteresis portion 3b in the circumferential direction so that each of the intermediate members 44 is spaced away from each of the neighboring intermediate members 44 at a space formed by the neighboring inner protrusions 40a of the second side plate 40. Hereinafter, the detailed description of the intermediate members 44 will be given with one of the intermediate members 44 as an example, because the intermediate members 44 are formed to have the same configuration and size. The intermediate member 44 is provided between the corresponding inner protrusion 40a of the second side plate 40 and the second friction surface 42b of the hub member 42 so as to form a clearance (e.g. play (backlash) which is equal to or greater than 0.3 mm) between the intermediate member 44 on the one hand and the inner protrusion 40a of the second side plate 40 and the second friction surface 42b of the hub member 42 on the other hand in the radial direction. An inner circumferential surface of the intermediate member 44, which faces the hub member 42 and which extends along the second friction surface 42b of the hub member 42, serves as a first friction surface 44a. The first friction surface 44a of the intermediate member 44 generates the friction with the second friction surface 42b of the hub member 42 by the intermediate member 44 being pressed against the second friction surface 42b of the hub member 42 when the hub member 42 and the second side plate 40 rotate relative to each other, thereby generating the hysteresis torque. The intermediate member 44 includes a base portion and protrusions 44b1 and 44b2, which outwardly protrude from an outer circumferential surface of the base portion of the intermediate member 44 at both end thereof in the circumferential direction, respectively. Hereinafter, the protrusions 44b1 and 44b2 will be referred to as outer protrusions 44b1 and 44b2, respectively.

The outer protrusions 44b1 and 44b2 are formed at the intermediate member 44 so as to form a clearance (e.g. play (backlash) which is equal to or greater than 0.3 mm) between the outer protrusions 44b1 and 44b2 on the one hand and the corresponding inner protrusions 40a of the second side plate 40 on the other hand in the circumferential direction. Side surfaces of the outer protrusions 44b1 and 44b2 facing each other in the circumferential direction serve as first tapered surfaces 44c (the first tapered portions) corresponding to the second tapered surfaces 40b of the corresponding inner protrusion 40a of the second side plate 40. Each of the first tapered surfaces 44c of the intermediate member 44 interacts with the corresponding second tapered surface 40b (i.e. the corresponding second tapered surface 40b that faces the first tapered surface 44c) when the second side plate 40 and the hub member 42 rotate relative to each other, thereby outwardly displacing (pressing) the entire intermediate member 44. As is the case with the sixth embodiment, an angle of each of the first tapered surfaces 44c (an angle formed between the tapered surface 44c and a tangent line at a point where the tapered surface 44c intersects with the outer circumferential surface of the base portion of the intermediate member 44) is set in the range between 12 degrees to 60 degrees (see FIG. 13). Other configurations of the intermediate member 44 are similar to the intermediate member 42 of the sixth embodiment.

According to the seventh embodiment, advantages and effects similar to the sixth embodiment are achieved.

Eighth Embodiment

An eighth embodiment of a damper device will be described below in accordance with the attached drawings. Illustrated in FIG. 14 is a partial cross-sectional diagram schematically illustrating a configuration example of the damper device according to the eighth embodiment taken along an axial line of the damper device. Illustrated in FIG. 15 is a partial cross-sectional diagram schematically illustrating a configuration example of a hysteresis portion of the damper device according to the eighth embodiment taken along line XV-XV in FIG. 14 and when being viewed in the axial direction of the damper device.

In the damper device 3 according to the sixth and seventh embodiments, the hysteresis portion 3b (see e.g. FIGS. 10 and 12) is provided at the outer side relative to the damper portion 3a (see FIG. 1) in the radial direction. However, in the eighth embodiment, the hysteresis portion 3b is provided to the damper device 3 at an inner side relative to the damper device 3a in the radial direction. The damper device 3 of the eighth embodiment has similar configuration as the damper device 3 of the first embodiment. Therefore, only the differences between the first embodiment and the eighth embodiment will be described below.

The damper device 3 includes a second plate 46, a third plate 47, a first side plate 48 (the first plate member), a second side plate 49 (the first plate member), first intermediate members 50, second intermediate members 51, a hub member 52 (the second plate member), a first thrust member 53, a second thrust member 54, a second coned disc spring 55, the first seal 31 and the second seal 32. As is mentioned above, because the damper device 3 according to the eighth embodiment has the similar configuration as the damper device 3 of the first embodiment, only the difference between the first embodiment and the eighth embodiment are mentioned here.

The second plate 46 is formed in a circular shape. The second plate 46 extends towards a cylindrical portion 52a (a second extending portion) of the hub member 52 so as to ensure a clearance between a radially inner circumferential end portion of the second plate 46 and the hub member 52 in the radial direction. Further, the second plate 46 fittedly contacts the first seal 31 at the radially inner circumferential end portion of the second plate so as to close the clearance formed between the second plate 46 and the hub member 52 in the radial direction, so that the oil (including the grease) accommodated within a space formed by the second and third plates 46 and 47 does not leak therefrom. Other configurations of the second plate 46 are similar to the second plate 15 of the first embodiment (see FIG. 1).

The third plate 47 is formed in a circular shape. The third plate 47 extends towards the cylindrical portion 52a of the hub member 52 so as to ensure a clearance between a radially inner circumferential portion of the third plate 46 and the hub member 52 in the radial direction. Further, the third plate 47 fittedly contacts the second seal 32 at the radially inner circumferential end portion of the third plate 46 so as to close the clearance formed between the third plate 47 and the hub member 52 in order to seal the space formed between the second and third plates 46 and 47 together with the first seal 31 so that the oil (including the grease) accommodated within the space formed by the second and third plates 46 and 47 does not leak therefrom. Other configurations of the third plate 47 are similar to the third plate 16 of the first embodiment (see FIG. 1).

The first side plate 48 is formed in a circular shape. A radially inner circumferential end portion of the first side plate 48 is bent towards a flange portion 52b so that the radially inner circumferential end portion of the first side plate 48 extends towards the flange portion 52b in the axial direction of the damper device 3. Accordingly, the inner circumferential end portion of the first side plate 48 forms a cylindrical portion. The cylindrical portion (i.e. the radially inner circumferential end portion) of the first side plate 48 is positioned between a first protruding portion 52c1 (a first extending portion) of the hub member 52 and a cylindrical portion 52a of the hub member 52, therefore, the cylindrical portion serves as an intermediate extending portion. Further, plural protrusions 48b, which extend outwardly in the radial direction, are provided at an end portion of the radially inner circumferential end portion of the first side plate 48 facing the flange portion 52b of the hub member 52. Hereinafter, the protrusions 48b will be referred to as outer protrusions 48b. Each of the outer protrusions 48b is provided at the first side plate 48 so as to form a clearance (play, backlash) between each of the outer protrusions 48b and inner protrusions 50b of the neighboring first intermediate members 50 in the circumferential direction at a space formed between the neighboring inner protrusions 50b. Hereinafter, the detailed description of the outer protrusions 48b will be given with one of the outer protrusions 48b as an example, because the outer protrusions 48b have the same configuration and operation. Side surfaces of the outer protrusion 48b in the circumferential direction serve as second tapered surfaces 48c (the second tapered portions), which correspond to first tapered surfaces 50c (first tapered portions) of the neighboring inner protrusions 50b in the circumferential direction. The outer protrusions 48b and the second tapered surfaces 48c of the first side plate 48 are formed by pressing. The second tapered surfaces 48c of the first side plate 48 interact with the first tapered surfaces 50c of the corresponding first intermediate members 50 when the first side plate 48 and the hub member 52 rotate relative to each other, thereby outwardly pressing the entire intermediate members 50 in the radial direction. An angle of each of the second tapered surfaces 48c of the first side plate 48 (i.e. an angle formed between the second tapered surface 48c and a tangent line at a point where the second tapered surface 48c intersects with an outer circumferential surface of the cylindrical portion of the first side plate 48) is set in the range between 12 degrees to 60 degrees. Similarly, an angle of each of the first tapered surfaces 50c of the first intermediate member 50 is set in the range between 12 degrees to 60 degrees. The first side plate 48 includes a first opening 48a at a substantially intermediate portion thereof in the radial direction, so that the coil spring 27 and the seat members 26 are accommodated within the first opening 48a. Further, the first opening 48a is formed at the first side plate 48 so as to contact/detach with/from the seat members 26 at respective end portions of the first opening 48a in the radial direction thereof. Other configurations of the first side plate 48 are similar to the first side plate 22 of the first embodiment (see FIG. 1).

The second side plate 49 is formed in a circular shape. A radially inner circumferential end portion of the second side plate 49 is bent towards the flange portion 52b so that the radially inner circumferential end portion of the second side plate 49 extends towards the flange portion 52b in the axial direction of the damper device 3. Accordingly, the radially inner circumferential end portion of the second side plate 49 forms a cylindrical portion. The cylindrical portion (i.e. the radially inner circumferential end portion) of the second side plate 49 is positioned between a second extending portion 52c2 (the first extending portion) of the hub member 52 and the cylindrical portion 52a of the hub member 52, therefore, the cylindrical portion serves as the intermediate extending portion. Further, plural protrusions 49b, which extend outwardly in the radial direction, are provided at an end portion of the radially inner circumferential end portion of the second side plate 49 facing the flange portion 52b of the hub member 52. Hereinafter, the protrusions 49b will be referred to as outer protrusions 49b. Each of the outer protrusions 49b is provided at the second side plate 49 so as to form a clearance (play, backlash) between the outer protrusion 49b and inner protrusions 51b of the neighboring second intermediate members 51 in the circumferential direction at a space formed between the neighboring inner protrusions 51b. Hereinafter, the detailed description of the outer protrusions 49b will be given with one of the outer protrusions 49b as an example, because the outer protrusions 49b have the same configuration and operation. Side surfaces of the outer protrusion 49b in the circumferential direction serve as second tapered surfaces 49c (the second tapered portions), which correspond to first tapered surfaces 51c (the first tapered portions) of the neighboring inner protrusions 51b in the circumferential direction. The outer protrusions 49b and the second tapered surfaces 49c of the second side plate 49 are formed by pressing. The second tapered surfaces 49c of the second side plate 49 interact with the first tapered surfaces 51c of the second intermediate members 51 when the second side plate 49 and the hub member 52 rotate relative to each other, thereby outwardly pressing the entire second intermediate members 51 in the radial direction. An angle of each of the second tapered surfaces 49c of the second side plate 49 (i.e. an angle formed between the second tapered surface 49c and a tangent line at a point where the second tapered surface 49c intersects with an outer circumferential surface of the cylindrical portion of the second side plate 49) is set in the range between 12 degrees to 60 degrees. Similarly, an angle of each of the first tapered surfaces 51c of the second intermediate member 51 is set in the range between 12 degrees to 60 degrees. The second side plate 49 includes a second opening 49a at a substantially intermediate portion thereof in the radial direction, so that the coil spring 27 and the seat members 26 are accommodated within the second opening 49a. Further, the second opening 49a is formed at the second side plate 49 so as to contact/detach with/from the seat members 26 at respective end portions of the second opening 49a in the radial direction thereof. Other configurations of the second side plate 49 are similar to the second side plate 23 of the first embodiment (see FIG. 1).

The first intermediate members 50 are components of the hysteresis portion 3b. Each of the first intermediate members 50 is formed in an arc shape. The first intermediate members 50 are provided at the hysteresis portion 3b in the circumferential direction thereof so that each of the first intermediate members 50 is be spaced away from each of the neighboring first intermediate members 50 at a space formed between an outer circumferential surfaces of the outer protrusions 48b of the first side plate 48 and a second friction surface 52d of the hub member 52. Hereinafter, the detailed description of the first intermediate members 50 will be given with one of the first intermediate members 50 as an example, because the first intermediate members 50 have the same configuration and operation. The first intermediate member 50 is provided between the outer circumferential surface of the cylindrical portion of the first side plate 48 (i.e. the outer circumferential surface of the radially inner circumferential end portion of the first side plate 48 bent and extended towards the flange portion 52b of the hub member 52 in the axial direction) and the second friction surface 52d of the hub member 52 so as to ensure a clearance (e.g. play (backlash) which is equal to or greater than 0.3 mm) between the first intermediate member 50 on the one hand and the outer circumferential surface of the cylindrical portion of the first side plate 48 and the second friction surface 52d of the hub member 52 on the other hand in the radial direction. Furthermore, the first intermediate member 50 is provided between the flange portion 52b of the hub member 52 and the first side plate 48 so as to ensure a clearance (e.g. play (backlash) which is equal to or greater than 0.3 mm) between the first intermediate member 50 on the one hand and the flange portion 52b of the hub member 52 and the first side plate 48 on the other hand in the axial direction. An outer circumferential surface of the first intermediate member 50 serves as a first friction surface 50a, which faces the second friction surface 52d of the hub member 52 and which extends along the second friction surface 52d of the hub member 52. The first friction surface 50a of the first intermediate member 50 generates the friction with the second friction surface 52d of the hub member 52 by the first intermediate member 50 being pressed against the second friction surface 52d of the hub member 52 when the first side plate 48 and the hub member 52 rotate relative to each other, thereby generating the hysteresis torque. Further, the first intermediate member 50 includes a base portion and the inner protrusion 50b, which inwardly extends from a substantially intermediate portion of an inner circumferential surface of the base portion in the radial direction. The inner protrusion 50b is provided at the first intermediate member 50 so as to form a clearance (e.g. play (backlash) which is equal to or greater than 0.3 mm) between the inner protrusion 50b and the neighboring outer protrusions 48b in the circumferential direction at a space formed between the neighboring outer protrusions 48b. Side surfaces of the inner protrusion 50b of the first intermediate member 50 in the circumferential direction serve as the first tapered surfaces 50c, respectively, which correspond to the second tapered surfaces 48c of the outer protrusions 48b of the first side plate 48, respectively. The first tapered surfaces 50c interact with the corresponding second tapered surface 48c of the first side plate 48 when the first side plate 48 and the hub member 52 rotate relative to each other, thereby outwardly displacing (pressing) the entire first intermediate member 50 in the radial direction. As is the case with the first embodiment, an angle of each of the first tapered surfaces 50c of the first intermediate member 50 (an angle formed between the first tapered surface 50c and a tangent line at a point where the first tapered surface 50c intersects with the inner circumferential surface of the base portion of the first intermediate member 50) is set in the range between 12 degrees to 60 degrees. The oil (including the grease) is provided so as to lubricate the components of the hysteresis portion 3b including the first intermediate members 50 in order to reduce the possibility of the occurrence of the excessive friction. In this embodiment, the light resin is used for the first intermediate members 50. More specifically, the light resin having the specific gravity equal to or less than twice as much as the specific gravity of the oil around the first intermediate members 50 is used. Accordingly, the damper device 3 may stabilize the hysteresis characteristic while being less influenced by of the centrifugal force.

The second intermediate members 51 are components of the hysteresis portion 3b. Each of the second intermediate members 51 is formed in an arc shape. The second intermediate members 51 are provided at the hysteresis portion 3b in the circumferential direction thereof so that each of the second intermediate members 51 is spaced away from each of the neighboring second intermediate members 51 at a space formed between the outer protrusion 49b of the second side plate 49 and the second friction surface 52d of the hub member 52. Hereinafter, the detailed description of the second intermediate members 51 will be given with one of the second intermediate members 51 as an example, because the second intermediate members 51 have the same configuration and operation. The second intermediate member 51 is provided between the outer circumferential surface of the cylindrical portion of the second side plate 49 (i.e. the outer circumferential surface of the inner circumferential end portion of the second side plate 49 bent and extended towards the flange portion 52b of the hub member 52 in the axial direction) and the second friction surface 52d of the hub member 52 so as to ensure a clearance (e.g. play (backlash) which is equal to or greater than 0.3 mm) between the second intermediate member 51 on the one hand and the outer circumferential surface of the cylindrical portion of the second side plate 49 and the second friction surface 52d of the hub member 52 on the other hand in the radial direction. Furthermore, the second intermediate member 51 is provided between the flange portion 52b of the hub member 52 and the second side plate 49 so as to ensure a clearance (i.e. play (backlash) which is equal to or great than 0.3 mm) between the second intermediate member 51 on the one hand and the flange portion 52b and the second side plate 49 on the other hand in the axial direction. An outer circumferential surface of the second intermediate member 51 serves as a first friction surface 51a which faces the second friction surface 52d of the hub member 52 and which extends along the second friction surface 52d of the hub member 52. The first friction surface 51a of the second intermediate member 51 generates the friction with the second friction surface 52d of the hub member 52 by the second intermediate member 51 being pressed against the second friction surface 52d of the hub member 52 when the second side plate 49 and the hub member 52 rotate relative to each other, thereby generating the hysteresis torque. Further, the second intermediate member 51 includes a base portion and the inner protrusion 51b, which inwardly extends from a substantially intermediate portion of an inner circumferential surface of the base portion in the radial direction. The inner protrusion 51b is provided at the second intermediate member 51 so as to form a clearance (e.g. play (backlash) which is equal to or greater than 0.3 mm) between the inner protrusion 51b and the neighboring outer protrusions 49b of the second side plate 49 in the circumferential direction at a space formed between the neighboring second outer protrusions 49b. Side surfaces of the second inner protrusion 51b in the circumferential direction serve as the first tapered surfaces 51c, respectively, which correspond to the second tapered surfaces 49c of the outer protrusions 49b of the second side plate 49, respectively. The first tapered surfaces 51c interact with the corresponding second tapered surfaces 49c of the second side plate 49 when the second side plate 49 and the hub member rotate relative to each other, thereby outwardly displacing (pressing) the entire second intermediate member 51 in the radial direction. As is the case with the first embodiment, an angle of each of the first tapered surfaces 51c of the second intermediate member 51 (an angle formed between the first tapered surface 51c and a tangent line at a point where the first tapered surface 51c intersects with the inner circumferential surface of the base portion of the second intermediate member 51) is set in the range between 12 degrees to 60 degrees. The oil (including the grease) is provided so as to lubricate the components of the hysteresis portion 3b including the second intermediate members 51 in order to reduce the possibility of the occurrence of the excessive friction. In this embodiment, the light resin is used for the second intermediate members 51. More specifically, the light resin having the specific gravity equal to or less than twice as much as the specific gravity of the oil around the second intermediate members 51 is used. Accordingly, the damper device 3 may stabilize the hysteresis characteristic while less being influenced by the centrifugal force.

The hub member 52 is a component of the hysteresis portion 3b and the damper portion 3a. Further, the hub member 52 is connected to the rotational shaft 4 of the clutch device 5 (see FIG. 3) and serves as an output member (the second plate member) of the hysteresis portion 3b. The hub member 52 includes the flange portion 52b, which extends outwardly from a portion of the outer circumferential surface of the cylindrical portion 52a (a second extending portion) in the radial direction. A spline is provided at an inner circumferential surface of the cylindrical portion 52a in order to connect the hub member 52 with the rotational shaft 4 of the clutch device 5. Furthermore, recessed portions are provided at both end portions of the outer circumferential surface of the cylindrical portion 51a, respectively, in the axial direction thereof, so that the first and second seals 31 and 32 are attached at the recessed portions, respectively. The cylindrical portion 52a of the hub member 52 supports the second and third plates 46 and 47 via the first and second seals 31 and 32, respectively, so that the second and third plates 46 and 47 rotate relative to the hub member 52. The flange portion 52b of the hub member 52 includes a first surface, which faces the first side plate 48, and a second surface, which faces the second side plate 49. The first and second thrust members 53 and 54 slidbaly and fittedly contact the flange portion 52b on the first and second surfaces, respectively, at an inner circumferential end portion of the flange portion 52b (i.e. a portion of the flange portion 52b in the vicinity of the cylindrical portion 52a). Further, the flange portion 52b includes a third opening 52e at an outer circumferential end portion of the flange portion 52b in the radial direction, so that the coil spring 27 and the seat members 26 are accommodated within the third opening 52e. The second opening 52e is formed at the flange portion 52b of the hub member 52 so as to contact/detach with/from the seat members 26 at respective end portions of the third opening 52e in the radial direction thereof. The flange portion 52b includes the first and second protruding portions 52c1 and 52c2 (a first extending portions), which protrude from portions of the first and second surfaces of the flange portion 52b at an inner side relative to the third opening 52e in the radial direction, respectively, so as to extend in the axial direction. Accordingly, each of the first and second protruding portions 52c1 and 52c2 forms a cylindrical shape. More specifically, the first protruding portion 52c1 protrudes from the first surface of the flange portion 52b towards the first side plate 48 in the axial direction, so that an inner circumferential surface of the first protruding portion 52c1 serves as the second friction surface 52d, which corresponds to the first friction surfaces 50a of the first intermediate members 50. On the other hand, the second protruding portion 52c2 protrudes from the second surface of the flange portion 52b towards the second side plate 49 in the axial direction, so that an inner circumferential surface of the second protruding portion 52c2 serves as the second friction surface 52d, which corresponds to the first friction surfaces 51a of the second intermediate members 51.

The first thrust member 53 is provided between the second plate 46 and the flange portion 52b of the hub member 52 in the axial direction so as to be positioned at an inner side relative to the first side plate 48 in the radial direction when being viewed from a direction orthogonal to the axial direction of the damper device 3 so that the first thrust member 53 slidably contacts the second plate 46 and the flange portion 52b of the hub member 52.

The second thrust member 54 is provided between the flange portion 52b of the hub member on the one hand and the third plate 47 and the second coned disc spring 55 on the other hand so as to be positioned at an inner side relative to the second side plate 49 in the radial direction when being viewed from the direction orthogonal to the axial direction of the damper device 3. The second thrust member 54 is biased towards the flange portion 52b of the hub member 52 by the second coned disc spring 55 so that the second thrust member 54 slidably contacts the flange portion 52b.

The second coned disc spring 55 is provided between the second thrust member 54 and the second plate 47. Further, the second coned disc spring 55 biases the second thrust member 54 towards the flange portion 52b of the hub member 52.

The first seal 31 is a member, which is formed in a ring shape and which closes the clearance formed between the second plate 46 and the cylindrical portion 52a of the hub member 52 in the radial direction. More specifically, the first seal 31 seals the space, which is formed by the second and third plates 46 and 47, together with the second seal 32, so that the oil (including the grease), which is accommodated therewithin, does not leak therefrom.

The second seal 32 is a member, which is formed in a ring shape and which closes the clearance formed between the third plate 47 and the cylindrical portion 52a of the hub member 52 in the radial direction. More specifically, the second seal 32 seals the space, which is formed by the second and third plates 46 and 47, together with the first seal 31, so that the oil (including the grease), which is accommodated therewithin, does not leak therefrom.

According to the eighth embodiment, in addition to advantages and effects similar to the first embodiment, the damper device 3 may be further downsized because the hysteresis portion 3b is provided at the inner side relative to the damper device 3a in the radial direction, when comparing to the first embodiment. Furthermore, the damper device 3 of the eighth embodiment may reduce the influence of the centrifugal force acting on the first and second intermediate members 50 and 51.

Ninth Embodiment

A ninth embodiment of a damper device will be described below in accordance with the attached drawings. Illustrated in FIG. 16 is a partial cross-sectional diagram schematically illustrating a configuration example of the damper device according to the ninth embodiment. Illustrated in FIG. 17 is a partial cross-sectional diagram schematically illustrating a configuration example of a hysteresis portion of the damper device according to the ninth embodiment taken along line XVII-XVII of FIG. 16 and when being viewed in the axial direction of the damper device.

As is the case with the damper device 3 of the eighth embodiment, the damper device 3 according to the ninth embodiment is configured so that the hysteresis portion 3b is provided at the inner side relative to the damper device 3a in the radial direction. However, the damper device 3 of the ninth embodiment differs from the damper device 3 of the eighth embodiment in that a second intermediate member (63) is provided between a cylindrical portion (64a) (the second extending portion) of a hub member (64) and an inner circumferential end portion of a second side plate (60) in addition to the configuration of the hysteresis portion 3b in which a first intermediate member (62) is provided between a protruding portion (64c) (the first extending portion) of the hub member (64) and an inner circumferential end portion of a second side plate (60).

The damper device 3 includes a second plate 57, a third plate 58, a first side plate 59, a second side plate 60 (i.e. the first plate member), first intermediate members 62, second intermediate members 63, a hub member 64 (i.e. the second plate member), a thrust member 65, a pressure plate 66, a second coned disc spring 67, the first seal 31 and the second seal 32. Other configurations of the damper device 3 are similar to the damper device 3 of the first embodiment (see FIG. 1).

The second plate 57 is formed in a circular shape. The second plate 57 extends towards a cylindrical portion 64a (the second extending portion) of the hub member 64 so as to form a clearance between a radially inner circumferential end portion of the second plate 57 and the cylindrical portion 64a in the radial direction. Further, the second plate 57 fittedly contacts the first seal 31 at the radially inner circumferential end portion of the second plate 57 so as to close the clearance formed between the second plate 57 and the hub member 64 in the radial direction. Accordingly, a space, which is formed by the second and third plates 57 and 58, is sealed by the first seal 31 together with the second seal 32, so that the oil (including the grease), which is accommodated within the space, does not leak therefrom. Other configurations of the second plate 57 are similar to the second plate 15 of the first embodiment (see FIG. 1).

The third plate 58 is formed in a circular shape. The third plate 58 extends towards the cylindrical portion 64a of the hub member 64 so as to form a clearance between a radially inner circumferential end portion of the third plate 58 and the cylindrical portion 64a in the radial direction. Further, the second plate 58 fittedly contacts the second seal 32 at the radially inner circumferential end portion of the third plate 58 so as to close the clearance formed between the third plate 58 and the hub member 64 in the radial direction in order to seal the space formed by the second and third plates 57 and 58, together with the first seal 31, so that the oil (including the grease), which is accommodated within the space, does not leak therefrom. Other configurations of the third plate 58 are similar to the third plate 16 of the first embodiment (see FIG. 1).

The first side plate 59 is formed in a circular shape. The first side plate 59 is supported by the hub member 64 at a radially inner circumferential end portion via the thrust member 65 so as to rotate relative to the hub member 64. The first side plate 59 includes a first opening 59a at a substantially intermediate portion thereof in the radial direction, so that the coil spring 27 and the seat portions 26 are accommodated within the first opening 59a. Further, the first opening 59a is provided at the first side plate 59 so as to contact/detach with/from the seat members 26 at respective end portions of the first opening 59a in the radial direction thereof. Other configurations of the first side plate 59 are similar to the first side plate 22 of the first embodiment (see FIG. 1).

The second side plate 60 is formed in a circular shape. A radially inner circumferential end portion of the second side plate 60 is bent towards a flange portion 64b of the hub member 64 so as to extend in the axial direction. Accordingly, the inner circumferential end portion forms a cylindrical shape. The cylindrical portion (i.e. the radially inner circumferential end portion) of the second side plate 60 is positioned between an protruding portion 64c of the hub member 64 and the cylindrical portion 64a of the hub member 64, therefore, the cylindrical portion serves as an intermediate extending portion. Further, plural outer protrusions 60b, which outwardly extend in the radial direction, and plural inner protrusions 60d, which inwardly extend in the radial direction, are provided at an end portion of the radially inner circumferential end portion of the second side plate 60. Each of the outer protrusions 60b is provided at the second side plate 60 so as to form a clearance (e.g. play, backlash) between the outer protrusion 60b and the inner protrusions 62b of the neighboring first intermediate members 62 in the circumferential direction at a space formed between the inner protrusions 62b of the neighboring first intermediate members 62. Hereinafter, the detailed description of the outer protrusions 60b of the second side plate 60 will be given with one of the outer protrusions 60b as an example. Side surfaces of the outer protrusion 60b in the circumferential direction serve as second tapered surfaces 60c (the second tapered portions), which correspond to first tapered surfaces 62c (the first tapered portions, first inner tapered surfaces) of the inner protrusions 62b of the neighboring first intermediate members 62 in the circumferential direction, respectively. Each of the inner protrusions 60d is provided at the second side plate 60 so as to form a clearance (e.g. play, backlash) between the inner protrusion 60d and the outer protrusions 63b of the neighboring second intermediate members 63 in the circumferential direction at a space formed between the inner protrusions 63b of the neighboring second intermediate members 63. Hereinafter, the detailed description of the outer protrusions 60d of the second side plate 60 will be given with one of the inner protrusions 60d as an example. Side surfaces of the inner protrusion 60d in the circumferential direction serve as second tapered surfaces 60e (the second tapered portions, second inner tapered surfaces), which correspond to first tapered surfaces 63c (the first tapered portions, first outer tapered surfaces) of outer protrusions 63b of the neighboring second intermediate members 63, respectively. The outer protrusions 60b, the second tapered surfaces 60c, the inner protrusions 60d and the second tapered surfaces 60e are formed by pressing. The second tapered surfaces 60c of the outer protrusion 60b interact with the first tapered surfaces 62c of the neighboring first intermediate members 62 when the second side plate 60 and the hub member 64 rotate relative to each other, thereby outwardly pressing the entire first intermediate members 62 in the radial direction. An angle of each of the second tapered surfaces 60c (i.e. an angle formed between the second tapered surface 60c and a tangent line at a point where the second tapered surface 60c intersects with an outer circumferential surface of the cylindrical portion of the second side plate 60 facing the first intermediate member 62) is set in the range between 12 degrees to 60 degrees. The second tapered surfaces 60e of inner protrusion 60d interact with the first tapered surfaces 63c of the neighboring second intermediate members 63 when the second side plate 60 and the hub member 64 rotate relative to each other, thereby inwardly pressing the entire second intermediate members 63 in the radial direction. An angle of each of the second tapered surfaces 60e (i.e. an angle formed between the second tapered surface 60e and a tangent line at a point where the second tapered surface 60e intersects with an inner circumferential surface of the cylindrical portion of the second side plate 60 facing the second intermediate member 63) is set in the range between 12 degrees to 60 degrees. The second side plate 60 includes a second opening 60a at a substantially intermediate portion thereof in the radial direction, so that the coil spring 27 and the seat members 26 are accommodated within the second opening 60a. Further, the second opening 60a is formed at the second side plate 60 so as to contact/detach with/from the seat members 26 at respective end portions of the second opening 60a in the radial direction thereof. Other configurations of the second side plate 60 are similar to the second side plate 23 of the first embodiment (see FIG. 1).

The first intermediate members 62 are components of the hysteresis portion 3b. Each of the first intermediate members 62 is formed in an arc shape. Further, the first intermediate members 62 are provided at the hysteresis portion 3b in the circumferential direction so that each of the first intermediate members 62 is spaced away from each of the neighboring first intermediate members 62 at a space formed between the outer protrusion 60b of the second side plate 60 and a second friction surface 64d1 (a second outer friction surface) of the hub member 64 in the radial direction. Hereinafter, the detailed description of the first intermediate members 62 will be given with one of the first intermediate members 62 as an example. The first intermediate member 62 is provided between the outer circumferential surface of the cylindrical portion of the second side plate 60 (i.e. the outer circumferential surface of the radially circumferential end portion of the second side plate 60 extending in the axial direction) and the second friction surface 64d1 of the hub member 64 so as to ensure a clearance (e.g. play (backlash) which is equal to or greater than 0.3 mm) between the first intermediate member 62 on the one hand and the outer circumferential surface of the cylindrical portion of the second side plate 60 and the second friction surface 64d1 of the hub member 64 on the other hand in the radial direction. Further, the first intermediate member 62 is provided between the flange portion 64b and the second side plate 60 so as to ensure a clearance (e.g. play (backlash) which is equal to or greater than 0.3 mm) between the first intermediate member 62 on the one hand and the flange portion 63b and the second side plate 60 on the other hand in the axial direction. An outer circumferential surface of the first intermediate member 62 serves as a first friction surface 62a (a first outer friction surface), which faces the second friction surface 64d1 of the hub member 64 and which extends along the second friction surface 64d1 of the hub member 64. The first friction surface 62a of the first intermediate member 62 generates the friction with the second friction surface 64d1 of the hub member 64 by the first intermediate member 62 being pressed against the second friction surface 64d1 of the hub member 64 when the second side plate 60 and the hub member 64 rotate relative to each other, thereby generating the hysteresis torque. The first intermediate member 62 includes a base portion and the inner protrusion 62b, which inwardly protrudes in the radial direction from a substantially intermediate portion of an inner circumferential surface of the base portion of the first intermediate member 62 in the circumferential direction. The inner protrusion 62*b* is provided at the first intermediate member 62 so as to form a clearance (e.g. play (backlash) which is equal to or greater than 0.3 mm) between the inner protrusion 62*b* and the neighboring outer protrusions 60*b* of the second side plate 60 in the circumferential direction at a space formed by the neighboring outer protrusions 60*b* of the second side plate 60. Side surfaces of the inner protrusion 62*b* of the first intermediate member 62 in the circumferential direction serve as the first tapered surfaces 62*c*, which correspond to the second tapered surfaces 60*c* of the neighboring outer protrusions 60*b*, respectively. The first tapered surfaces 62*c* of the first intermediate member 62 interact with the corresponding second tapered surfaces 60*c* of the second side plate 60 when the second side plate 60 and the hub member 64 rotate relative to each other, thereby outwardly displacing (pressing) the entire first intermediate member 62 in the radial direction. As is the case with the first embodiment, an angle of each of the first tapered surfaces 62*c* of the first intermediate member 62 (i.e. an angle formed between the first tapered surface 62*c* and a tangent line at a point where the first tapered surface 62*c* intersects with the inner circumferential surface of the base portion of the first intermediate member 62) is set in the range between 12 degrees to 60 degrees. The oil (including the grease) is provided so as to lubricate the components of the hysteresis portion 3*b* including the first intermediate members 62 in order to reduce the possibility of the occurrence of the excessive friction. In this embodiment, the light resin is used for the first intermediate members 62. More specifically, the light resin having the specific gravity equal to or less than twice as much as the specific gravity of the oil around the first intermediate members 62 is used. Accordingly, the damper device 3 may stabilize the hysteresis characteristic while being less influenced by the centrifugal force.

The second intermediate members 63 are components of the hysteresis portion 3*b*. Each of the second intermediate members 63 is formed in an arc shape. Further, the second intermediate members 63 are provided at the hysteresis portion 3*b* in the circumferential direction so that each of the second intermediate members 63 is spaced away from each of the neighboring second intermediate members 63 at a space formed between the inner protrusion 60*d* of the second side plate 60 and a second friction surface 64*b*2 of the hub member 64. Hereinafter, the detailed description of the second intermediate members 63 will be given with one of the second intermediate members 63 as an example. The second intermediate member 63 is provided between an inner circumferential surface of the cylindrical portion of the second side plate 60 (i.e. the inner circumferential surface of the inner circumferential end portion extending towards the flange portion 64*b* in the axial direction) and a second friction surface 64*d*2 (a second inner friction surface) of the hub member 64 so as to ensure a clearance (e.g. play (backlash) which is equal to or greater than 0.3 mm) between the second intermediate member 63 on the one hand and the inner circumferential surface of the cylindrical portion of the second side plate 60 and the second friction surface 64*d*2 of the hub member 64 on the other hand in the radial direction. Further, the second intermediate member 63 is provided between the flange portion 64*b* of the hub member 64 and the third plate 58 so as to ensure a clearance (e.g. play (backlash) which is equal to or greater than 0.3 mm) between the second intermediate member 63 on the one hand and the flange portion 64*b* and the third plate 58 on the other hand in the axial direction. An inner circumferential surface of the second intermediate member 63 serves as a first friction surface 63*a* (a first inner friction surface), which faces the second friction surface 64*d*2 of the hub member 64 and which extends along the second friction surface 64*d*2 of the hub member 64. The first friction surface 63*a* of the second intermediate member 63 generates the friction with the second friction surface 64*d*2 of the hub member 64 by the second intermediate member 63 being pressed against the second friction surface 64*d*2 of the hub member 64 when the second side plate 60 and the hub member 64 rotate relative to each other, thereby generating the hysteresis torque. The second intermediate member 63 includes a base portion and the outer protrusion 63*b*, which outwardly protrudes in the radial direction from a substantially intermediate portion of an outer circumferential surface of the base portion of the second intermediate member 63 in the circumferential direction. The outer protrusion 63*b* is provided at the second intermediate member 63 so as to ensure a clearance (e.g. play (backlash) which is equal to or greater than 0.3 mm) between the outer protrusion 63*b* and the neighboring inner protrusions 60*d* of the second side plate 60 in the circumferential direction at a space formed by the neighboring inner protrusions 60*d* of the second side plate 60. Side surfaces of the outer protrusion 63*b* of the second intermediate member 63 in the circumferential direction serve as the first tapered surfaces 63*c*, which correspond to the second tapered surfaces 60*e* of the neighboring inner protrusions 60*d*, respectively. The first tapered surfaces 63*c* of the second intermediate member 63 interact with the corresponding second tapered surface 60*e* of the second side plate 60 when the second side plate 60 and the hub member 64 rotate relative to each other, thereby inwardly displacing (pressing) the entire second intermediate member 63 in the radial direction. As is the case with the sixth embodiment, an angle of each of the first tapered surfaces 63*c* of the second intermediate member 63 (i.e. an angle formed between the first tapered surface 63*c* and a tangent line at a point where the first tapered surface 63*c* intersects with the outer circumferential surface of the base portion of the second intermediate member 63) is set in the range between 12 degrees to 60 degrees. The oil (including the grease) is provided so as to lubricate the components of the hysteresis portion 3*b* including the second intermediate members 63 in order to reduce the possibility of the occurrence of the excessive friction. In this embodiment, the light resin is used for the second intermediate members 63. More specifically, the light resin having the specific gravity equal to or less than twice as much as the specific gravity of the oil around the second intermediate members 63 is used. Accordingly, the damper device 3 may stabilize the hysteresis characteristic while being less influenced by the centrifugal force.

The hub member 64 is a component of the hysteresis portion 3*b* and the damper portion 3*a*. Further, the hub member 64 is connected to the rotational shaft 4 of the clutch device 5 (see FIG. 3) and serves as the output member of the hysteresis portion 3*b*. The hub member 64 includes the flange portion 64*b*, which outwardly extends from a portion of the outer circumferential surface of the cylindrical portion 64*a* (the second extending portion) in the radial direction. A spline is provided at an inner circumferential surface of the cylindrical portion 64*a* in order to connect the hub member 64 with the rotational shaft 4 of the clutch device 5. Furthermore, recessed portions are provided at end portions of the outer circumferential surface of the cylindrical portion 64*a*, respectively, in the axial direction thereof, so that the first and second seals 31 and 32 are attached at the recessed portions, respectively. The cylindrical portion 64*a* of the hub member 64 supports the second and third plates 57 and 58 via the first and second seals 31 and 32, respectively, so that the second and third plates 57 and 58 rotate relative to the hub member 64. The flange portion 64*b* of the hub member 64 includes a first surface, which faces the first side plate 59, and a second surface, which faces the second side plate 60. The thrust member 65 slidably and fittedly contacts the flange portion 64b on the first surface at an inner circumferential end portion of the flange portion 64b (i.e. a portion of the flange portion 64b in the vicinity of the cylindrical portion 64a). Further, the flange portion 64b includes a third opening 64e at an outer circumferential end portion of the flange portion 64b in the radial direction, so that the coil spring 27 and the seat members 26 are accommodated within the third opening 64e. The third opening 64e is formed at the flange portion 64b of the hub member 64 so as to contact/detach with/from the seat members 26 at respective end portions of the third opening 64e in the radial direction thereof. The flange portion 64b includes the protruding portion 64c (the first extending portion), which protrudes from the second surface of the flange portion 64b at an inner side relative to the third opening 64e in the radial direction, so as to extend towards the second side plate 60 in the axial direction. Accordingly, the protruding portion 64c of the flange portion 64b forms a cylindrical shape (i.e. a cylindrical portion). An inner circumferential surface of the protruding portion 64c of the hub member 64 serves as the second friction surface 64d1, which corresponds to the first friction surfaces 62a of the first intermediate members 62. Further, the outer circumferential surface of the cylindrical portion 64a of the hub member 64 serves as the second friction surface 64d2, which corresponds to the first friction surfaces 63a of the second intermediate members 63.

The thrust member 65 supports the first side plate 59 at the radially inner circumferential end portion thereof so that the first side plate 59 rotates relative to the hub member 64. Furthermore, the thrust member 65 is formed so as to be provided between the first side plate 59 and the flange portion 64b of the hub member 64 in the axial direction so as to slidably contact the first side plate 59 and the flange portion 64b.

The pressure plate 66 is provided between the second coned disc spring 67 and an end portion of the protruding portion 64c of the hub member 64 in the axial direction. Further, the pressure plate 66 is supported by the second side plate 60 so as not to be rotatable relative to the second side plate 60 and so as to be movable in the axial direction. The pressure plate 66 is biased towards the end portion of the protruding portion 64c of the hub member 64 by means of the second coned disc spring 67, so that the pressure plate 66 slidably and fittedly contacts the end portion of the protruding portion 64c of the hub member 64.

The second coned disc spring 67 is provided between the second side plate 60 and the pressure plate 66. The second coned disc spring 67 biases the pressure plate 66 towards the end portion of the protruding portion 64c of the hub member 64.

The first seal 31 is the member, which is formed in the ring shape and which closes the clearance formed between the second plate 57 and the cylindrical portion 64a of the hub member 64 in the radial direction in order to seal the space, which is formed by the second and third plates 57 and 58, together with the second seal 32, so that the oil (including the grease), which is accommodated within the space, does not leak therefrom.

The second seal 32 is the member, which is formed in the ring shape and which closes the clearance formed between the third plate 58 and the cylindrical portion 64a of the hub member 64 in the radial direction in order to seal the space, which is formed by the second and third plates 57 and 58, together with the first seal 31, so that the oil (including the grease), which is accommodated within the space, does not leak therefrom.

Other configurations of the damper device 3 of the ninth embodiment are similar to the damper device 3 of the first embodiment.

According to the ninth embodiment, in addition to advantages and effects similar to the eighth embodiment, the damper device 3 of the ninth embodiment maintain a load balance when generating the hysteresis torque by outwardly pressing the first intermediate members 62 towards the second friction surface 64d1 of the hub member 64 and inwardly pressing the second intermediate members 63 towards the second friction surface 64d2 of the hub member 64. Further, the damper device 3 of the ninth embodiment may generate the hysteresis torque nearly twice as much as the hysteresis torque generated by the damped device 3 of the eighth embodiment.

Tenth Embodiment

A tenth embodiment of a damper device will be described below in accordance with the attached drawings. Illustrated in FIG. 18A is a partial cross-sectional diagram schematically illustrating a configuration example of a hysteresis portion of the damper device according to the tenth embodiment. Illustrated in FIG. 18B is a partial cross-sectional diagram schematically illustrating the configuration example of the hysteresis portion of the damper device taken along line XVIIIB-XVIIIB in FIG. 18A.

According to the damper device 3 of the tenth embodiment, as is the case with the damper device 3 of the ninth embodiment, first intermediate members 71 are provided between a first protruding portion 73b (the first extending portion) of a hub member 73 (the second plate member) and a radially inner circumferential end portion of a first side plate 70 (the first plate member). Furthermore, second intermediate members 72 are provided between a second protruding portion 73d (the second extending portion) of the hub member 73 (which corresponds to the cylindrical portion 64a in FIG. 17) and the radially inner circumferential end portion of the first side plate 70 in the radial direction. Further, the damper device 3 of the tenth embodiment is configured so as to gradually increase the hysteresis torque in response to the torsional angle between the first side plate 70 and the hub member 73 by setting a clearance formed between each of the first intermediate members 71 and the first side plate 70 in the circumferential direction to be different from a clearance formed between each of the second intermediate members 72 and the first side plate 70 in the circumferential direction.

The first side plate 70 is formed in a circular shape. The first side plate 70 is bent towards a flange portion 73a of the hub member 73 at the radially inner circumferential end portion of the first side plate 70 so that the radially inner circumferential end portion of the first side plate 70 extends towards the flange portion 73a in the axial direction of the damper device 3 between the first protruding portion 73b and the second protruding portion 73d. Accordingly, the radially inner circumferential end portion of the first side plate 70 forms a cylindrical portion (i.e. the intermediate extending portion, which extends in the axial direction between the first protruding portion 73b and the second protruding portion 73d). Further, plural protrusions 70a (the second protrusions), which outwardly extend in the radial direction, are provided at an end portion of the radially inner circumferential end portion of the first side plate 70 facing the flange portion 73a of the hub member 73. Hereinafter, the protrusions 70a will be referred to as outer protrusions 70a. Additionally, plural protrusions 70c (the second protrusions), which inwardly extend in the radial direction, are provided at the end portion of the inner circumferential end portion of the first side plate 70. Hereinafter, the protrusions 70c will be referred to as inner protrusions 70c. The outer protrusions 70a are provided at the first side plate 70 so as to form a clearance (play, backlash) between each of the outer protrusions 70a and inner protrusions 71b (the first protrusion) of the neighboring first intermediate members 71 in the circumferential direction at a space formed between the neighboring inner protrusions 71b. Hereinafter, the detailed description of the outer protrusions 70a will be given with one of the outer protrusions 70a as an example, because the outer protrusions 70a have the same configuration and operation. Side surfaces of the outer protrusion 70a in the circumferential direction serve as second tapered surfaces 70b (the second tapered portions, the second outer tapered surfaces), which correspond to first tapered surfaces 71c (the first tapered portions, the first inner tapered surfaces) of the neighboring inner protrusions 71b in the circumferential direction, respectively. The inner protrusions 70c are provided at the first side plate 70 so as to form a clearance (play, backlash) between each of the inner protrusions 70c and outer protrusions 72b (the first protrusion) of the neighboring second intermediate members 72 in the circumferential direction at a space formed between the neighboring outer protrusions 72b. Hereinafter, the detailed description of the inner protrusions 70c will be given with one of the inner protrusions 70c as an example, because the inner protrusions 70c have the same configuration and operation. The clearance, which is formed between the outer protrusion 70a and the inner protrusions 71b of the neighboring first intermediate members 71 in the circumferential direction, is set to be different from the clearance, which is formed between the inner protrusion 70c and the neighboring outer protrusions 72b of the neighboring second intermediate members 72 in the circumferential direction. For example, in this embodiment, the clearance, which is formed between the outer protrusion 70a and the neighboring inner protrusions 71b of the neighboring first intermediate members 71 in the circumferential direction, is set to be greater than the clearance, which is formed between the inner protrusion 70c and the outer protrusions 72b of the neighboring second intermediate members 72 in the circumferential direction, as illustrated in FIG. 18B. Side surfaces of the inner protrusion 70c of the first side plate 70 in the circumferential direction serve as second tapered surfaces 70d (the second tapered portions, the second inner tapered surfaces), which correspond to first tapered surfaces 72c (the first tapered portions, the first outer tapered surfaces) of the neighboring outer protrusions 72b in the circumferential direction, respectively. The outer protrusions 70a, the second tapered surfaces 70b, the inner protrusions 70c and the second tapered surfaces 70d of the first side plate 70 are formed by pressing. The second tapered surfaces 70b of the first side plate 70 outwardly press the entire first intermediate members 71 in the radial direction by an interaction with the first tapered surfaces 71c of the corresponding first intermediate members 71 when the first side plate 70 and the hub member 73 rotate relative to each other. An angle of each of the second tapered surfaces 70b of the first side plate 70 (i.e. an angle formed between the second tapered surface 70b and a tangent line at a point where the second tapered surface 70b intersects with an outer circumferential surface of the cylindrical portion of the first side plate 70) is set in the range between 12 degrees to 60 degrees. Similarly, an angle of each of the first tapered surfaces 71c of the first intermediate member 71 is set in the range between 12 degrees to 60 degrees. The second tapered surfaces 70d of the first side plate 70 interact with the first tapered surfaces 72c of the corresponding second intermediate members 72 when the second side plate 70 and the hub member 73 rotate relative to each other, thereby inwardly pressing the entire intermediate members 72 in the radial direction. An angle of each of the second tapered surfaces 70d of the first side plate 70 (i.e. an angle formed between the second tapered surface 70d and a tangent line at a point where the second tapered surface 70d intersects with an inner circumferential surface of the cylindrical portion of the first side plate 70) is set in the range between 12 degrees to 60 degrees. Similarly, an angle of each of the first tapered surfaces 72c of the second intermediate member 72 is set in the range between 12 degrees to 60 degrees. Other configurations of the first side plate 70 are similar to the first side plate 23 of the first embodiment.

The first intermediate members 71 are components of the hysteresis portion 3b. Each of the first intermediate members 71 is formed in an arc shape. The first intermediate members 71 are provided at the hysteresis portion 3b in the circumferential direction thereof so that each of the first intermediate members 71 is spaced away from each of the neighboring intermediate members 71 at a space formed between the outer protrusion 70a of the first side plate 70 and a second friction surface 73c (the second outer friction surface 73c) of the hub member 73. Hereinafter, the detailed description of the first intermediate members 71 will be given with one of the first intermediate members 71 as an example, because the first intermediate members 71 have the same configuration and operation. The first intermediate member 71 is provided between the outer circumferential surface of the cylindrical portion of the first side plate 70 in the radial direction (i.e. the outer circumferential surface of the inner circumferential end portion of the first side plate 70 facing the first protruding portion 73b of the hub member 73) and the second friction surface 73c of the hub member 73 so as to ensure a clearance (e.g. play (backlash) which is equal to or greater than 0.3 mm) between the first intermediate member 71 on the one hand and the outer circumferential surface of the cylindrical portion of the first side plate 70 and the second friction surface 73c of the hub member 73 on the other hand in the radial direction. Furthermore, the first intermediate member 71 is provided between the first side plate 70 and the flange portion 73a of the hub member 73 so as to ensure a clearance (e.g. play (backlash) which is equal to or greater than 0.3 mm) between the first intermediate member 71 on the one hand and the flange portion 73a of the hub member 73 and the first side plate 70 on the other hand in the axial direction. An outer circumferential surface of the first intermediate member 71 serves as a first friction surface 71a (the first outer friction surface), which faces the second friction surface 73c of the hub member 73 and which extends along the second friction surface 73c of the hub member 73. The first friction surface 71a of the first intermediate member 71 generates the friction with the second friction surface 73c of the hub member 73 by the first friction surface 71a being pressed against the second friction surface 73c of the hub member 73 when the first side plate 70 and the hub member 73 rotate relative to each other, thereby generating the hysteresis torque. Further, the first intermediate member 71 includes a base portion and the inner protrusion 71b, which inwardly extends from a substantially intermediate portion of an inner circumferential surface of the base portion in the radial direction. The inner protrusion 71b is provided at the first intermediate member 71 so as to form a clearance (e.g. play (backlash) which is equal to or greater than 0.3 mm) between the inner protrusion 71b and the neighboring outer protrusions 70a of the first side plate 70 in the circumferential direction at a space formed between the neighboring outer protrusions 70a. Side surfaces of the inner protrusion 71b in the circumferential direction serve as the first tapered surfaces 71c, which correspond to the second tapered surfaces 70b of the neighboring outer protrusions 70a of the first side plate 70, respectively. The first tapered surfaces 71c of the first intermediate member 71 interact with the second tapered surfaces 70b of the first side plate 70 when the first side plate 70 and the hub member 73 rotate relative to each other, thereby outwardly displacing (pressing) the entire first intermediate member 71 in the radial direction. As is the case with the first embodiment, an angle of each of the first tapered surfaces 71c of the first intermediate member 71 (an angle formed between the first tapered surface 71c and a tangent line at a point where the first tapered surface 71c intersects with the inner circumferential surface of the base portion of the first intermediate member 71) is set in the range between 12 degrees to 60 degrees. The oil (including the grease) is provided so as to lubricate the components of the hysteresis portion 3b including the first intermediate members 71 in order to reduce the possibility of the occurrence of the excessive friction. In this embodiment, the light resin is used for the first intermediate members 71. More specifically, the light resin having the specific gravity equal to or less than twice as much as the specific gravity of the oil around the first intermediate members 71 is used. Accordingly, the damper device 3 may stabilize the hysteresis characteristic while being less influenced by the centrifugal force.

The second intermediate members 72 are components of the hysteresis portion 3b. Each of the second intermediate members 72 is formed in an arc shape. The second intermediate members 72 are provided at the hysteresis portion 3b in the circumferential direction thereof so that each of the second intermediate members 72 is spaced away from each of the neighboring second intermediate members 72 at a space formed between the inner protrusion 70c of the first side plate 70 and a second friction surface 73e (the second inner friction surface) of the hub member 73. Hereinafter, the detailed description of the second intermediate members 72 will be given with one of the second intermediate members 72 as an example, because the second intermediate members 72 have the same configuration and operation. The second intermediate member 72 is provided between an inner circumferential surface of the cylindrical portion of the first side plate 70 in the radial direction (i.e. an inner circumferential surface of the inner circumferential end portion of the first side plate 70 extending in the axial direction) and the second friction surface 73e of the hub member 73 so as to ensure a clearance (e.g. play (backlash) which is equal to or greater than 0.3 mm) between the second intermediate member 72 on the one hand the inner circumferential surface of the cylindrical portion of the first side plate 70 and the second friction surface 73e of the hub member 73 on the other hand in the radial direction. Furthermore, the second intermediate member 72 is provided between the flange portion 73a of the hub member 73 and a plate (which corresponds to the second plate 57 in FIG. 16) so as to ensure a clearance (e.g. play (backlash) which is equal to or greater than 0.3 mm) between the second intermediate member 72 on the one hand and the flange portion 73a of the hub member 73 and the plate on the other hand in the axial direction. An inner circumferential surface of the second intermediate member 72 serves as a first friction surface 72a (the first inner friction surface), which faces the second friction surface 73e of the hub member 73 and which extends along the second friction surface 73e of the hub member 73. The first friction surface 72a of the second intermediate member 72 generates the friction with the second friction surface 73e of the hub member 73 by the first friction surface 72a being pressed against the second friction surface 73e of the hub member 73 when the first side plate 70 and the hub member 73 rotate relative to each other, thereby generating the hysteresis torque. Further, the second intermediate member 72 includes a base portion and the outer protrusion 72b, which outwardly extends from substantially intermediate portion of an outer circumferential surface of the base portion in the radial direction. The outer protrusion 72b is provided at the second intermediate member 72 so as to form a clearance (e.g. play (backlash) which is equal to or greater than 0.3 mm) between the second outer protrusion 72b and the neighboring inner protrusions 70c of the first side plate 70 in the circumferential direction at a space formed between the neighboring inner protrusions 70c. Side surfaces of the outer protrusion 72b in the circumferential direction serve as the first tapered surfaces 72c, which correspond to the second tapered surfaces 70d of the neighboring inner protrusions 70c of the first side plate 70, respectively. The first tapered surfaces 72c of the second intermediate member 72 interact with the second tapered surfaces 70d of the first side plate 70 when the first side plate 70 and the hub member 73 rotate relative to each other, thereby outwardly displacing (pressing) the entire second intermediate member 72 in the radial direction. As is the case with the sixth embodiment, an angle of each of the first tapered surfaces 72c of the second intermediate member 72 (i.e. an angle formed between the first tapered surface 72c and a tangent line at a point where the first tapered surface 72c intersects with the outer circumferential surface of the base portion of the second intermediate member 72) is set in the range between 12 degrees to 60 degrees. The oil (including the grease) is provided so as to lubricate the components of the hysteresis portion 3b including the second intermediate members 72 in order to reduce the possibility of the occurrence of the excessive friction. In this embodiment, the light resin is used for the second intermediate members 72. More specifically, the light resin having the specific gravity equal to or less than twice as much as the specific gravity of the oil around the second intermediate members 72 is used. Accordingly, the damper device 3 may stabilize the hysteresis characteristic with less influence of the centrifugal force.

The hub member 73 includes the first protruding portion 73b and the second protruding portion 73d, which protrude from different portions of the flange portion 73a in the axial direction and each of which is formed in a cylindrical shape. For example, in this embodiment, the first protruding portion 73b is provided at the flange portion 73 at a portion outside relative to the second protruding portion 73b in the radial direction. An inner circumferential surface of the first protruding portion 73b facing the first intermediate members 71 serves as the second friction surface 73c, which corresponds to the first friction surfaces 71a of the first intermediate members 71. On the other hand, an outer circumferential surface of the second protruding portion 73d facing the second intermediate members 72 serves as the second friction surface 73e, which corresponds to the first friction surfaces 72a of the second intermediate members 72. Other configurations of the hub member 73 of the tenth embodiment are similar to the hub member 64 of the ninth embodiment.

The clearance formed between each of the first intermediate members 71b and the neighboring outer protrusions 70a of the first side plate 70 in the circumferential direction is set so that an angle (a backlash angle) becomes equivalent to a sum of a first angle α and a second angle β (α+β), each of which is formed between a third line, which connects a third intersection, at which a predetermined circle having a rotational axis of the first side plate 70 and the hub member 73 as a center point intersects with the first tapered surface 71c of the first intermediate member 71, and the center point, and a fourth line, which connects a fourth intersection, at which the predetermined circle intersects with the second tapered surface 70b of the first side plate 70, and the center point. Similarly, the clearance formed between the outer protrusion 72b of the second intermediate member 72 and the neighboring inner protrusions 70c of the first side plate 70 in the circumferential direction is set so that an angle (a backlash angle) becomes equivalent to a sum of a third angle γ and a fourth angle ε (γ+ε), each of which is formed between a fifth line, which connects a fifth intersection, at which the predetermined circle having the rotational axis of the first side plate 70 and the hub member 73 as the center point intersects with the first tapered surface 72c of the second intermediate member 72, and the center point, and a sixth line, which connects a sixth intersection, at which the predetermined circle intersects with the second tapered surface 70d of the first side plate 70, and the center point. The backlash angle of each of the first intermediate members 71 (i.e. α+β) is set to be different from the backlash angle of each of the second intermediate members 72 (i.e. γ+ε).

According to the tenth embodiment, as is the case with the ninth embodiment, the damper device 3 may generate the hysteresis torque nearly twice as much as the damper device 3 of, for example, the first embodiment. Further, by setting the clearances formed between the first intermediate members 71 and the first side plate 70 in the circumferential direction to be different from the clearances formed between the second intermediate members 72 and the first side plate 70 in the circumferential direction, shock, which is generated when the first tapered surfaces 71c contact the corresponding tapered surfaces 72c via the first side plate 70, is dispersed, thereby reducing the noise generated by the damper device 3.

Eleventh Embodiment

En eleventh embodiment of a damper device will be described below in accordance with the attached drawings. Illustrated in FIG. 19A is a plan view schematically illustrating a configuration example of a friction surface of an intermediate member, which is provided at the damper device according to FIG. 11. Illustrated in FIG. 19B is a cross-sectional view of the intermediate member taken along line XIXB-XIXB in FIG. 19A.

According to the damper device 3 of the eleventh embodiment, a groove 75b (a recessed portion) is formed on a friction surface 75a of an intermediate member 75. The groove 75b is formed so that the oil flows therein (i.e. the groove 75b serves as an oil passage). Other configurations of the intermediate member 75 are similar to the intermediate members of other embodiments (first through tenth embodiments). In other words, the configuration of the intermediate member 75 is adaptable to the intermediate member(s) of the first through tenth embodiment.

According to the eleventh embodiment, generation of friction dust at the intermediate member 75 may be avoided by providing the groove 75b at the friction surface 75a of the intermediate member 75. In the case where the oil is accommodated within the space formed between the second and third plates, lubricity of the friction surface 75a of the intermediate member 75 may be ensured by providing the groove 75b thereat, and further, heat dissipation of the intermediate member 75 may be ensured. Furthermore, the slide resistance at the friction surface 75a of the intermediate member 75 may be stabilized by providing the groove 75b at the friction surface 75a of the intermediate member 75.

According to the embodiments, each of the intermediate members (24, 24A, 24B, 34, 36, 41, 44, 50, 51, 62, 63, 71, 72) includes the protrusion (24b, 34b1, 34b2, 36b, 41b, 44b1, 44b2, 50b, 51b, 62b, 63b, 71b, 72b) at one of the inner circumferential surface and the outer circumferential surface thereof in the radial direction. The protrusion (24b, 34b1, 34b2, 36b, 41b, 44b1, 44b2, 50b, 51b, 62b, 63b, 71b, 72b) includes an end portion and the first tapered portion (24c, 24d, 34c1, 34c2, 36c, 41c, 44c, 50c, 51c, 62c, 63c, 71c, 72c), which is formed at the protrusion (24b, 34b1, 34b2, 36b, 41b, 44b1, 44b2, 50b, 51b, 62b, 63b, 71b, 72b) in a circumferential direction of the damper device (3). The other one of the first plate member (23, 40, 48, 49, 60, 70) and the second plate member (25, 38, 42, 52, 64, 73), which is provided so as to correspond to the protrusion (24b, 34b1, 34b2, 36b, 41b, 44b1, 44b2, 50b, 51b, 62b, 63b, 71b, 72b), includes the second tapered portion (25d, 25f, 38c, 40b, 48c, 49c, 60c, 60e, 70b, 70d), which corresponds to the first tapered portion (24c, 24d, 34c1, 34c2, 36c, 41c, 44c, 50c, 51c, 62c, 63c, 71c, 72c) of the intermediate member (24, 24A, 24B, 34, 36, 41, 44, 50, 51, 62, 63, 71, 72). Furthermore, the intermediate member (24, 24A, 24B, 34, 36, 41, 44, 50, 51, 62, 63, 71, 72) is pressed against the one of the first plate member (23, 40, 48, 49, 60, 70) and the second plate member (25, 38, 42, 52, 64, 73), which is provided so as to correspond to the other one of the inner circumferential surface and the outer circumferential surface of the intermediate member (24, 24A, 24B, 34, 36, 41, 44, 50, 51, 62, 63, 71, 72), in the radial direction by an interaction between the first tapered portion (24c, 24d, 34c1, 34c2, 36c, 41c, 44c, 50c, 51c, 62c, 63c, 71c, 72c) and the second tapered portion (24c, 24d, 34c1, 34c2, 36c, 41c, 44c, 50c, 51c, 62c, 63c, 70b, 70d) when the first plate member (23, 40, 48, 49, 60, 70) and the second plate member (25, 38, 42, 52, 64, 73) rotate relative to each other.

According to the embodiments, no contact occurs between the end portion of the protrusion (24b, 34b1, 34b2, 36b, 41b, 44b1, 44b2, 50b, 51b, 62b, 63b, 71b, 72b) and the other one of the first plate member (23, 40, 48, 49, 60, 70) and the second plate member (25, 38, 42, 52, 64, 73) when no relative rotation between the first plate member (23, 40, 48, 49, 60, 70) and the second plate member (25, 38, 42, 52, 64, 73) is generated.

According to the embodiments, the intermediate member (24, 24A, 24B, 34, 36, 41, 44, 50, 51, 62, 63, 71, 72) includes the first friction surface (24a, 34a, 36a, 41a, 44a, 50a, 51a, 62a, 63a, 71a, 72a) at the other one of the inner circumferential surface and the outer circumferential surface thereof. The one of the first plate member (23, 40, 48, 49, 60, 70) and the second plate member (25, 38, 42, 52, 64, 73), which is provided so as to face the first friction surface (24a, 34a, 36a, 41a, 44a, 50a, 51a, 62a, 63a, 71a, 72a) of the intermediate member (24, 24A, 24B, 34, 36, 41, 44, 50, 51, 62, 63, 71, 72), includes the second friction surface (23b, 42b, 52d, 64d1, 64d2, 73c, 73e) so as to extend along the first friction surface (24a, 34a, 36a, 41a, 44a, 50a, 51a, 62a, 63a, 71a, 72a). The first friction surface (24a, 34a, 36a, 41a, 44a, 50a, 51a, 62a, 63a, 71a, 72a) is pressed against the second friction surface (23b, 42b, 52d, 64d1, 64d2, 73c, 73e) when the first plate member (23, 40, 48, 49, 60, 70) and the second plate member (25, 38, 42, 52, 64, 73) rotate relative to each other.

According to the embodiments, the intermediate member (24, 24A, 24B, 34, 36, 41, 44, 50, 51, 62, 63, 71, 72) is provided at the damper device (3) so as to form the clearance between the intermediate member (24, 24A, 24B, 34, 36, 41, 44, 50, 51, 62, 63, 71, 72) and the other one of the first plate member (23, 40, 48, 49, 60, 70) and the second plate member (25, 38, 42, 52, 64, 73), which is positioned so as to face the protrusion (24b, 34b1, 34b2, 36b, 41b, 44b1, 44b2, 50b, 51b, 62b, 63b, 71b, 72b), in the circumferential direction. Furthermore, the intermediate member (24, 24A, 24B, 34, 36, 41, 44, 50, 51, 62, 63, 71, 72) is provided at the damper device (3) so as to from the clearance between the intermediate member (24, 24A, 24B, 34, 36, 41, 44, 50, 51, 62, 63, 71, 72) on the one hand and the first plate member (23, 40, 48, 49, 60, 70) and the second plate member (25, 38, 42, 52, 64, 73) on the other hand in the radial direction.

According to the fourth embodiment, the intermediate member (36) includes plural protrusions (36b), the intermediate member (36) is pressed against the one of the first plate member (23) and the second plate member (25) in the radial direction by the other one of the first plate member (23) and the second plate member (25) interacts with plural protrusions (36b) when the first plate member (23) and the second plate member (25→Embodiment□□□hub member) rotate relative to each other. Furthermore, plural protrusions (36b) move in conjunction with one another.

According to the fourth embodiment, the intermediate member (36) is formed in the circular shape and includes plural protrusions (36b) on one of the inner circumferential surface and the outer circumferential surface thereof so as to protrude therefrom in the radial direction. Furthermore, the thickness of the area of the intermediate member (36) other than the area having plural protrusions (36b) in the radial direction is set to be equal to or less than half of the thickness of the area having plural protrusions (36b) in the radial direction.

According to the embodiments, the intermediate member (24, 71, 72) includes plural peaces, each of which includes the first protrusion (24b, 71b, 72b) at one of the outer circumferential surface and the inner circumferential surface thereof in the radial direction, the other one of the first plate member (23, 70) and the second plate member (25, 73), which is positioned so as to face the first protrusions (24b, 71b, 72b), includes plural second protrusions (25c1, 25c2, 25c3, 70a, 70c), which correspond to the respective first protrusions (24b, 71b, 72b). Each of plural peaces (i.e. each of intermediate members (24, 71, 72) is pressed against the one of the first plate member (23, 70) and the second plate member (25, 73), which is positioned so as to face the other one of the outer circumferential surface and the inner circumferential surface of the intermediate member (24, 71, 72), by an interaction between the first protrusions (24b, 71b, 72b) and the second protrusions (25c1, 25c2, 25c3, 70a, 70c) when the first plate member (23, 70) and the second plate member (25, 73) rotate relative to each other, and wherein the intermediate member (24, 71, 72) is provided at the damper device (3) so as to form at least two different angles, each of which is formed by a first line and a second line, the first line connects a first intersection, at which a predetermined circle having a rotational axis of the first plate member (23, 70) and the second plate member (25, 73) as a center point intersects with the first protrusions (24b, 71b, 72b) of the intermediate member (24, 71, 72), and the center point and the second line connects the center point and a second intersection at which the predetermined circle intersects with the second protrusions (25c1, 25c2, 25c3, 70a, 70c).

According to the embodiments, the intermediate member (24, 71, 72) includes plural peaces (i.e. plural intermediate members) (24A, 24B, 71, 72), which are provided at the damper device (3) in a circumferential direction thereof and each of which includes the protrusion (24b, 71b, 72b) at one of the inner circumferential surface and the outer circumferential surface of the intermediate member (24, 71, 72) in the radial direction, the first tapered surface (24c, 71c, 72c) in the circumferential direction, and the first friction surface (24a, 71a, 72a) at the other one of the inner circumferential surface and the outer circumferential surface. The other one of the first plate member (23, 70) and the second plate member (25, 73), which is provided so as to face the protrusions (24b, 71b, 72b) of plural peaces (24A, 24B, 71, 72) of the intermediate member (24, 71, 72), includes the second tapered surface (25d, 70b, 70d). The one of the first plate member (23, 70) and the second plate member (25, 73), which is provided so as to face the first friction surface (24a, 71a, 72a), includes the second friction surface (23b, 73c, 73e). Plural peaces (24A, 24B, 71, 72) of the intermediate member (24, 71, 72) are pressed against the second friction surface (23b, 73c, 73e) when the first plate member (23, 70) and the second plate member (25, 73) rotate relative to each other. Furthermore, each of the plurality of peaces (24A, 24B, 71, 72) of the intermediate member (24, 71, 72) is provided at the damper device (3) so as to form at least two different angles, each of which is formed between the first line and the second line. The first line connects the first intersection, at which the predetermined circle having the rotational axis of the first plate member (23, 70) and the second plate member (25, 73) as the center point intersects with the first tapered surface (24c, 71c, 72c) of each of the plurality of peaces (24A, 24B, 71, 72) of the intermediate member (24, 71, 72), and the center point. The second line connects the center point and the second intersection at which the predetermined circle intersects with the second tapered surface (25d, 70b, 70d).

According to the fourth embodiment, the intermediate member (36) includes the recessed portion (36d) at the circumferential surface, which faces the one of the first plate member (23) and the second plate member (25).

According to the ninth and tenth embodiments, the intermediate member includes the first intermediate member (62, 71) and the second intermediate member (63, 72), which is provided at the inner circumferential side relative to the first intermediate member (62, 71). The first intermediate member (62, 71) and the second intermediate member (63, 72) are pressed against one of the first plate member (60, 70) and the second plate member (64, 73) by the interaction between the first and second intermediate members (62, 71, 63, 72) on the one hand and the other one of the first plate member (60, 70) and the second plate member (64, 72) on the other hand when the first plate member (60, 70) and the second plate member (64, 72) rotate relative to each other.

According to the ninth and tenth embodiments, the other one of the first plate member (60, 70) and the second plate member (64,73) includes the first extending portion (64c, 73b), which extends in the axial direction of the damper device (3), and the second extending portion (64a, 73d), which is provided at the other one of the first plate member (60, 70) and the second plate member (64,73) at an inner circumferential side relative to the first extending portion (64c, 73b) in the radial direction so as to extend in parallel to the first extending portion (64c, 73b). The one of the first plate member (60, 70) and the second plate member (64, 73) includes the intermediate extending portion, which extends in an axial direction of the damper device (3) so as to be positioned between the first extending portion (64c, 73b) and the second extending portion (64a, 73d) in the radial direction. The first intermediate member (62, 71) is provided between the first extending portion (64c, 73b) and the intermediate extending portion in the radial direction and wherein. The second intermediate member (63, 72) is provided between the second extending portion (64a, 73d) and the intermediate extending portion in the radial direction.

According to the ninth and tenth embodiments, the first intermediate member (62, 71) includes the inner protrusion (62b, 71b) at the inner circumferential surface thereof in the radial direction and the first outer friction surface (62a, 71a) at the outer circumferential surface of the first intermediate member (62, 71), which is an opposite surface from the inner circumferential surface having the inner protrusion (62b, 71b). The inner protrusion (62b, 71b) includes the first inner tapered surface (62c, 71c) in the circumferential direction thereof, the second intermediate member (63, 72) includes the outer protrusion (63b, 72b) at the outer circumferential surface thereof in the radial direction and the first inner friction surface (63a, 72a) at the inner circumferential surface of the second intermediate member (63, 72), which is the opposite surface from the outer circumferential surface having the outer protrusion (63b, 72b). The outer protrusion (63b, 72b) includes the first outer tapered surface (63c, 72c) in the circumferential direction thereof, the intermediate extending portion of the one of the first plate member (60, 70) and the second plate member (64, 73) includes the second outer tapered surface (60c, 70b), which corresponds to the first inner tapered surface (62c, 71c) of the first intermediate member (62, 71), and the second inner tapered surface (60e, 70d), which corresponds to the first outer tapered surface (63c, 72c). The first extending portion (64c, 73b) of the other one of the first plate member (60, 70) and the second plate member (64, 73) includes the second inner friction surface (64d1, 73c), which extends along the first outer friction surface (62a, 71a) of the first intermediate member (62, 71). The second extending portion (64a, 73d) includes the second outer friction surface (64d2, 73e), which extends along the first inner friction surface (63a, 72a) of the second intermediate member (63, 72). The first intermediate member (62, 71) is pressed against the second inner friction surface (64d1, 73c) when the first plate member (60, 70) and the second plate member (64, 73) rotate relative to each other. Furthermore, the second intermediate member (63, 72) is pressed against the second outer friction surface (64d2, 73e) when the first plate member (60, 70) and the second plate member (64, 73) rotate relative to each other.

According to the tenth embodiment, the first intermediate member (71) includes the first inner protrusion (71c) at the inner circumferential surface thereof in the radial direction. The second intermediate member (72) includes the first outer protrusion (72b) at the outer circumferential surface thereof in the radial direction. The intermediate extending portion of the one of the first plate member (70) and the second plate member (73) includes the second outer protrusion (70a), which corresponds to the first inner protrusion (71b) of the first intermediate member (71), and the second inner protrusion (70c), which corresponds to the first outer protrusion (72b) of the second intermediate member (72). The first intermediate member (71) is pressed against the first extending portion (73b) of the other one of the first plate member (70) and the second plate member (73) by the interaction between the first inner protrusion (71c) and the second outer protrusion (70a) when the first plate member (70) and the second plate member (73) rotate relative to each other. Furthermore, the second intermediate member (72) is pressed against the second extending portion (73d) of the other one of the first plate member (70) and the second plate member (73) by the interaction between the first outer protrusion (72b) and the second inner protrusion (70c) when the first plate member (70) and the second plate member (73) rotate relative to each other. Additionally, the angle formed between the third line and the fourth line is set to be different from the angle formed between the fifth line and the sixth line. The third line connects the third intersection, at which the predetermined circle having the rotational axis of the first plate member (70) and the second plate member (73) as the center point intersects with the first inner protrusion (71b) of the first intermediate member (71), and the center point. The fourth line connects the center point and the fourth intersection at which the predetermined circle intersects with the second outer protrusion (70a). The fifth line connects the center point and the fifth intersection, at which the predetermined circle intersects with the first outer protrusion (72b) of the second intermediate member (72). The sixth line connects the center point and the sixth intersection, at which the predetermined circle intersects with the second inner protrusion (70c).

According to the embodiments, the angle of the first tapered portion (24c, 24d, 34c1, 34c2, 36c, 41c, 44c, 50c, 51c, 62c, 63c, 71c, 72c) and the angle of the second tapered portion (25d, 25f, 38c, 40b, 48c, 49c, 60c, 60e, 70b, 70d) are set so as to be equal to or greater than 12 degrees but equal to or less than 60 degrees.

According to the embodiments, the hysteresis portion (3b) is lubricated by the oil. The intermediate member (24, 24A, 24B, 34, 36, 41, 44, 50, 51, 62, 63, 71, 72) is made of the resin having the specific gravity equal to or less than twice as much as the specific gravity of the oil.

According to the fourth embodiment, the intermediate member (36) is formed in the circular shape and includes plural protrusions (36b) at one of the outer circumferential surface and the inner circumferential surface thereof in the radial direction. Furthermore, the intermediate member (36) includes the recessed portion (36d) at the portion of the other one of the outer circumferential surface and the inner circumferential surface of the intermediate member (36), which is opposite from the one of the outer circumferential surface and the inner circumferential surface having the plurality of protrusions (36b), corresponding to the area where one of plural protrusions (36b) is provided.

According to the eleventh embodiment, the groove (75b), which is formed on the first friction surface (75a) of the intermediate member (75) serves as the oil passage.

According to the embodiment, the damper device 3 increases the hysteresis torque generated at the hystereris portion 3b only when the torsional speed and the torsional angle between the first plate member (23, 40, 48, 49, 60, 70) and the second plate member (25, 38, 42, 52, 64, 73) is great in the case where the engine 1 is started, in the case where the vibration is generated and the like. On the other hand, in the case where the torsional speed and the torsional angle between first plate member (23, 40, 48, 49, 60, 70) and the second plate member (25, 38, 42, 52, 64, 73) is small in the case where the vehicle is normally driven and the like, the damper device 3 does not generate the hysteresis torque. Accordingly, the damper device 3 effectively reduces the noise generated thereat. Specifically, the noise is effectively reduced in the case where the damper device 3 is adapted to the large-sized vehicle. Furthermore, the intermediate member(s) (24, 24A, 24B, 34, 36, 41, 44, 50, 51, 62, 63, 71, 72) are provided at the damper device 3b so as to ensure the clearance between the intermediate member(s) on the one hand and the components surrounding the intermediate member(s) on the other hand in the radial direction, in the circumferential direction and in the axial direction. Accordingly, the damper device 3 enhances the stabilities in the slide resistance.

Accordingly, the damper device 3 stabilizes the generation of the hysteresis torque as targeted while less being influenced by the centrifugal force. Furthermore, the damper device 3 generates relatively great hysteresis torque in the case where the torsional speed between the rotational axis 2 of the engine 1 and the rotational axis 4 of the clutch device 5 is low (i.e. in a case where the hysteresis torque is necessary). On the other hand, in the case where the torsional speed between the rotational axis 2 of the engine 1 and the rotational axis 4 of the clutch device 5 is great (i.e. in a case where the hysteresis torque is not always necessary), the damper device 3 generates relatively low hysteresis torque.

Accordingly, because each of the tapered surfaces 36c of the intermediate member 36 moves in conjunction with the movement of the intermediate member 36, chances of the occurrence of misalignment between each component may be reduced. Furthermore, chances of the intermediate member 36 being dragged due to the centrifugal force may be reduced.

Accordingly, because plural clearance widths are provided between the intermediate member(s) (24A, 24B, 71, 72) and the first plate member (70) or the second plate member (25), the shock, which is likely to be generated when the tapered surfaces (24c, 71c, 72c) of the intermediate member(s) (24A, 24B, 71, 72) contact the tapered surfaces (25d, 70b, 70d) of the first plate member (70) or the second plate member (25), may be dispersed. Accordingly, the damper device 3 may reduce the noise generated thereat.

Accordingly, the generation of the friction dust at the intermediate member(s) (75) may be avoided by providing the groove(s) (75a) on the friction surface(s) (75a) of the intermediate member(s) (75). Furthermore, the lubricity of the friction surface(s) (75a) of the intermediate member(s) (75) may be ensured, and the heat dissipation of the intermediate member(s) (75) may be ensured. Moreover, the slide resistance at the friction surface(s) (5a) of the intermediate member(s) (75) may be stabilized by providing the groove(s) (75b) at the friction surface(s) (75a) of the intermediate member(s) (75).

Accordingly, when the hysteresis torque is generated, the first intermediate member(s) (62, 71) is outwardly displaced in the radial direction, and the second intermediate member (s) (63, 72) is inwardly displaced in the radial direction. Therefore, the load balance may be maintained. Furthermore, the damper device 3 may generate relatively great hysteresis torque.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper device inputting a rotational torque of a power source from an input side and outputting the rotational torque to an output side, the damper device comprising:
   a first plate member rotated when the rotational force is inputted thereto from the input side;
   a second plate member provided so as to be rotatable relative to the first plate member and outputting the rotational force to the output side by the second plate member being rotated in response to a rotation of the first plate member;
   a damper portion for absorbing a relative rotation between the first plate member and the second plate member; and
   a hysteresis portion for absorbing the relative rotation between the first plate member and the second plate member by using a friction force, wherein
   the hysteresis portion includes an intermediate member between the first plate member and the second plate member in a radial direction of the damper device,
   the intermediate member is pressed against one of the first plate member and the second plate member by means of the other one of the first plate member and the second plate member when the first plate member and the second plate member rotate relative to each other;
   wherein the intermediate member includes a protrusion at one of an inner circumferential surface and an outer circumferential surface thereof in the radial direction, the protrusion includes an end portion and a first tapered portion, which is formed at the protrusion in a circumferential direction of the damper device, the other one of the first plate member and the second plate member, which is provided so as to correspond to the protrusion, includes a second tapered portion, which corresponds to the first tapered portion of the intermediate member, and wherein the intermediate member is pressed against the one of the first plate member and the second plate member, which is provided so as to correspond to the other one of the inner circumferential surface and the outer circumferential surface of the intermediate member, in the radial direction by an interaction between the first tapered portion and the second tapered portion when the first plate member and the second plate member rotate relative to each other; and
   wherein an angle of the first tapered portion and an angle of the second tapered portion is set so as to be equal to or greater than 12 degrees but equal to or less than 60 degrees.

2. The damper device according to claim 1, wherein no contact occurs between the end portion of the protrusion and the other one of the first plate member and the second plate member when no relative rotation between the first plate member and the second plate member is generated.

3. The damper device according to claim 1, wherein the intermediate member includes a first friction surface at the other one of the inner circumferential surface and the outer circumferential surface thereof, the one of the first plate member and the second plate member, which is provided so as to face the first friction surface of the intermediate member, includes a second friction surface so as to extend along the first friction surface, and wherein the first friction surface is pressed against the second friction surface when the first plate member and the second plate member rotate relative to each other.

4. The damper device according to claim 1, wherein the intermediate member is provided at the damper device so as to form a clearance between the intermediate member and the other one of the first plate member and the second plate member, which is positioned so as to face the protrusion, in the circumferential direction, and so as to from a clearance between the intermediate member on the one hand and the first plate member and the second plate member on the other hand in the radial direction.

5. The damper device according to claim 1, wherein the intermediate member includes a plurality of protrusions, the intermediate member is pressed against the one of the first plate member and the second plate member in the radial direction by the other one of the first plate member and the second plate member interacts with the plurality of the protrusions when the first plate member and the second plate member rotate relative to each other, and wherein the plurality of the protrusions move in conjunction with one another.

6. The damper device according to claim 5, wherein the intermediate member is formed in a circular shape and includes a plurality of protrusions on one of an inner circumferential surface and an outer circumferential surface thereof so as to protrude therefrom in the radial direction, and wherein a thickness of an area of the intermediate member other than an area having the plurality of the protrusions in the radial direction is set to be equal to or less than half of a thickness of the area having the plurality of protrusions in the radial direction.

7. The damper device according to claim 6, wherein the intermediate member is formed in a circular shape and includes the plurality of protrusions at one of the outer circumferential surface and the inner circumferential surface thereof in the radial direction, and wherein the intermediate member includes a recessed portion at a portion of the other one of the outer circumferential surface and the inner circumferential surface of the intermediate member, which is opposite from the one of the outer circumferential surface and the inner circumferential surface having the plurality of protrusions, corresponding to an area where one of the plurality of protrusions is provided.

8. The damper device according to claim 1 wherein, the intermediate member includes a plurality of pieces, each of which includes a first protrusion at one of an outer circumferential surface and an inner circumferential surface thereof in the radial direction, the other one of the first plate member and the second plate member, which is positioned so as to face the first protrusions, includes a plurality of second protrusions, which correspond to the respective first protrusions, each of the plurality of pieces is pressed against the one of the first plate member and the second plate member, which is positioned so as to face the other one of the outer circumferential surface and the inner circumferential surface of the intermediate member, by an interaction between the first protrusions and the second protrusions when the first plate member and the second plate member rotate relative to each other, and wherein the intermediate member is provided at the damper device so as to form at least two different angles, each of which is formed by a first line and a second line, the first line connects a first intersection, at which a predetermined circle having a rotational axis of the first plate member and the second plate member as a center point intersects with the first protrusions of the intermediate member, and the center point and the second line connects the center point and a second intersection at which the predetermined circle intersects with the second protrusions.

9. The damper device according to claim 1, wherein the intermediate member includes a plurality of pieces, which are provided at the damper device in a circumferential direction thereof and each of which includes a protrusion at one of an inner circumferential surface and an outer circumferential surface of the intermediate member in the radial direction, a first tapered surface in the circumferential direction, and a first friction surface at the other one of the inner circumferential surface and the outer circumferential surface, the other one of the first plate member and the second plate member, which is provided so as to face the protrusions of the plurality of pieces of the intermediate member, includes a second tapered surface, the one of the first plate member and the second plate member, which is provided so as to face the first friction surface, includes a second friction surface, the plurality of pieces of the intermediate member are pressed against the second friction surface when the first plate member and the second plate member rotate relative to each other, and wherein each of the plurality of pieces of the intermediate member is provided at the damper device so as to form at least two different angles, each of which is formed between a first line and a second line, the first line connects a first intersection, at which a predetermined circle having a rotational axis of the first plate member and the second plate member as a center point intersects with the first tapered surface) of each of the plurality of pieces of the intermediate member, and the center point, and the second line connects the center point and a second intersection at which the predetermined circle intersects with the second tapered.

10. The damper device according to claim 1, wherein the intermediate member includes a recessed portion at a circumferential surface, which faces the one of the first plate member and the second plate member.

11. The damper device according to claim 1, wherein the intermediate member includes a first intermediate member and a second intermediate member, which is provided at an inner circumferential side relative to the first intermediate member, and wherein the first intermediate member and the second intermediate member are pressed against one of the first plate member and the second plate member by an interaction between the first and second intermediate members on the one hand and the other one of the first plate member and the second plate member on the other hand when the first plate member and the second plate member rotate relative to each other.

12. The damper device according to claim 1, wherein the other one of the first plate member and the second plate member includes a first extending portion, which extends in an axial direction of the damper device, and a second extending portion, which is provided at the other one of the first plate member and the second plate member at an inner circumferential side relative to the first extending portion in the radial direction so as to extend in parallel to the first extending portion, the one of the first plate member and the second plate member includes an intermediate extending portion, which extends in the axial direction of the damper device so as to be positioned between the first extending portion and the second extending portion in the radial direction, a first intermediate member is provided between the first extending portion and the intermediate extending portion in the radial direction and wherein, a second intermediate member is provided between the second extending portion and the intermediate extending portion in the radial direction.

13. The damper device according to claim 12, wherein the first intermediate member includes an inner protrusion at an inner circumferential surface thereof in the radial direction and a first outer friction surface at an outer circumferential surface of the first intermediate member, which is an opposite surface from the inner circumferential surface having the inner protrusion, the inner protrusion includes a first inner tapered surface in a circumferential direction thereof, the second intermediate member includes an outer protrusion at an outer circumferential surface thereof in the radial direction and a first inner friction surface at an inner circumferential surface of the second intermediate member, which is the opposite surface from the outer circumferential surface having the outer protrusion, the outer protrusion includes a first outer tapered surface in a circumferential direction thereof, the intermediate extending portion of the one of the first plate member and the second plate member includes a second outer tapered surface, which corresponds to the first inner tapered surface of the first intermediate member, and a second inner tapered surface, which corresponds to the first outer tapered surface, the first extending portion of the other one of the first plate member and the second plate member includes a second inner friction surface, which extends along the first outer friction surface of the first intermediate member, the second extending portion includes a second outer friction surface, which extends along the first inner friction surface of the second intermediate member, the first intermediate member is pressed against the second inner friction surface when the first plate member and the second plate member rotate relative to each other, and wherein, the second intermediate member is pressed against the second outer friction surface when the first plate member and the second plate member rotate relative to each other.

14. The damper device according to claim 12, wherein the first intermediate member includes a first inner protrusion at an inner circumferential surface thereof in the radial direction, the second intermediate member includes a first outer protrusion) at an outer circumferential surface thereof in the radial direction, the intermediate extending portion of the one of the first plate member and the second plate member includes a second outer protrusion, which corresponds to the first inner protrusion of the first intermediate member, and a second inner protrusion, which corresponds to the first outer protrusion of the second intermediate member, the first intermediate member is pressed against the first extending portion of the other one of the first plate member and the second plate member by an interaction between the first inner protrusion and the second outer protrusion when the first plate member and the second plate member rotate relative to each other, the second intermediate member is pressed against the second extending portion of the other one of the first plate member and the second plate member by an interaction between the first outer protrusion and the second inner protrusion when the first plate member and the second plate member rotate relative to each other, and wherein an angle formed between a third line and a fourth line is set to be different from an angle formed between a fifth line and a sixth line, the third line connects a third intersection, at which a predetermined circle having a rotational axis of the first plate member and the second plate member as a center point intersects with the first inner protrusion of the first intermediate member, and the center point, the fourth line connects the center point and a fourth intersection at which the predetermined circle intersects with the second outer protrusion, the fifth line connects the center point and a fifth intersection, at which the predetermined circle intersects with the first outer protrusion of the second intermediate member, and the sixth line connects the center point and a sixth intersection, at which the predetermined circle intersects with the second inner protrusion.

15. The damper device according to claim 1, wherein the hysteresis portion is lubricated by an oil and the intermediate member is made of a resin having a specific gravity equal to or less than twice as much as a specific gravity of the oil.

* * * * *